US006827954B2

(12) United States Patent
Prosise et al.

(10) Patent No.: US 6,827,954 B2
(45) Date of Patent: *Dec. 7, 2004

(54) TASTY, CONVENIENT, NUTRITIONALLY BALANCED FOOD COMPOSITIONS

(75) Inventors: Robert Lawrence Prosise, Cincinnati, OH (US); Christopher Randall Beharry, Cincinnati, OH (US); Joseph James Elsen, St. Bernard, OH (US); Ralph Lawrence Helmers, Jr., Cincinnati, OH (US); Tamara Jocelyn Kearney, Springdale, OH (US); Jeffrey John Kester, West Chester, OH (US); Brenda Kay Murphy, Cincinnati, OH (US); Raymond Louis Niehoff, West Chester, OH (US); Kathleen Hack Noble, Cincinnati, OH (US); Richard Nicholas Reinhart, Jr., Cincinnati, OH (US); Robert Joseph Sarama, Loveland, OH (US); Charles Henry Taylor, Middletown, OH (US); Li-Hsin Tsai, Cincinnati, OH (US); Susana Rosa Waimin Siu, Cincinnati, OH (US); Thomas Joseph Wehmeier, Cincinnati, OH (US); Vince York-Leung Wong, Hamilton, OH (US)

(73) Assignee: Mid-America Commercialization Corporation, Manhattan, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/828,016

(22) Filed: Apr. 6, 2001

(65) Prior Publication Data

US 2002/0012722 A1 Jan. 31, 2002

Related U.S. Application Data

(60) Provisional application No. 60/196,628, filed on Apr. 12, 2000.

(51) Int. Cl.[7] .............................. A23L 1/05; A23L 1/29; A23L 1/302; A23L 1/304
(52) U.S. Cl. ............................ 426/72; 426/73; 426/74; 426/560; 426/573; 426/656
(58) Field of Search .............................. 426/72, 73, 74, 426/656, 560, 573

(56) References Cited

U.S. PATENT DOCUMENTS

| | | |
|---|---|---|
| 3,751,569 A | 8/1973 | Erickson |
| 4,005,195 A | 1/1977 | Jandacek |
| 4,112,123 A | 9/1978 | Roberts |
| 4,338,346 A | 7/1982 | Brand |
| 4,399,163 A | 8/1983 | Brennan et al. |
| 4,411,925 A | 10/1983 | Brennan et al. |
| 4,423,029 A | 12/1983 | Rizzi |
| 4,668,525 A | 5/1987 | Creswick |
| 4,680,193 A | 7/1987 | Lunder et al. |
| 4,789,664 A | 12/1988 | Seligson et al. |
| 4,832,971 A | 5/1989 | Michnowski |
| 4,859,475 A * | 8/1989 | Michnowski ................ 426/72 |
| 4,900,566 A * | 2/1990 | Howard ....................... 426/72 |
| 4,935,256 A | 6/1990 | Tsai |
| 5,051,270 A | 9/1991 | Ueda et al. |
| 5,061,508 A | 10/1991 | Schur |
| 5,132,113 A | 7/1992 | Luca |
| 5,242,697 A | 9/1993 | Luca |
| 5,262,190 A | 11/1993 | Cunningham et al. |
| 5,490,999 A | 2/1996 | Villagran et al. |
| 5,643,623 A | 7/1997 | Schmitz et al. |
| 5,834,044 A | 11/1998 | Schmitz et al. |
| 5,879,733 A | 3/1999 | Ekanayake et al. |
| 6,207,203 B1 | 3/2001 | Atkinson et al. |
| 2002/0037355 A1 * | 3/2002 | Wong et al. ................ 426/633 |

FOREIGN PATENT DOCUMENTS

| | | |
|---|---|---|
| EP | 0 434 025 | 6/1991 |
| EP | 0 588 600 | 3/1994 |
| GB | 2178637 A | 6/1985 |
| WO | WO 98/13056 | 4/1998 |
| WO | WO 99/08546 | 2/1999 |
| WO | WO 99/12030 | 3/1999 |

OTHER PUBLICATIONS

Pennington, J., *Bowes & Church's Food Values of Portions Commonly Used*, 17th edition, 1998, Lippincott, Philadelphia).
Adam Drewnowski, *Trends in Food Science & Technology*, Apr., 1992.
FDA Labeling Rules as contained in 21 CFR § 101.12.
Troller, J.A. 1980, Influence of Water Activity on Microorganisms in Foods, Food Technology, 34:76–80.
Lemon, P. (1998) Effects of exercise on dietary protein requirements, *International Journal of Sport Nutrition*, 8:426–447.
Crouse, J.R. et al., *Arch Intern Med*, 1999, 159:2070–2076 (Pike, R.L. and Brown, M.L,, 1975, *Nutrition: An Integrated Approach*, 2nd ed., Wiley, New York).
Garrison, R. and Somer, E., *The Nutrition Desk Reference*, 3rd edition, 1995, Keats Publishing, New Canaan, CT).
*The Surgeon General's Report on Nutrition and Health*, 1988, U.S. Department of Health and Human Services Publication No. 88–50210, Washington, DC.

(List continued on next page.)

*Primary Examiner*—Helen Pratt
(74) *Attorney, Agent, or Firm*—Michael Best & Friedrich LLP

(57) ABSTRACT

The present invention relates to tasty, ready-to-eat, nutritional foods that offer an alternative to appealing but unhealthy foods. More particularly, tasty, ready-to-eat, nutritional foods that provide a balanced mix of amino acids, fat, and carbohydrates are disclosed. Processes for making, and methods of using said tasty, ready-to-eat, nutritional foods are also disclosed. The nutritious foods of the present invention are formulated and processed such that they resolve the dilemma that consumers have always been faced with—healthy eating or enjoying what they eat.

50 Claims, No Drawings

OTHER PUBLICATIONS

National Research Council, 1989, *Diet and Health: Implications for Reducing Chronic Disease Risk*, The Committee on Diet and Health, National Academy Press, Washington, DC).

Glueck, C. J., Jandacek, R. J., Hogg, E., Allen, C., Baehler, L., and Tewksbury, M. (1983) Sucrose polyester: substitution for dietary fats in hypocaloric diets in the treatment of familial hypercholesterolemial. *Am. J. Clin. Nutr.* 37, 347–354) and plant sterols and plant sterol esters.

Mattson, F.H., Grundy, S.M., and Crouse, J.R. (1982) Optimizing the effect of plant sterols on cholesterol absorption in man. *Am. J. Clin. Nutr.* 35, 697–700; U.S. patent 3,751,569, B. A. Erickson.

Westrate, J.A., and Meijer, G. W. (1998) Plant sterol–enriched margarines and reduction of plasma total– and LDL–cholesterol concentrations in normocholesterolemic and mildly hypercholesterolemic subjects. *Eur. J. Clin. Nutr.* 52, 334–343).

Smith et al., "Overview of Salatrim, a Family of Low–Calorie Fats", J. Agric. Food Chem., 42:432–434, (1994).

Softly et al., "Composition of Representative Salatrim Fat Preparations", J. Agric. Food Chem., 42:461–467, (1994).

Code of Federal Regulations; 21 CFR § 101.9.

Brown, L. et al., *Am J Clin Nutr*, 1999, 69:30–42).

Anderson, J.W. and Akanji, A.O., 1993, in CRC Handbook of Dietary Fiber in Human Nutrition, 2nd edition, G.A. Spiller, ed., CRC Press.

Bruns, Biochem. Pharmacol., 30, 325–333, (1981).

Food and Nutrition Board of the National Academy of Sciences (Food and Nutrition Board, 1989, *Recommended Dietary Allowances*, 10 ed., National Research Council, National Academy of Sciences, Washington, DC.

Food and Nutrition Board, 1989; Gregory, J.F., 1996, *"Vitamins"*, in *Food Chemistry*, $3^{rd}$ ed., O.R. Fennema, ed.

*Introduction To Statistics* by Ronald E. Walpole, 3rd Edition (1982) New York, New York. pp. 24 and 35 of Chapter 2 and p. 258 of Chapter 9.

Raising the Health and Energy Bar, Food Product Design, James C. Burg (Technical Ed.), Jul. 1998.

*Dietray Fiber: A Healthy Discussion*, Food Product Design, Ronald C. Deis, Ph.D., Jan. 1999.

*Functional Foods: Figuring out the Facts*, Food Product Design, Andrea Platzman (Contributing Ed.), Nov. 1999.

*Bar Talk*, Food Product Design, Lisa Kobs (Contributing Ed.), Sep. 1999.

Giese, James, "Fats, Oils and Fat Replacers", Foot Technology, 1996, vol. 50, No. 4, pp. 78–84 XP5843139.

Fat substitutes: Finding method in the madness; Prepared Foods 1992, vol. 162, No. 13, pp. 21–24, 26–31, XP8025643.

Backer, T., Multifunktioneller FullstoffEine Weizenfaser Schafft Neue Moglichkeiten, Lebensmitteltechink, 1996, pp. 58–59, vol. 28, No. 5 Hamburg Germany. (English Translation).

* cited by examiner

TASTY, CONVENIENT, NUTRITIONALLY BALANCED FOOD COMPOSITIONS

CROSS REFERENCE TO RELATED APPLICATIONS

This application claims the benefit of U.S. Provisional Application Ser. No. 60/196,628 filed on Apr. 12, 2000, in the name of Prosise et al.

FIELD OF THE INVENTION

The present invention relates to tasty, convenient, nutritionally balanced foods that offer an alternative to appealing but unhealthy foods. Processes for making tasty, convenient, nutritionally balanced foods and methods of using said foods are also disclosed.

BACKGROUND OF THE INVENTION

It is common for foods to be convenient and tasty but unhealthy, like candy bars, cheese crackers, and similar "junk foods"; inconvenient to prepare or perishable but nutritious, like home cooked meals; or nutritious and convenient but unappealing like health foods. Unfortunately, many consumers do not have the time to obtain and prepare the correct mix of foods that will provide the balanced nutrition that their bodies require. Instead, many consumers resort to health foods, but soon find themselves replacing these unappealing foods with "junk foods".

Although "junk foods" are appealing, they have a negative impact on the physical and mental health of consumers. In particular, it is appreciated that the high fat and calorie load and low dietary fiber level of "junk foods" can contribute to obesity and many of the chronic diseases, such as coronary heart disease, stroke, diabetes, and certain types of cancer. The following list of food items highlights the significant fat content, caloric contribution from fat, and minimal dietary fiber content of many of these foods (Pennington, J., *Bowes & Church's Food Values of Portions Commonly Used*, 17th edition, 1998, Lippincott, Pa).

| Food Item | Serving Size (Grams) | Total Kcal | Grams Fat | % Kcal from Fat | Grams Fiber |
|---|---|---|---|---|---|
| Snickers Candy Bar | 61 | 292 | 15 | 46.2 | 1.5 |
| Nabisco Ritz Bits Crackers | 30 | 160 | 9.0 | 50.6 | 1.0 |
| Nabisco Peanut Butter Ritz Bits | 31 | 150 | 8.0 | 48.0 | 1.0 |
| Lance Cheese On Wheat Crackers | 37 | 181 | 9.0 | 44.8 | — |
| Lance Peanut Butter On Wheat Crackers | 37 | 192 | 11 | 51.6 | — |

To summarize, consumers face the dilemma of choosing health or satisfaction when selecting a convenient food. Since many consumers prefer satisfaction over nutrition, the benefits of unappealing but nutritious foods often go unrealized. Thus, what is needed is at least one convenient, appealing food composition having a balanced nutritional profile.

Unfortunately, the development of nutritious, convenient, appealing foods has met with numerous technical obstacles. In particular, previous attempts at producing a ready-to-eat, appealing, nutritionally balanced food composition have resulted in products that have poor taste systems due to an overall poor organoleptic appeal and appearance. The following brief summary of technical challenges illustrate why the food industry has failed to provide the public with a tasty, ready-to-eat, nutritionally balanced food.

Convenient or ready-to-eat foods tend to be nutritionally unbalanced as they are high in fat and carbohydrates, and low in dietary fiber and protein. Decreasing the level of fat and carbohydrates in a ready-to-eat food, while increasing the level of dietary fiber and protein, is known to seriously compromise a food's taste system. In fact, the literature has noted that consumers have been complaining, even if they have not been fully articulating, "that something is missing" in their low-fat, low-calorie foods. According to the literature, that something may be an opioid stimulator as an opioid-releasing effect has been correlated to combinations of sugar and fat. (Adam Drewnowski, *Trends in Food Science & Technology*, April, 1992). Drewnowski noted that high-sugar, high-fat foods figure most heavily in food cravings and overeating. Naloxone administrations reduced the appeal of such foods in a study group of binge eaters. Conversely, Drewnowski cites clinical studies linking opiate addiction (to substances like opium and heroin) to sweet cravings. Thus, it is postulated that fully duplicating the sensation of fat alone may prove a chimera until other taste stimulating components or levels and combination of components are identified.

In addition to the challenges associated with reducing fat and sugar levels, it is known that increasing a ready-to-eat food's dietary fiber and protein levels results in the loss of the desirable product texture that consumers expect—this is especially true for snack foods. The loss of desirable texture typically results in products, such as high protein and fiber health bar snacks, that are described by consumers as having an unpleasant stickiness, grittiness or dryness. Instead of improving texture, current attempts to solve textural problems merely hide unpleasant textural characteristics. Attempted solutions include coating products with materials that are high in fat and sugar, increasing flavor levels or mixtures thereof. Unfortunately, these "fixes" are only temporary, as shortly after initial bite or product breakdown, the true nature of the product's texture becomes apparent. While the loss of textural quality is appreciated by those skilled in the art, the complex interactions that give rise to poor textures are little understood. As a result, a solution to the textural problems associated with convenient, nutritionally balanced foods has remained elusive.

In addition to textural problems, it is appreciated that dietary fibers and proteins can produce objectionable off-flavors in the finished products. For example, dietary fiber sources, such as sugar beet fiber, and protein sources, such as soy flour, can cause objectionable off-flavors. Generally, off-flavors arising from components of a food are cumulative. However, with high levels of certain components, such as added protein and fibers, the resulting combination of off-flavors and poor textures may synergistically detract from a food's appeal.

Finally, due to the low fat and carbohydrate levels and higher protein and fiber levels of nutritionally balanced foods, the degrees of processing freedom for these foods are reduced. As a result, the processing challenges associated with producing tasty, nutritionally balanced foods are far greater than the challenges associated with producing conventional foods.

In summary, the need for a convenient, nutritionally balanced food composition, having an appealing taste system, has not been met. At best, the art teaches food components that must be combined with other materials, outside of their original packaging, to obtain a finished food; foods that require additional preparation, such as cooking or baking; and ready-to-eat foods that may offer, at best, only 2 of the 3 following desired food characteristics: balanced nutrition, convenience and taste. Thus, there remains a need for a convenient, nutritionally balanced food having a sufficient organoleptic appeal and appearance such that consumers will be motivated to replace unhealthy foods in their diets with said nutritionally balanced food.

Applicants have extensively researched the properties of nutritious food components, and carefully studied the eating habits and nutritional needs of consumers. As a result of Applicants' efforts, Applicants recognized the need to combine the benefits of taste, balanced nutrition and convenience. Surprisingly, despite numerous technical hurdles, Applicants have produced an array of foods that offer the above mentioned benefit package. Specific embodiments of the present invention include but are not limited to bars; potato crisps, extruded snacks, filled bars and crackers; dips; crackers and dip contained in separate compartments of a single package and cookies. In summary, since Applicants' invention combines balanced nutrition and convenience with an appealing taste system, and since consumers are more likely to consume foods that have an appealing taste system, consumers are now more likely to enjoy the health benefits that are obtained by consuming nutritious foods.

Thus, an object of the present invention is to provide a genus of convenient food compositions having balanced nutritional profiles and superior taste systems.

Another object of the present invention is to provide a subgenus of ready-to-eat snack food compositions having balanced nutritional profiles and superior taste systems.

Another object of the present invention is to provide a subgenus of ready-to-eat snack food compositions having balanced nutritional profiles, superior overall tastes and an appearance similar to or the same as snack foods.

Another object of this invention is to provide processes for making said genus and subgenera of food compositions.

Still another object of this invention is to provide methods of using said genus and subgenera of food compositions to improve the health of a mammal, particularly a human.

These and other objects will become apparent from the following detailed description.

SUMMARY OF THE INVENTION

In general, the present invention concerns a ready-to-eat food having, at a 60% confidence level, a lower taste value greater than −8.00; a water activity of less than 0.90; and comprising, on a single reference serving basis:

a.) an amino acid source that provides at least 19% of the total caloric value of said food;

b.) a fat that provides less than 30% of the total caloric value of said food; and c.) a carbohydrate that provides the balance of the total caloric value of said food and at least about 2.5 grams of dietary fiber.

The present invention also generally concerns a method for evaluating the taste system of a food product.

DEFINITIONS

As used herein, the term "taste system" means the overall consumer acceptance of a food as a result of the combination of the food's organoleptic properties and appearance.

As used herein, the term "organoleptic properties" includes the flavor display, texture, and sound of a food that are experienced by the eater of said food when said food is eaten.

As used herein, the term "organoleptic appeal" refers to the appeal of a food, to the eater of said food, arising from the flavor display, texture and sound of said food.

As used herein, "taste" refers to the flavor display and texture of a food that are experienced by an eater of said food when said food is eaten.

As used herein, the term "relative taste score" refers to the difference between the sample mean overall taste score of a test product and the sample mean overall taste score of a reference.

As used herein, the "lower taste value", of a food is the value for the lower bound for the confidence interval about the relative taste score that is generated when a product is tested according to Applicant's Taste Test Protocol 1.1.

As used herein, the "upper taste value", of a food is the value for the upper bound for the confidence interval about the relative taste score that is generated when a product is tested according to Applicant's Taste Test Protocol 1.1.

As used herein, the term "nutritionally balanced", when used to describe a food, means that a single serving or reference serving of the food provides a nutritionally desirable level of fat, protein or amino acid source, and dietary fiber. Specifically, "nutritionally balanced" foods provide a relatively low level of digestible fat (i.e., 3 g or less per 100 kcal serving and/or 30% or less of total calories from fat), are a good source of dietary protein or other amino acid source (i.e., 5 g or more per 100 kcal serving and/or 19% or more of total calories from protein), and are a good source of dietary fiber (i.e., about 2.5 g or more of dietary fiber per reference serving and/or 100 kcal serving).

As used herein, the term "single serving" means any quantity of food sold, marketed, described, advertised, or implied to be equivalent to a single serving size or unit. For example, in the U.S., single serving sizes for foods are defined in the FDA Labeling Rules as contained in 21 CFR § 101.12 which is incorporated herein by reference in its entirety.

As used herein, the term "an amino acid source" means a material containing amino acids. Said amino acid source may include or be derived from, but is not limited to, plant proteins, animal proteins, proteins from single cell organisms and free amino acids.

As used herein, the term "fat" refers to the total amount of digestible, partially digestible and nondigestible fats or oils that are present in the embodiments of the present invention.

As used herein, the terms "lipid", "fat" and "oil" are synonymous.

As used herein, the term "carbohydrate" refers to the total amount of sugar alcohols, monosaccharides, disaccharides, oligosaccharides, digestible, partially digestible and nondigestible polysaccharides; and lignin or lignin like materials that are present in the embodiments of the present invention.

As used herein, the term "dietary fiber" refers to the group of food components derived from plant material, or analogous carbohydrates, that are resistant to digestion and absorption in the human small intestine. This includes various polysaccharides, oligosaccharides, polyfructans, and lignins that are resistant to digestion. The term analagous carbohydrates in the above definition refers to carbohydrate compounds that may not be specifically derived from plant material, but that are resistant to digestion and absorption in the human small intestine (e.g., a synthetic non-digestible polysaccharide or oligosaccharide, such as polydextrose).

As used herein, the terms "total dietary fiber" and "dietary fiber" are synonymous.

As used herein, the term "ready-to-eat" is encompassed within the broader term "convenient".

As used herein, the term "ready-to-eat" when used to describe a food, means that after manufacture and packaging, the food product requires no additional processing, including but not limited to cooking, baking, microwaving, boiling, frying; or combination with components outside of the product's packaging to achieve the novel combination of balanced nutrition and taste that Applicants are claiming. However, this does not rule out that one or all of the parameters of Applicants' invention, for example, balanced nutrition, convenience and taste, may be improved when said compositions are processed further or combined with other foods. For purposes of this invention, cereals are not considered to be a ready-to-eat food.

As used herein, the term "substantially anhydrous" means having a water activity of less than about 0.3.

As used herein, the term "predominately anhydrous" means having a water activity of less than about 0.6.

As used herein, the articles a and an when used in a claim, for example, "an amino acid source" or "a fat" is understood to mean one or more of the material that is claimed or described.

As used herein, the term "active level", as it relates to the amount of desired material in an ingredient, refers to the level of the desired material in the ingredient, as measured by the methods for quantifying components of Applicants' invention, as detailed in the present application. For example, for fiber containing ingredients, the active level would be the actual percent fiber in the ingredient, as measured by the method for quantifying fiber as detailed in the present application.

Publications, patents, and patent applications are referred to throughout this disclosure. All references cited herein are hereby incorporated by reference.

All percentages and ratios are calculated by weight unless otherwise indicated. All percentages and ratios are calculated based on the total composition unless otherwise indicated.

Unless otherwise noted, all component or composition levels are in reference to the active level of that component or composition, and are exclusive of impurities, for example, residual solvents or by-products, which may be present in commercially available sources.

DETAILED DESCRIPTION OF THE INVENTION

One of the greatest tasks the food industry has faced is to provide a food that couples good taste and a balanced nutritional profile. Providing a ready-to-eat food that couples good taste and a balanced nutritional profile has proved to be an even greater challenge. Before a solution to the above referenced problems can be appreciated, one must appreciate the complex nature and interactions of product structure, composition, processing and taste systems.

Product structure results from the interaction of product composition (formulation) and the process type and settings used to produce the product. The macro structures of foods vary and may contain one or more distinct phases or structures. For example, a crumb phase or structure (i.e. cracker, cookie, snack chip), a fluid phase or structure (i.e. fruit filling, confectionery, savory lubricious cheese filling, peanut butter), or a semi-solid phase or structure (i.e. chocolate, confections). Crumb structures may be solid (having no or minimal internal voids—potato chip), semi-cellular (randomly spaced and shaped internal voids—cookies), cellular (symmetrical shapes uniformly dispersed—corn curl), or layered (internal voids between distinct layers—crackers).

Fluid and semi-solid structures may be either oil or water continuous, and may be a dispersion (oil and water mixed together but not emulsified), a colloidal suspension (solid particles), an emulsion (oil and water present as discrete droplets as a single or double emulsion), or be air entrained (aerated). The rheology of these structures may be of a complex non-newtonian nature, and is influenced by the viscosity of the continuous phase and the size, shape and quantity of the dispersed phase. Regardless of the actual structure of a food, slight deviations from the structure that the consumer expects, such as soft rather than crisp potato chips, can result in an unappealing product.

It is also appreciated that the process and process settings that are used in producing a food have a great impact on the food's structure and thus the appeal of its taste system. Processes that may be used to produce foods include but are not limited to baking, frying, laminating and extruding. Examples of the complexities associated with process and process setting selections used to produce conventional foods include: the proper selection of heating levels and times during baking or frying to produce a crumb having an appealing texture; sufficiently laminating a dough to create a layered structure; and obtaining the desired cellular structure during an extrusion process, a process wherein the composition is cooked under high pressure and the structure is formed as the product expands as it exits the atmospheric end of the extruder. Unfortunately, due to the low fat and carbohydrate levels and higher protein and fiber levels of nutritionally balanced foods, the degrees of processing freedom for these foods are reduced. As a result, the processing challenges associated with producing tasty, nutritionally balanced foods are far greater than the challenges associated with producing conventional foods.

Finally, the quality of a consumer's eating experience and, thus the effectiveness of a food's taste system, is dependent on the food's organoleptic properties and visual appeal, which in turn are dependent on the product's composition, structure and processing. Although a food's taste system comprises organoleptic properties and visual appeal, taste alone is generally thought to consist of product texture and flavor display.

The eating experience is typically thought to comprise several stages consisting of initial bite, initial breakdown, continuous breakdown, and swallowing. When a food is eaten, texture and flavor display are time and eating stage dependent as the mouth, over time, adds varying amounts of mechanical energy, hydration, aeration and thermal energy. During the eating experience the consumer experiences one or more of the following textural sensations: hardness; crispiness/crunchiness; dryness and grittiness/graininess. The change in these textural sensations with time is known as mouth melt. One of the greatest challenges in designing a taste system for a nutritionally balanced food is to design a mouth melt that the consumer associates with a particular food form. For example, consumers expect health bar products to be soft and non-gritty much like a bakery item, however, current health bars that are high in fiber tend to be, in addition to their other drawbacks, gritty or grainy In addition to textural considerations, flavor display is an important part of any taste system. Flavor display results from the time dependent combination of olfactory and gustatory sensations, thus it is closely tied to a product's mouth melt. Olfactory flavors are usually comprised of many individual chemical compounds, which must be transferred into the mouth's headspace before they can be sensed by the olfactory system.

Gustatory flavors are detected by sensors on the mouth's surface as sweet, salty, bitter, or sour. Other gustatory sensations may include metallic and capsaicin (hot/spicy). In a solid food structure, sensations, such as sweet and salty, require particle dissolution before the sensations can be detected. Thus, these sensations are nearly instantaneously detected in beverages as the sugars and salts are already in solution. Consequently, designing taste systems for beverages may be an easier task as the materials that can mask off-flavors are instantaneously sensed, while off-flavors may take time to develop.

To summarize, the literature indicates that many of the levers and variables that are required to design effective taste systems for foods have yet to be discovered. As a result, the challenge of designing effective taste systems for nutritionally balanced foods is even greater as the degrees of design and processing freedom are reduced since components that can enhance taste, such as fats and carbohydrates, may need to be minimized, while materials that provide health benefits, such as fibers, proteins, vitamins and minerals typically need to be delivered at taste detracting levels. Thus, in order to arrive at their invention, Applicants had to discover or recognize the levers and variables of effective taste systems, and the manner in which these levers and variables interact.

TASTE SYSTEM DESIGN

An effective taste system is generally the key variable that determines the consumption level of a product. In fact, even if a product can impart long-term health benefits, a satisfactory taste system is generally the key to consumers' use of the product. Yet, all too often, the design of a product's taste system is incomplete or two-dimensional at best as "taste" represents complex perceptions that interpret chemical, physiological and psychological clues into the "likes" and "dislikes" of the foods we eat.

It is appreciated by those skilled in the art that designing an effective taste system is a multidimensional challenge as the overall taste of a product results, at a minimum, from the combination of the product's organoleptic properties and visual appeal, which are dependent on the product's composition, structure and processing. In the "nutritionally balanced foods" arena, the challenge of designing an effective taste system is even greater as components that can enhance taste, such as fats and carbohydrates, may need to be minimized, while materials that provide health benefits, such as fibers, proteins, vitamins and minerals may need to be delivered at taste detracting levels in order to deliver a benefit or to meet regulatory requirements.

Surprisingly, despite numerous technical hurdles, Applicants have produced an array of foods that offer the combined benefits of taste, balanced nutrition and convenience. The teachings required to produce and use these new and beneficial food items are detailed below.

Water Activities

Embodiments of Applicants' invention have water activities that are less than or equal to 0.90. Other embodiments of Applicants' invention are "non-perishable", thus they have water activities that are sufficiently low to prevent the growth of most pathogenic and spoilage bacteria; i.e., a water activity less than 0.85 (Troller, J. A. 1980, Influence of Water Activity on Microorganisms in Foods, Food Technology, 34:76–80; Troller, J. A. 1989, Water Activity and Food Quality, in "Water and Food Quality", T. M. Hardman, ed., pg. 1–31). Preferably, embodiments of Applicants' invention have water activities low enough to control or prevent the growth of yeasts and molds; i.e., a water activity less than 0.80, more preferably less than 0.75, and most preferably less than 0.70.

Nutritional Components

The additional dietary fiber and protein that is added to food formulations, to achieve a balanced nutritional profile, can adversely affect the resulting food's taste system. To avoid these adverse effects, special care must be taken in the formulation and process.

Applicants have extensively researched the properties of nutritious food components. From these efforts, Applicants have developed guidelines, for formulating and processing nutritionally balanced foods, that teach one skilled in the art how to produce an array of ready-to-eat, nutritionally balanced foods having superior taste systems. These guidelines are directed to material selection and placement in said ready-to-eat, nutritionally balanced foods.

The high level of nutritional ingredients that are required to produce a nutritionally balanced food displaces other ingredients, such as fat and carbohydrates that are normally required to produce a product having an effective taste system. The loss of fat and carbohydrates, coupled with the increased protein and fiber typically results in a product having a poor overall taste. However, the impact of the increased protein and fiber can be minimized by selecting proteins and fibers that are as functionally similar as possible to the replaced fat and carbohydrate. For example, when a soluble dietary fiber is used in a filling, care should be taken to select a fiber having similar properties (particle size, dissolution rate, thickening effect, etc.) as the sugar the fiber is replacing.

Although attempting to match the functionality of an ingredient that is being replaced improves a food's taste system, the food's taste system can be further improved by the combination of minimizing the addition of nutritional ingredients and selecting nutritional ingredients that have minimal effects on flavor. Applicants have discovered that nutritional ingredients, particularly fiber and protein sources, that have active levels of at least 75% are preferred. Also, the proper use of process and formulation aids can improve a food's taste system. However, with nutritionally balanced foods, the proper use of process and formulation aids is more important as high protein and fiber levels reduce the degrees of processing freedom. By way of example, as flour is reduced, the elasticity and handling properties of dough and thus its processability diminishes. Here, gluten may be added to restore the processability of the dough as gluten is the primary component of flour that gives dough its elasticity and handling properties. Also, concentrated flavor sources may be added to restore flavor lost due to the reduction of flavor components such as cheese powders.

Finally, Applicants have surprisingly discovered that the positioning of ingredients in a nutritionally balanced food can dramatically impact taste. For example, dietary fiber sources generally have less of a negative effect on a filling than on a crumb structure. Likewise, nutritional protein sources generally function better in the crumb structure than the filling. While not being bound by theory, possible explanations for these phenomena include: that proteins are more like components predominately found in the crumb and that soluble dietary fibers are more like components, such as sugars, that are predominately contained in fillings. Also, Applicants have discovered that if a nutritionally balanced food is designed to have a filling, it is best to place as much of the food's vitamins and minerals as possible in the food's filling structure. In summary, Applicants have discovered that when a product has 2 or more phases, the negative impact of gritty ingredients can be minimized by positioning them in the crumb; it is best to position heat sensitive materials, such as vitamins, in the phase that will experience the least degree and duration of thermal energy; and hydrophilic ingredients should be positioned in the most water continuous phase as this will minimize any negative taste impacts arising from the introduction of the hydrophilic ingredients to the product.

Amino Acid Source

An amino acid source is necessary to build and maintain muscle, blood, skin, and other tissues and organs, as well as for the formation of protein antibodies that are part of the immune system. The FDA has specified the Daily Reference Value for protein as 50 g/day (based upon a 2,000 kcal/day diet) and foods that provide at least 5 g protein per serving may be claimed as a "good source" of protein. Since athletes have higher protein requirements than sedentary individuals, the protein recommendations for athletes are approximately 1.5–2.0 times the Recommended Daily Allowance (RDA). See: Lemon, P. (1998) Effects of exercise on dietary protein requirements, *International Journal of Sport Nutrition*, 8:426–447. Due to the high levels of protein that athletes require and the off-flavors of protein supplements, a ready-to-eat, tasty, nutritionally balanced protein source is especially desired by these individuals.

While protein intakes are generally considered adequate in the United States and other modern countries, products having increased protein levels can be used to reduce fat intake as high protein products are typically low in fat. In addition, increased consumption of certain vegetable proteins, such as soy protein, may be desirable due to a hypocholesterolemic effect (Crouse, J. R. et al., *Arch Intern Med*, 1999, 159:2070–2076). Also, in many less developed countries protein deficiency, particularly among children, is still a significant nutritional concern. Protein or amino acid deficiency can result in impaired growth and tissue development. Serious protein deficiency in children can result in symptoms which include lack of growth, dermatitis, fatty liver, changes in the texture and pigmentation of hair, and diarrhea with resulting electrolyte loss (Pike, R. L. and Brown, M. L. 1975, *Nutrition: An Integrated Approach*, 2nd ed., Wiley, N.Y.).

Although increasing a food's protein level can increase the health benefits of the food, increased protein levels detract from a food's taste and texture. For example, highly concentrated protein sources in crumb structures can increase structural formation resulting in excessive hardness. In general, harder structures are more difficult to break down than softer structures, which results in negative mouth melt and flavor display properties during mastication. Also, some protein sources can influence dough-handling properties such as stickiness, which can impede processing the food form. Some nutritional protein sources effect water absorption and can effect dough properties and baking/frying properties. Unfortunately, the current art appears to be devoid of teachings as to the solutions to the type problems that are associated with the addition of high levels of proteins or amino acids to foods.

Applicants have extensively researched the properties of protein sources. From this research Applicants have noted certain trends in the use of protein sources in the formulation and production of ready-to-eat, nutritionally balanced foods. For example, it has been found that the use of egg white protein in place of soy isolate protein, at about a 10% level, in a cracker dough of this invention, results in a dough so sticky it is nearly impossible to handle in the process. However, the dough is made processable by reducing its water level by up to about 50%. The finished cracker product using egg white protein and reduced water, versus the soy isolate formulated product, results in a noticeably harder texture and slower mouth melt. Likewise, up to 50% less water is required to maintain processability in a formulation wherein whey isolate protein replaces soy isolate. Also, it should be noted that blends of proteins are preferred as they can actually enhance the dough's processability, and product's taste. For example, a blend of about 2.6 ratio soy isolate to whey isolate (9–11% total added protein, and about 20% added water), results in a dough formulation that processes very well, and a product having a good texture and mouth melt.

In addition to the dough formulation and processing teachings detailed above, Applicants have discovered that some nutritional protein sources produce more noticeable off-flavors when used in fillings. For, example it has been found that whey protein isolate has much less impact on flavor quality in a cheese filling than a similar amount of soy isolate protein. Applicants also discovered that the impact on flavor quality does not seem as apparent when these protein sources are used in a crumb structure. While not being bound by theory, it is thought that off-flavors imparted by ingredients are more noticeable in a lubricious fluid filling than in a baked solid or semi-solid crumb structure. In summary, care should be taken to either select protein sources that do not negatively effect flavor quality of the filling, or to include the protein source in the crumb formulation.

From Applicants' research efforts, Applicants have determined that amino acid sources that can be used to produce the nutritional compositions of the present invention may include or be derived from, but are not limited to, plant proteins, animal proteins, proteins from single cell organisms, free amino acids and mixtures thereof. Non-limiting examples of useful plant derived proteins include: seed proteins that are isolated or derived from legumes, such as soybeans, peanuts, peas and beans; cereal proteins isolated or derived from cereal grains, such as wheat, oats, rice, corn, barley and rye; and mixtures thereof. Non-limiting examples of useful seed proteins include materials selected from the group consisting of soy flour, soy protein concentrate, soy protein isolate, peanut flour and mixtures thereof. Non-limiting examples of useful cereal proteins include materials selected from the group consisting of wheat flour, wheat protein concentrate and mixtures thereof.

Non-limiting examples of useful animal-derived proteins include, milk proteins that are isolated or derived from bovine milk; muscle tissue proteins that are isolated or derived from mammals, reptiles or amphibians; connective tissue proteins, egg proteins isolated or derived from eggs or components of eggs; and mixtures thereof. Non-limiting examples of useful milk proteins include caseins, such as sodium caseinate and calcium caseinate; and whey proteins, such as beta-lactoglobulin and alpha-lactalbumin. These milk proteins may be derived from whole milk, skim milk, nonfat dry milk solids, whey, whey protein concentrate, whey protein isolate, caseinates, and mixtures thereof. Non-limiting examples of useful connective tissue proteins include collagen, gelatin, elastin and mixtures thereof.

Additional useful proteins include proteins that are isolated or derived from single cell microorganisms, including but not limited to, yeast, bacteria, algae and mixtures thereof; and free amino acids, in particular essential amino acids that can be added to enhance overall protein quality.

Embodiments of Applicants' invention have at least 19% of their total caloric value derived from one or more amino acid sources, in other embodiments from 19% to 50% of the invention's total caloric value is derived from one or more amino acid sources. In still other embodiments, from 19% to 30% of the invention's total caloric value is derived from one or more amino acid sources and in still other embodiments, from 19% to 25% of the invention's total caloric value is derived from one or more amino acid sources.

Preferred amino acid sources are proteins having active levels of at least 75% and minimal taste impacts on the final food product. Examples of preferred proteins include: soy protein isolates such as Supro® 661 which has an 85% active level and which is supplied by Protein Technologies of St. Louis, Mo. USA; whey protein isolates such as BiPRO which has an 95% active level and which is supplied by Davisco Foods Int. Inc. of Le Sueur, Minn. USA and egg whites such as Type P-110 (#407) which has an 80% active level and which is supplied by Henningsen Foods, Inc. of Rye Brook, N.Y. USA.

Embodiments of Applicants' invention have an amino acid chemical score greater than 0. In other embodiments of the invention, the amino acid chemical score ranges from 0.60 to 1.00 and in still other embodiments the amino acid chemical score ranges from 0.75 to 1.00. In still other embodiments of the invention the amino acid chemical score ranges from 0.85 to 1.00. Amino acid sources rich in specific amino acids are particularly useful as they can provide the additional benefit of increasing the overall protein quality or amino acid chemical score of a food composition. For example, because peanut protein contains a low lysine level, embodiments of Applicants' invention containing a peanut butter filling may be fortified with an additional amino acid source rich in lysine, such as whey protein, which results in a product having an amino acid score of 1.00.

Fat

The American diet currently averages approximately 34% of total caloric intake from fat and approximately 12% of calories from saturated fat (Garrison, R. and Somer, E., *The Nutrition Desk Reference*, 3rd edition, 1995, Keats Publishing, New Cannan, Conn.). Dietary fat intake is important because of the relationship between excessive fat and calorie intake to obesity and the incidence of certain chronic diseases, such as coronary heart disease, stroke, diabetes, and certain types of cancer, that are among the leading causes of death in the United States and other industrialized countries (*The Surgeon General's Report on Nutrition and Health*, 1988, U.S. Department of Health and Human Services Publication No. 88–50210, Washington, D.C.; National Research Council, 1989, *Diet and Health: Implications for Reducing Chronic Disease Risk*, The Committee on Diet and Health, National Academy Press, Washington, D.C.). The level of dietary fat intake, particularly saturated fat and cholesterol, is strongly linked to the risk of cardiovascular disease and mortality from coronary events. In addition, research has demonstrated a relationship between the level of total fat and saturated fat consumption and the risk of cancers of the digestive tract and endocrine system (e.g., colorectal, breast, and prostate cancers) (Garrison and Somer, 1995).

Based on the relationship between fat intake and the chronic diseases mentioned above, various professional health organizations (e.g. American Heart Association; American Cancer Society; National Cancer Institute; United States Department of Agriculture) have proposed dietary guidelines stating that the percent of total caloric intake from fat be reduced to less than 30% and the percent of calories from saturated fat decreased to less than 10%. This translates to approximately 3 g or less of digestible fat and 1 g or less of digestible saturated fat per 100 kcal of energy intake.

Embodiments of Applicants' invention have less than 30% of their total caloric value derived from one or more fats; in other embodiments, from 2% to 27% of each embodiments' total caloric value is derived from one or more fats; in still other embodiments, from 10% to 27% of each embodiment's total caloric value is derived from one or more fats; and in still other embodiments, from 15% to 27% of each embodiments' total caloric value is derived from one or more fats.

Additional embodiments of Applicants' invention have less than 18% of their total caloric value derived from one or more saturated fats; in other embodiments, from 1% to 9% of each embodiments' total caloric value is derived from one or more saturated fats; in still other embodiments, from 3% to 9% of each embodiments' total caloric value is derived from one or more saturated fats; and in still other embodiments, 5% to 9% of each embodiments' total caloric value is derived from one or more saturated fats.

In order to meet the low-fat requirements for a balanced nutritional profile, the digestible fat levels of most foods must be reduced significantly. However, low levels of fat in a crumb structure result in a very dry product during mastication. Also, in an anhydrous (oil continuous) filling, low fat formulations result in very dry, stiff fillings, with poor mouth melt. When the digestible fat level of a product is reduced, the product's texture and taste can be improved by replacing the digestible fat with non-digestible lipids, partially digestible lipids or mixtures thereof on a weight percent to weight percent basis. When the use of non-digestible lipids, partially digestible lipids or mixtures thereof is precluded by regulatory or processing concerns, water continuous fillings, such as fruit fillings having water activities of less than 0.80 may be used to enhance lubricity and thus the texture and taste of the product. For example, the taste system of a filled bar, wherein the crumb contains less than 3.0 grams of triglyceride fat per serving, can be improved by selecting a water continuous filling. When a non-perishable product is desired, it is preferred that the filling's water activity be sufficiently low to prevent the growth of most pathogenic and spoilage bacteria.

When water based fillings cannot be used, and the product is substantially anhydrous, the product's taste may be substantially improved by a continuous phase that comprises a glassy structure below its transition point. It is preferred that the glassy structure comprise sugars, polysaccharides and mixtures thereof, rather than starches that have a fast mouth melt. For example, a snack crisp structure is formed by a non-traditional composition that is low in fat, and high in protein and dietary fiber. The snack crisp contains none of the traditional structure forming components such as flour or starches. It is based on a continuous phase of an amorphous glass that is interrupted by particles of dietary fiber and protein isolates. These normally unpalatable ingredients are enclosed within an amorphous glass structure having a crispy-crunchy texture and a quick mouth melt. The amorphous glass may be formed by a variety of sugars or maltodextrin combinations. The resulting forms range from very sweet to savory. Flavors and "bits" may be added topically, or be contained within the structure. The snack crisp structure may be attained by baking, or by extrusion, followed by a baking or drying step. The snack crisp provides a tasty, nutritionally balanced food that is capable of contributing high levels of dietary fiber and protein to a diet.

Fats that can be used to produce the nutritional compositions of the present invention may include or be derived from, but are not limited to, vegetable oils and fats, lauric oils and fats, milk fat, animal fats, marine oils, partially-digestible and nondigestible oils and fats, surface-active lipids and mixtures thereof. Useful vegetable oils and fats include, but are not limited to, triacylglycerols based on C18 unsaturated fatty acids such as oleic acids, linoleic acids, linolenic acids and mixtures thereof. Non-limiting examples of useful unhydrogenated, partially-hydrogenated and fully-hydrogenated vegetable oils include oils derived or isolated from soybeans, safflowers, olives, corn, cottonseeds, palm, peanuts, flaxseeds, sunflowers, rice bran, sesame, rapeseed, cocoa butter and mixtures thereof.

Useful lauric oils and fats include, but are not limited to, triacylglycerols based on lauric acid having 12 carbons. Non-limiting examples of useful lauric oils and fats include coconut oil, palm kernel oil, babassu oil and mixtures thereof.

Useful animal fats include, but not are not limited to, lard, beef tallow, egg lipids, intrinsic fat in muscle tissue and mixtures thereof.

Useful marine oils include, but are not limited to, triacylglycerols based on omega-3 polyunsaturated fatty acids such as docosahexanoic acid C22:6. Non-limiting examples of useful marine oils include menhaden oil, herring oil and mixtures thereof.

Useful partially-digestible and non-digestible oils and fats include, but are not limited to, polyol fatty acid polyesters, structured triglycerides, plant sterols and sterol esters, other non-digestible lipids such as esterified propoxylated glycerin (EPG), and mixtures thereof. Useful polyol fatty acid polyesters include, but are not limited to, sucrose polyesters, which are sold under the trade name of Olean™ by the Procter & Gamble Company of Cincinnati, Ohio U.S.A. Non-limiting examples of useful structured triglycerides include caprenin, salatrim and mixtures thereof. Non-limiting examples of useful plant sterols and sterol esters include sitosterol, sitostanol, campesterol and mixtures thereof.

Partially-digestible and non-digestible oils and fats are particularly useful as they impart little or no calories to a food product and can impart a hypocholesterolemic capability to foods that incorporate said fats and oils. Examples of partially-digestible and non-digestible oils and fats that can provide a food with a hypocholesterolemic capability include, by way of example, sucrose polyesters which are sold under the trade name of Olean™ by the Procter & Gamble Company of Cincinnati, Ohio U.S.A. (See e.g., Glueck, C. J., Jandacek, R. J., Hogg, E., Allen, C., Baehler, L., and Tewksbury, M. (1983) Sucrose polyester: substitution for dietary fats in hypocaloric diets in the treatment of familial hypercholesterolemial. *Am. J. Clin. Nutr.* 37, 347–354) and plant sterols and plant sterol esters (See Mattson, F. H., Grundy, S. M., and Crouse, J. R. (1982) Optimizing the effect of plant sterols on cholesterol absorption in man. *Am. J. Clin. Nutr.* 35, 697–700; U.S. Pat. No. 3,751,569, B. A. Erickson, Clear cooking and salad oils having hypocholesterolemic properties); Westrate, J. A., and Meijer, G. W. (1998) Plant sterol-enriched margarines and reduction of plasma total- and LDL-cholesterol concentrations in normocholesterolemic and mildly hypercholesterolemic subjects. *Eur. J. Clin. Nutr.* 52, 334–343).

The preferred nondigestible lipid is Olean™, which is sold by the Procter & Gamble Company of Cincinnati, Ohio U.S.A. Preferred partially digestible lipids are structured triglycerides comprising a combination of fluid chain fatty acids (i.e., short-chain saturated or unsaturated fatty acids) with long-chain, saturated fatty acids (chain lengths of C18–C24). An example of a partially digestible lipid is caprenin (Procter & Gamble Company, Cincinnati, Ohio, U.S.A.), which is a structured triglyceride comprised of octanoic acid (C8:0), decanoic acid (C10:0), and behenic acid (C22:0). Other examples are the reduced calorie triglycerides described in U.S. Pat. No. 5,419,925 (Seiden et al., assigned to The Procter & Gamble Company, Cincinnati, Ohio, U.S.A.), which are triglycerides comprised of short chain-length, saturated fatty acids (C6:0–C10:0) and long chain-length, saturated fatty acids (C18:0–C24:0). Another example of partially digestible lipids are the salatrim family of low calorie fats developed by the Nabisco Foods Group (East Hanover, N.J.). The salatrim low-calorie fats are triglycerides comprised of short chain fatty acid residues (C2:0–C4:0) and long chain, saturated fatty acids (C16:0–C22:0); see Smith et al., "Overview of Salatrim, a Family of Low-Calorie Fats", *J. Agric. Food Chem.*, 42:432–434, (1994); and Softly et al., "Composition of Representative Salatrim Fat Preparations", *J. Agric. Food Chem.*, 42:461–467, (1994). Salatrim is available under the brand name, Benefat™, from Cultor Food Science (Ardsley, N.Y.). Benefat™ is a specific component of the salatrim family, comprising acetic (C2:0), proprionic (C3:0), butyric (C4:0), and stearic (C18:0) acids.

Useful surface active lipids are amphiphilic molecules that may be purposefully added to food compositions for their functional performance or to enhance processability. Although these ingredients are adjunct ingredients, they will be detected as digestible fat by Applicants' analytical methods. Examples of surface active lipids are emulsifying agents, which are surface active lipids that stabilize oil-in-water or water-in-oil emulsions by orienting at the oil/water interface and reducing the interfacial tension; and foaming agents, which are surfactants that orient at the gas-water interface to stabilize foams. Surface active lipids may also be added as an inherent component of a food ingredient, such as the phospholipids found in soybean oil and egg yolks (e.g., lecithin). In addition, surface active lipids may be formed in the food as a result of the processing. For example, free fatty acids are formed in frying oils as a result of hydrolysis of the triglycerides and these fatty acids will be transferred to the fried food along with the oil that is transferred to the food.

Useful surface-active agents include, but are not limited to, free fatty acids, monoglycerides, diglycerides, phospholipids, sucrose esters, sorbitan esters, polyoxyethylene sorbitan esters, diacetyl tartaric acid esters, polyglycerol esters and mixtures thereof.

Carbohydrate

As used herein, the term "carbohydrate" refers to the total amount of sugar alcohols, monosaccharides, disaccharides, oligosaccharides, digestible, partially digestible and non-digestible polysaccharides; and lignin or lignin like materials that are present in the embodiments of the present invention.

Carbohydrates that can be incorporated into the present invention may include, but are not limited to, monosaccharides, disaccharides, oligosaccharides, polysaccharides, sugar alcohols and mixtures thereof. Non-limiting examples of useful monosaccharides include: tetroses such as erythrose; pentoses such as arabinose, xylose, and ribose; and hexoses such as glucose (dextrose), fructose, galactose, mannose, sorbose and tagatose.

Non-limiting examples of useful disaccharides include: sucrose, maltose, lactose and cellobiose.

Non-limiting examples of useful oligosaccharides include: fructooligosaccharide; maltotriose; raffinose; stachyose; and corn syrup solids (maltose oligomers with n=4–10).

Useful polysaccharides include, but are not limited to, digestible polysaccharides and non-digestible polysaccharides. Non-limiting examples of useful digestible polysaccharides include starches that are isolated or derived from cereal grains, legumes, tubers and roots; maltodextrins obtained by the partial hydrolysis of starch; glycogen and mixtures thereof. Non-limiting examples of useful starches include flours from cereals, legumes, tubers and roots; native, unmodified starches, pre-gelatinized starches, chemically modified starches, high amylose starches, waxy starches; and mixtures thereof.

Useful non-digestible polysaccharides may be water-soluble or water-insoluble. Non-limiting examples of useful water-soluble or predominately water-soluble, non-digestible polysaccharides include: oat bran; barley bran; psyllium; pentosans; plant extracts such as pectins, inulin, and beta-glucan soluble fiber; seed galactomannans such as guar gum, and locust bean gum; plant exudates such as gum arabic, gum tragacanth, and gum karaya; seaweed extracts such as agar, carrageenans, alginates, and furcellaran; cellulose derivatives such as carboxymethylcellulose, hydroxypropyl methylcellulose and methylcellulose; microbial gums such as xanthan gum and gellan gum; hemicellulose; polydextrose; and mixtures thereof. Non-limiting examples of water-insoluble, and predominately water-insoluble, non-digestible polysaccharides include cellulose, microcrystalline cellulose, brans, resistant starch, and mixtures thereof.

Useful sugar alcohols include, but are not limited to, glycerol, sorbitol, xylitol, mannitol, maltitol, propylene glycol, erythritol and mixtures thereof.

Fiber

Dietary fiber comprises the food components derived from plant material, or analogous carbohydrates, that are resistant to digestion and absorption in the human small intestine. This includes various polysaccharides, oligosaccharides, polyfructans, and lignins that are resistant to digestion. The term analogous carbohydrates refers to carbohydrate compounds that may not be specifically derived from plant material, but that are resistant to digestion and absorption in the human small intestine (e.g., a synthetic non-digestible polysaccharide or oligosaccharide, such as polydextrose). Many fiber constituents are carbohydrates, such as cellulose, hemicellulose, pectin, guar gum and beta-glucan soluble fiber. Lignin, a component of the woody structure of plants, is not considered a classical carbohydrate; however, it is non-digestible and is included in the measurement of total dietary fiber. Thus, for purposes of Applicants' invention, lignin and lignin like materials are classified as carbohydrates.

Dietary fibers may be further classified into water-soluble (e.g., pectin, guar, beta-glucan soluble fiber) and insoluble (e.g., cellulose) fractions. The current average intake of dietary fiber in the United States is approximately 10 g/day. Recommendations from health professionals are to increase consumption of fiber-rich foods in order to achieve a daily fiber intake of approximately 25–35 grams (Garrison and Somer, 1995). The United States Food and Drug Administration (FDA) has specified the Daily Reference Value for dietary fiber for use on food labels as 25 g/day (based upon a 2,000 kcal/day diet) (Code of Federal Regulations; 21 CFR §101.9). Foods that provide at least 2.5 g dietary fiber per serving may be claimed as a "good source" of fiber. A high fiber intake is believed to be beneficial for reducing the risk of cardiovascular diseases, colorectal cancer, constipation, diverticulosis, and other gastrointestinal disorders. For example, certain soluble fibers such as pectin, guar gum, psyllium, and beta-glucan soluble fiber have been shown to provide heart health benefits by reducing serum total and low-density lipoprotein (LDL) cholesterol (Brown, L. et al., Am J Clin Nutr, 1999, 69:30–42). While not being limited by theory, the mechanism for this effect is believed to be related to soluble fiber's impact on viscosity of the digesta in the small intestine; i.e., a significant increase in digesta viscosity reduces the reabsorption of bile acids. In addition, certain soluble fibers are partially or completely fermented by microorganisms in the large intestine, producing short-chain fatty acids (acetic, propionic, butyric acids) which are absorbed and may provide an inhibitory effect on cholesterol synthesis in the liver. Again, while not being limited by theory, high fiber diets, particularly those high in insoluble fiber, are believed to reduce the incidence of colon and rectal cancers by promoting an increased transit rate of potential carcinogens through the intestinal tract, diluting the concentration of carcinogenic agents through increased water retention in the stool, and possibly by binding toxic compounds and promoting their elimination.

Furthermore, choosing a diet that is moderate in sugar content was one of the recommendations in the most recent publication of Dietary Guidelines for Americans (U.S. Department of Agriculture, 4th edition, 1995). An individual can reduce their sugar intake by eating protein and dietary fiber enriched foods, as the percentage of carbohydrates, and possibly simple sugars, in these foods is reduced. Protein and fiber enriched foods may also benefit diabetics as they must carefully monitor their total carbohydrate intake. Thus, protein and fiber-enriched foods that are relatively low in total carbohydrate content may be a useful addition to their overall dietary plan. An elevated fiber content also benefits diabetics by helping manage blood glucose levels (glycemic control) and postprandial insulin levels (Anderson, J. W. and Akanji, A. O., 1993, in CRC Handbook of Dietary Fiber in Human Nutrition, 2nd edition, G. A. Spiller, ed., CRC Press).

Thus, based on the previous detailed description of the health benefits of dietary fibers, it is clear that a nutritionally balanced food must contain, as do embodiments of Applicants' invention, at least about 2.5 grams of dietary fiber per reference serving. Other embodiments of Applicants' invention contain from about 2.5 grams to about 5.0 grams of dietary fiber per reference, while still other embodiments of Applicants' invention contain about 2.5 grams to about 3.5 grams of dietary fiber per reference serving.

The dietary fiber used in Applicants' invention comprises from 0% to 100% by weight soluble dietary fiber and from 0% to 100% by weight insoluble dietary fiber. In certain embodiments of Applicants' invention, said dietary fiber comprises from 50% to 100% by weight soluble dietary fiber and from 0% to 50% by weight insoluble dietary fiber. In still other embodiments of Applicants' invention, said dietary fiber comprises from 70% to 100% by weight soluble dietary fiber and from 0% to 30% by weight insoluble dietary fiber.

Although dietary fiber is a critical component of a nutritionally balanced food, dietary fiber can have adverse effects on taste due to off-flavors that are inherent in fiber sources and the negative textural properties that dietary fiber sources can impart to foods. This is particularly true when fat is replaced with dietary fiber. As a result of Applicants' work, Applicants have discovered that the off-flavors that dietary fibers impart can be minimized by selecting fiber sources having high active levels—active levels of at least 75% are preferred. Also, Applicants have discovered that, for insoluble dietary fibers, key levers affecting taste are particle size and water absorption. Applicants have determined that, in order to avoid producing finished foods having gritty textures, insoluble dietary fibers having particle sizes of less than about 150 microns, and more preferably less than about 50 microns, should be used. In addition, in order to avoid dryness due to saliva absorption during mastication, it is preferred that the water absorption of insoluble dietary fibers be less than about 7.0 grams water per gram of fiber and most preferably less than about 3.5 grams of water per gram of fiber. Examples of insoluble dietary fibers having an active level of at least 75%, a particle size less than 150 microns, preferably less that 50 microns and a water absorption of less than about 7.0 grams water per gram of fiber include: Vitacel® wheat fiber WF-600/30 from J. Rettenmaier & Sohne Gmbh+Co. of Ellwangen/J., Federal Republic of Germany and Centara III pea fiber which can be obtained from Parrheim Foods Portage La Prairie, Manitoba, Canada.

In addition to researching insoluble dietary fibers, Applicants have researched soluble dietary fibers. As a result of this research, Applicants have discovered that, when soluble dietary fibers are in the presence of liquids like saliva, the key lever affecting taste is viscosity. Many dietary fibers have considerable thickening effects when combined with water/saliva. Thickened fillings or thickening that occurs during mastication can produce unpleasant textures, slow mouth melts, and slow the rate of flavor display. In order to avoid undesired thickening, a viscosity effect similar to that of sucrose is preferred. Thus, the viscosity at 25° C. should be less than about 1–2 centipoise for a 10% solution, and less than about 200 centipoise for a 50% solution. It is also preferable that the viscosity remain close to Newtonian. Soluble dietary fibers having an active level of at least 75% and a viscosity effect that is similar to sucrose include: maltodextrin dietary fibers such as Fibersol 2 which has an active level (total dietary fiber) of 85% and a viscosity of ~1.5 cp for a 10% solution and which can be obtained from Matsutani Chemical Industry C., Ltd. of Itam-city Hyogo, Japan; and arabinogalactan dietary fibers such as Fiberaid® which has an active level (total dietary fiber) of 85% and a viscosity of ~2.0 cp for a 10% solution and which can be obtained from Larex Inc. of White Bear Lake, Minn.

Oat bran dietary fiber, such as Oatcor Oat Bran Concentrate (The Quaker Oats Co. Chicago, Ill.) which is rich in beta-glucan soluble fiber (11.5%), is another preferred fiber as it can provide a heart health/cholesterol lowering benefit when present at a level sufficient to provide 0.75 g beta-glucan soluble fiber per 40 gram serving level. The amount of oat bran dietary fiber needed to provide 0.75 g beta-glucan soluble fiber per 40 gram serving level can be determined by determining the amount of beta-glucan soluble fiber per mass unit of oat bran dietary fiber, using the beta-glucan soluble fiber analysis method found in Applicants' Analytical Protocols. Once the amount of beta-glucan soluble fiber per mass unit of oat bran dietary fiber is known, one skilled in the art can calculate how much oat bran dietary fiber to incorporate in a product to achieve the desired level of beta-glucan soluble fiber.

Applicants have also discovered that, for soluble dietary fibers in predominately anhydrous foods, key levers affecting taste are particle size, water absorption, and dissolution rates. If the dissolution rate, which is analogous to the rate of hydration, is too slow, soluble fibers having particle sizes greater than 50 microns and most particularly from 50 to 200 microns, will impart a gritty, dry texture to foods—these undesirable textural characteristics are especially noticeable when the fiber is used at a level of more than about 1 gram per serving, and most particularly noticeable above about 2.5 grams per serving. Soluble fibers, especially when present with insoluble fibers or other surrounding matrixes, can swell upon hydration and absorb high amounts of water. During mastication, this effect increases the dryness impression and viscosity of the food and thus detracts from a food's flavor display. The resulting dryness impression and increase in viscosity is sensed as an unpleasant thick and often slimy texture that has a poor flavor display. Again, dryness and viscosity issues can be minimized, thus an overall taste improvement can be realized, by selecting soluble fibers that have a minimal viscosity effect, and a dissolution rate as similar as possible to the rate of sucrose. The rates of dissolution can be compared by observing the dissolution rate of 1 teaspoon soluble fiber in 250 ml of water at 25° C. versus 1 teaspoon sucrose in 250 m of water at 25° C. The fiber and sugar are slowly added simultaneously to their respective aliquots of water with gentle stirring.

Adjunct Ingredients

Adjunct ingredients are necessary for processing and structural development of most foods. Examples of typical adjunct ingredients include processing aids, emulsifiers, and leavening agents. As known by those skilled in the art, the required adjunct ingredients that are needed to produce foods vary by food type. Selection of the appropriate type and level of adjunct is easily determined by one skilled in the art as said information is available in reference sources. For example, it is well known that crackers rely heavily on processing aids and leavening agents. Leavening agents provide the internal expansion or rise of the product during baking. Crackers without leavening would be thin and dense and would have an unpleasant eating quality. Processing aids such as reductants and enzymes are required either singularly or in combination to allow adequate machining (i.e., dough sheeting and die cutting), and/or development of necessary structure. They are believed to function by breaking bonds in the gluten complex of the dough (i.e., disulfide cross-linkages and peptide bonds).

In addition, it is known by those skilled in the art that extruded snacks utilize emulsifiers, and may use leavening agents. The role of the emulsifier is to aid in processing (for example sheeting dough) and the formation of the internal product structure.

It is also known that cookies rely heavily on the use of leavening agents and emulsifiers. Other baked goods such as brownies, muffins, snack cakes, and pastries also rely on leavening agents and emulsifiers to achieve their desired structure. Snack cakes are at the high end of functionality, as they require the most care in the choice and blends of leavening agents and emulsifiers to achieve their tender highly cellular structure. Brownies are generally at the lower end of functionality, as they typically have a more dense structure.

Finally, it is known that fillings generally require the use of an emulsifier or whipping agent to aid in processing, texture formation, and mouth melt. For example, peanut butter based fillings may utilize an emulsifier to aid in particle dispersion during processing. Emulsifiers are also used in confectionery fillings to aid in the creation of textures and improve mouth melt. For example, chocolate uses an emulsifier to reduce the level of cocoa butter fat required in its final composition. Some fillings (nougats) utilize whipping agents to incorporate air into the filling in order to attain a desired texture and mouth melt.

Although the type and level of adjunct ingredients that are needed to produce any specific food product is known by those skilled in the art, Applicants have provided a number of examples wherein the type and level of adjunct ingredients used to produce a variety of foods is listed.

Additional Ingredients

Additional ingredients that may be incorporated in Applicants' invention include natural and synthetically prepared flavoring agents, non-caloric sweeteners, bracers, flavanols, natural and synthetically prepared colors, preservatives, acidulants, and food stability anti-oxidants. A flavoring agent is recommended for the embodiments of this invention in order to further enhance their taste. As used herein the term "flavoring agents" encompass seasonings and spices. Flavors may be added to the initial formulation, or be added topically after the product is produced. Any natural or synthetic flavor agent can be used in the present invention. Fruit flavors, natural botanical flavors, and mixtures thereof can be used as the flavoring agent. Particularly preferred savory flavors are grain based, spice based, and buttery type flavors. Besides these flavors, a variety of sweet flavors such as chocolate, praline, caramel and other fruit flavors can be used such as apple flavors, citrus flavors, grape flavors, raspberry flavors, cranberry flavors, cherry flavors and the like. These fruit flavors can be derived from natural sources such as fruit juices and flavor oils, or else be synthetically prepared. Preferred natural flavors are aloe vera, ginseng, ginkgo, hawthorn, hibiscus, rose hips, chamomile, peppermint, fennel, ginger, licorice, lotus seed, schizandra, saw palmetto, sarsaparilla, safflower, St. John's Wort, curcuma, cardamom, nutmeg, cassia bark, buchu, cinnamon, jasmine, haw, chrysanthemum, water chestnut, sugar cane, lychee, bamboo shoots and the like. Typically the flavoring agents are conventionally available as concentrates or extracts or in the form of synthetically produced flavoring esters, alcohols, aldehydes, terpenes, sesquiterpenes, and the like. When used in any embodiment, flavoring agents are added in effective levels.

Regardless of the flavoring agent, Applicants recognized that both olfactory and gustatory flavors display best when the interfacial area within the saliva is maximized. This occurs when flavor bearing particles are effectively broken down during mastication This results in a more rapid partitioning of the flavors into the mouth's saliva and head space where the flavors can be sensed. This effect can be dependent on or enhanced by the food's mouth melt.

Applicants also recognized that the transfer of flavors to the headspace is greatly facilitated by the flavor compounds first partitioning into the aqueous phase or saliva in the mouth. While not being bound by theory, this is believed to be due to the higher volatility, from water to air versus oil to air, of relatively non-polar flavors. An exception to this is a water continuous food system containing flavors. Otherwise, these flavor compounds usually reside predominately in the oil or solid phases of a food. Initially, a food's solids can either physically or chemically bind these flavors. The olfactory flavor compounds are usually released and detected by the olfactory system at different rates. This is why some flavors are sensed early in the eating experience, and others later. It is usually the overall perception of the release of these many compounds, over time in the mouth that produces the characteristic olfactory flavor responses, for example, chocolate or buttery.

Effective levels of non-caloric sweeteners can be used in all embodiments of the present invention to further sweeten said embodiments. Examples of non-caloric sweeteners include sucralose, aspartame, saccharin, cyclamates, acesulfame-K, L-aspartyl-L-phenylalanine lower alkyl ester sweeteners, L-aspartyl-D-alanine amides as disclosed in U.S. Pat. No. 4,411,925 to Brennan, et al (1983), L-aspartyl-D-serine amides disclosed in U.S. Pat. No. 4,399,163 to Brennan et al (1983), L-aspartyl-hydroxymethyl alkane amide sweeteners disclosed in U.S. Pat. No. 4,338,346 issued to Brand (1982), L-aspartyl-1-hydroxyethylalkane amide sweeteners disclosed in U.S. Pat. No. 4,423,029 to Rizzi (1983), glycyrrhizins, synthetic alkoxy aromatics, etc. Lo Han Guo juice, stevioside and other natural sources of sweeteners can also be used.

Bracers are another class of optional ingredients that may be incorporated in the present invention. Bracers can be obtained by extraction from a natural source or can be synthetically produced. Any bracer used in any embodiment of the present invention is preferably present in physiologically relevant amounts, which means that the sources used in the practice of this invention provide a safe and effective quantity to achieve mental refreshment and alertness. The methylxanthines: caffeine, theobromine and theophylline, are well known examples of bracers. However, numerous other xanthine derivatives have been isolated or synthesized. See, for example, Bruns, Biochem. Pharmacol., 30, 325–333, (1981), describing more than one hundred purine bases and structurally related heterocycles relative to xanthine. One or more of these compounds are present in the coffee bean, tea, kola nut, cacao pod, mate, yaupon, guarana paste and yoco. Natural plant extracts are the preferred sources of bracers as they may contain other compounds that delay the bioavailability of the bracer; thus they may provide mental refreshment and alertness without jitters. The most preferred methylxanthine is caffeine. Caffeine can be obtained from the aforementioned plants and their waste or else synthetically prepared. Preferred botanical sources of caffeine that may be used as a complete or partial source of caffeine include green tea, guarana, mate, black tea, cola nuts, cocoa and coffee. Green tea, guarana and mate are the most preferred botanical sources of caffeine. Guarana functions in a manner similar to green tea. Thus, guarana may be used to decrease the bioavailability of caffeine, thereby reducing or eliminating the caffeine jitters. Mate may have the additional benefit of an appetite suppressing effect and may be included for this purpose as well.

Another class of optional ingredients that may be incorporated in the present invention are flavanols. Flavanols are natural substances present in a variety of plants (e.g. fruits, vegetables, flowers). The flavanols used in the present invention can be extracted from fruit, vegetables, green tea or other natural sources by any suitable method well known to those skilled in the art. For example, extraction with ethyl acetate or chlorinated solvents is one way to isolate flavanols from green tea; or, they may be prepared by synthetic or other appropriate chemical methods. Flavanols, including catechin, epicatechin, and their derivatives, are commercially available.

Flavanols may be extracted from either a single plant or mixtures of plants. The preferred flavanols are extracted from plants, e.g. green tea and related plants. Many fruits, vegetables, and flowers contain flavanols but to a lesser degree. Plants containing flavanols are known to those skilled in the art. Examples of the most common flavanols, which are extracted from tea plants, and other members of the catechu gambir (Uncaria family) are catechin, epicatechin, gallocatechin, epigallocatechin, epicatechin gallate, epigallocatechin gallate.

The preferred source of flavanols is green tea. Green tea, and in particular the flavanols present in green tea, when incorporated into a food, may delay the bioavailability of caffeine—thus reducing or eliminating the caffeine jitters.

The flavanols used in all embodiments of the present invention can be in the form of a tea extract. The tea extract can be obtained from the extraction of unfermented teas, fermented teas, partially fermented teas and mixtures thereof. Preferably the tea extracts are obtained from the extraction of unfermented and partially fermented teas. The most preferred tea extracts are obtained from green tea. Both hot and cold extracts can be used in the present invention. Suitable methods for obtaining tea extracts are well know; See, for example, U.S. Pat. No. 5,879,733 to Ekanayake, issued Mar. 9, 1999; U.S. 4,935,256 to Tsai, issued Jun. 1990; U.S. Pat. No. 4,680,193 to Lunder, issued July 1987; and U.S. Pat. No. 4,668,525 to Creswick, issued May 26, 1987.

Embodiments of the present invention may optionally be fortified with vitamins and minerals. The U.S. Recommended Dietary Allowances (U.S. RDA) are a set of nutrient standards established by the Food and Nutrition Board of the National Academy of Sciences (Food and Nutrition Board, 1989, *Recommended Dietary Allowances*, 10 ed., National Research Council, National Academy of Sciences, Washington, D.C.). The RDA's for vitamins and minerals represent the average daily intake considered adequate to meet the nutritional needs of most healthy individuals in the United States. The RDA for a particular vitamin or mineral varies depending on age, gender, and physiological state (e.g., pregnant, lactating). The Reference Daily Intakes (RDI) for vitamins and minerals were established by the Food and Drug Administration to reflect the average nutrient allowances for adults and are used for nutrition labeling on food products in the United States. Embodiments of the present invention may optionally contain vitamins selected from the group consisting of vitamins A, D, E, K, C (ascorbic acid), thiamin, riboflavin, niacin, vitamin $B_{-6}$, folate, vitamin $B_{-12}$, biotin, and pantothenic acid. These vitamin sources are preferably present in nutritionally relevant amounts, which means that the vitamin sources used in the practice of this invention provide a nourishing amount of said vitamins. Preferably, this amount comprises at least about 1% of the U.S. RDA or RDI for said vitamin, more preferably from about 1% to about 100%, and most preferably from about 10% to about 100% of the U.S. RDA or RDI per 30 g reference serving of the finished product. Of course, it is recognized that the preferred daily intake of any vitamin may vary with the user, with greater than U.S. RDA or RDI intakes being beneficial in some circumstances.

In general, the U.S. RDA for vitamin A ranges from about 375 μg RE (retinol equivalent) to about 1300 μg RE, depending on age and physiological state (Food and Nutrition Board, 1989; Gregory, J. F., 1996, "Vitamins", in *Food Chemistry*, 3$^{rd}$ ed., O. R. Fennema, ed.). The U.S. RDA for vitamin D ranges from about 5 μg to about 10 μg (as cholecalciferol). The U.S. RDA for vitamin E ranges from about 3 mg TE (α-tocopherol equivalent) to about 12 mg TE. The U.S. RDA for vitamin K ranges from 5 μg to 80 μg. The U.S. RDA of vitamin C ranges from about 30 mg to about 95 mg. The U.S. RDA for thiamin ranges from about 0.3 mg to about 1.6 mg. The U.S. RDA for riboflavin ranges from about 0.4 mg to about 1.8 mg. The U.S. RDA for niacin ranges from about 5 mg to about 20 mg. The U.S. RDA for vitamin $B_{-6}$ ranges from about 0.3 mg to about 2.2 mg. The U.S. RDA for folate ranges from about 25 μg to about 400 μg. The U.S. RDA for vitamin $B_{-12}$ ranges from about 0.3 ug to about 2.6 ug. The RDI's established by the Food and Drug Administration for various vitamins are as follows (Code of Federal Regulations, Title 21, Section 101.9: *Nutrition Labeling of Food*, 21CFR 101.9, revised as of Apr. 1, 1999): Vitamin A=5,000 International Units (IU; equals 875 μg RE); Vitamin D=400 IU (equals 6.5 μg); Vitamin E=30 IU (equals 9 mg α-tocopherol equivalents); Vitamin K=80 pg; Vitamin C=60 mg; thiamin=1.5 mg; riboflavin= 1.7 mg; niacin=20 mg; Vitamin $B_6$=2.0 mg; folate=400 μg; Vitamin $B_{12}$=6 μg; 300 μg; pantothenic acid=10 mg.

Vitamin A precursors (provitamin A, carotenoids) can also be used, including beta-carotene, alpha-carotene, β-apo-8' carotenal, cryptoxanthin and the like. The vitamin A esters (e.g., retinyl palmitate; retinyl acetate) and beta-carotene are highly preferred forms of vitamin A. Vitamin D can be selected from, for example, cholecalciferol ($D_3$), ergocalciferol ($D_2$), and their biologically active metabolites and precursors, such as 1-alpha-hydroxy vitamin D, 25-hydroxy vitamin D, 1,25-dihydroxy vitamin D and the like. Vitamin D as cholecalciferol is highly preferred. All-rac alpha-tocopherol and RRR-alpha-tocopherol and their esters are highly preferred as a source for vitamins. Sources of vitamin E include dl-alpha tocopherol (all-rac) and its esters, such as dl-α-tocopheryl acetate and succinate, dl-alpha-tocopherol (RRR) and its esters, d-alpha-tocopherol and its esters, beta-tocopherol, gamma-tocopherol, and their esters, tocopheryl nicotinate, and the like. Vitamin K can be selected from phylloquinone ($K_1$), menaquinone ($K_2$), menadione and their salts and derivatives. Vitamin $K_1$ is highly preferred. L-ascorbic acid is particularly preferred as a vitamin C source for the present invention. However other forms of vitamin C, for example, D-ascorbic acid, D-dehydroascorbic acid, L-isoascorbic acid, L-dehydroascorbic acid, and esters of ascorbic acid (e.g., ascorbyl palmitate) may also be used. The hydrochloride and nitrate salts of thiamin and thiamin alkyl disulfides such as the prophyidisulfide, tetrahydrofurfuryl disulfide, O-benzoyl disulfide can be used in the present invention. The hydrochloride and nitrate salts of thiamin are highly preferred. The sources of riboflavin are selected, for example, from crystalline riboflavin coenzyme forms of riboflavin such as flavin adenine dinucleotide, flavin adenine mononucleotide, riboflavin 5'-phosphate and their salts. Riboflavin is highly preferred. Sources of niacin include nicotinic acid, nicotinamide, the coenzyme forms of niacin such as nicotinamide adenine dinucleotide, and nicotinamide adenine dinucleotide phosphate. Particularly preferred are nicotinamide and nicotinic acid. Vitamin $B_6$ can be selected from hydrochloride salts or 5'-phosphates of pyridoxine, pyridoxamine, and pyridoxal. The preferred vitamin $B_6$ is pyridoxine hydrochloride. The folate can be in the form of folic acid, mono and polyglutamyl folates, dihydro and tetrahydro folates, and methyl and formyl folates. Folic acid is a highly preferred form of folate. Sources of vitamin $B_{-12}$ are, for example, cyanocobalamin, methylcobalamin, 5'-deoxy-adenosylcobalamin and the like. Cyanocobalamin is highly preferred. Sources of biotin can be selected from D-biotin, oxybiotin, biocytin, biotinol and the like. D-biotin and biocytin are highly preferred. For pantothenic acid, the sources can be in the form of salts such as calcium pantothenate or as panthenol, or in the form of coenzyme A. Calcium pantothenate is a highly preferred source of pantothenic acid.

Embodiments of the present invention may be fortified with minerals such as calcium, phosphorus, magnesium, iron, zinc, iodine, selenium, copper, manganese, fluoride, chromium, molybdenum, sodium, potassium, and chloride. The minerals sources are preferably present in nutritionally relevant amounts, which means that the mineral sources used in the practice of this invention provide a nourishing amount of said minerals. Preferably, this amount comprises at least about 1% of the U.S. RDA or RDI for these minerals, more preferably from about 1% to about 100%, and most preferably from about 10% to about 100% of the U.S. RDA or RDI per 30 g reference serving of the finished product. Of course, it is recognized that the preferred daily intake of any mineral may vary with the user, with greater than the U.S. RDA or RDI intakes being beneficial in some circumstances.

In general, the U.S. RDA for calcium ranges from 400 mg for infants to 1200 mg for adults (Food and Nutrition Board, 1989; Gregory, 1996). The U.S. RDA for phosphorus ranges from 300 mg to 1200 mg. The U.S. RDA for magnesium ranges from 40 mg to 400 mg. The U.S. RDA for iron ranges from 6 mg to 30 mg, depending somewhat on age and physiological state. The U.S. RDA for zinc ranges from 5 mg to 19 mg. The U.S. RDA for iodine ranges for 40 $\mu$g to 200 $\mu$g. The U.S. RDA for selenium ranges from 10 $\mu$g to 75 $\mu$g. There are no official U.S. RDA ranges specified for copper, manganese, chromium, molybdenum and fluoride. However, the Food and Nutrition Board has specified an estimated safe and adequate daily dietary intake for copper of about 1.5–3.0 mg, for manganese of about 2.0–5.0 mg, for chromium of about 50–200 ug, and for molybdenum of about 75–250 ug. A safe and adequate range for fluoride is 1.5–4.0 mg (Food and Nutrition Board, 1989). There are no official U.S. RDA ranges specified for sodium, potassium and chloride. However, the Food and Nutrition Board has specified an estimated minimum requirement for chloride of 50–750 mg, depending upon age. The RDI's established by the Food and Drug Administration for various minerals are as follows (Code of Federal Regulations, Title 21, Section 101.9: Nutrition Labeling of Food, 21 CFR § 101.9, revised as of Apr. 1, 1999): calcium=1000 mg; phosphorus=1000 mg; iron=18 mg; zinc=15 mg; iodine=150 $\mu$g; magnesium=400 mg; selenium=70 $\mu$g; copper=2.0 mg; manganese=2.0 mg; chromium=120 $\mu$g; molybdenum=75 $\mu$g; and chloride=3,400 mg. The embodiments of the invention that comprise any of these latter minerals should employ levels known to be safe without risk of toxicity.

The source of the mineral salt, both those with established U.S. RDA levels or with safe and adequate intake levels, as well as those with no as yet established human requirement, used in the practice of this invention, can be any of the well known salts including carbonate, oxide, hydroxide, chloride, sulfate, phosphate, pyrophosphate, gluconate, lactate, acetate, fumarate, citrate, malate, amino acids and the like for the cationic minerals and sodium, potassium, calcium, magnesium and the like for the anionic minerals. However, the particular salt used and the level will depend upon their interaction with other food product ingredients. Elemental iron (electrolytic or reduced iron) is another preferred source of iron.

If desired, coloring agents can also be added to the food compositions of the present invention. Any soluble coloring agents approved for food use can be utilized for the present invention.

When desired, preservatives, such as sorbic acid, benzoic acid, hexametaphosphate and salts thereof, can be added into embodiments of the present invention.

Also, if desired, the composition can contain an acidulant including but not limited to malic, citric, tartaric, and fumaric acids and mixtures thereof.

Organic as well as inorganic edible acids may be used to adjust the pH of Applicants' foods. The preferred acids are edible organic acids that include citric acid, malic acid, fumaric acid, adipic acid, phosphoric acid, gluconic acid, tartaric acid, and ascorbic acid.

Structural Parameters

A food's flavor display and texture, and thus its taste, are dependent on the food's composition and structural parameters. As a result, the structural parameters detailed below are important to realizing Applicants' invention. Applicants' teachings concern crumb and filling structural parameters as Applicants' invention encompasses single and multiple phase nutritionally balanced foods.

Crumb Structures

Applicants recognized that the crumb structure of a food is central to the food's texture and flavor display. A nutritionally balanced traditional snack's crumb structure is particularly important, as much of the snack's fat and sugar—key materials that can be used to create desired crumb structures—are typically replaced with fiber and protein. In particular, Applicants have found that dense crumb structures result in poor mouth melt and flavor display. As a result, layered or cellular crumb structures are desirable as these structures have low densities. However, even layered or cellular structures can exhibit poor mouth melt if the cell walls are too thick, or too hard to allow good breakdown and hydration during mastication. Cell wall dimensions that result in acceptable textures and mouth melts are dependent on the particular food type. In general, for a given food type, texture and mouth melt can be improved by increasing cell size and decreasing cell wall thickness relative to the cell dimensions; provided the food's structure does not become too expanded, as "Styrofoam like" structures result in negative textures for most products. Thus, for expanded extruded foods like corn curls, cell dimensions 10× or greater than the cell walls dimensions are desired. Crackers should have layers (cell walls) of about the same thickness as the void space between the layers.

In some foods, such as for some cookies, the cells are not well defined visually, but exist as voids within the structure. Microscopically, this is analogous to a network of tunnels and caverns running uniformly throughout the food's internal structure.

Most crumb structures have a glass transition point, as structure formers like starches and sugars exhibit a glass transition analogous to that of polymers. Below the transition point, the structure is a "glass". Above the transition point, the structure becomes tough and rubbery, until it becomes soft and even "liquid like" at its extreme. The glass transition point of a starch and sugar-based food's crumb structure is primarily determined by the structure's degree of hydration. Specifically, for starch and sugar based foods, increasing the degree of hydration reduces the glass transition point of the crumb structure.

Below a snack's glass transition point, the snack has a hard, crisp "glassy structure". For Applicants' cracker, cookie, and snack chip embodiments, a glassy structure is desired as it can impart the desired crispness that consumers expect. This is particularly true when the structural geometry (layers or cells) is optimized. While not to be bound by theory, it is believed that the crumb's water activity, which is a function of water content for a given food type, determines the degree of crispness of the crumb.

For Applicants' confection embodiments, such as granola bars, a tough, rubbery texture is desired. A tough, rubbery structure is obtained by low-moisture sugar continuous structures having a water activity of greater than 0.65. Here, the moisture level on a weight basis is less than or equal to approximately 20%.

Fluid or Semi-Solid Type Structures

Applicants recognized that when mastication is required, a good mouth melt is desired. Thus, Applicants have determined that the glass transition point is an important parameter for non-oil based filling structures. When a food's non-oil based filling structure is below the glass transition point, it is very viscous and tough. As the filling's structure moves through its glass transition point, it becomes less viscous and eventually, well above the glass transition point, extremely fluid. Applicants have found that for fillings, lubricity, mouth melt and flavor display can be improved if the filling's structure is above its glass transition point. While the optimal degree of hydration and thus the degree to which the filling's structure exceeds its transition point depends on the final product's form, Applicants' research has resulted in the following teachings: fruit fillings should be sufficiently hydrated so that they will be well above their glass transition point—this requires at least a 20% moisture level on a filling's weight basis; confectionery fillings such as caramel and nugget need only be somewhat above their glass transition point—this requires a moisture level of from about 1% to about 10% on a weight basis; and, as a general rule, since it is desired that fillings made with ingredients such as cheese and peanut butter be anhydrous, these fillings do not have an applicable glass transition point.

TASTE SCORES

Since "taste" represents complex perceptions that interpret chemical, physiological and psychological clues into the "likes" and "dislikes" of the foods we eat and since Applicants are unaware of any standard method for rating the overall result of the interaction of said complex perceptions, Applicants have developed a simple and precise method for rating a food product's taste system. Applicants' rating method is a comparative method wherein the taste system of a test product is compared relative to the taste system of a reference product. Panelists rate the overall taste of products selected from the group consisting of one or more reference products and one or more test products. The data from this rating session is then statistically treated, to generate, at one or more confidence levels, a confidence interval on the relative taste score for at least one test product. The confidence intervals have lower and upper bounds. These confidence intervals can then be used to compare the taste system of Applicants' invention to the taste systems of food products that existed before Applicants' invention or food products that are produced after the date of Applicants' invention. The details of Applicants' rating protocol are more fully described in the section of this application titled Taste Test Protocol 1.1.

Applicants' claims encompass all products, having the nutritional profile claimed by Applicants and wherein the lower bound of the two-sided confidence interval about the relative taste score is greater than $\beta$. Here, $\beta$ is the upper bound of the 1-$\alpha$ two-sided-confidence interval about the relative taste score for the best scoring preexisting reference that has a nutritional profile that Applicants' claims read on. Here, the likelihood that any pre-existing reference product has an overall taste that is superior to Applicants' invention is at most $1-(1-\alpha/2)^2$. In short, Applicants' taste limitation, as claimed, will read the overall taste of products having a lower bound for their confidence interval about the relative taste score that is greater than $\beta$.

At a 60% confidence level, embodiments of Applicants' invention have a lower bound for their confidence interval about the relative taste score that is greater than 1.64. Other embodiments of Applicants' invention have a lower bound for their confidence interval about the relative taste score that is greater than 15.46. Still other embodiments of Applicants' invention have a lower bound for their confidence interval about the relative taste score that is greater than 23.84. Finally, other embodiments of Applicants' invention have a lower bound for their confidence interval about the relative taste score that is greater than 23.84, and certain embodiments have an upper bound for their confidence interval about the relative taste score that is less than 39.45.

At a 70% confidence level, embodiments of Applicants' invention have a lower bound for their confidence interval about the relative taste score that is greater than 2.25. Other embodiments of Applicants' invention have a lower bound for their confidence interval about the relative taste score that is greater than 16.09. Still other embodiments of Applicants' invention have a lower bound for their confidence interval about the relative taste score that is greater than 24.43. Finally, other embodiments of Applicants' invention have a lower bound for their confidence interval about the relative taste score that is greater than 24.43, and certain embodiments have an upper bound for their confidence interval about the relative taste score that is less than 40.28.

At a 80% confidence level, embodiments of Applicants' invention have a lower bound for their confidence interval about the relative taste score that is greater than 3.09. Other embodiments of Applicants' invention have a lower bound for their confidence interval about the relative taste score that is greater than 16.87. Still other embodiments of Applicants' invention have a lower bound for their confidence interval about the relative taste score that is greater than 25.18. Finally, other embodiments of Applicants' invention have a lower bound for their confidence interval about the relative taste score that is greater than 25.18, and certain embodiments have an upper bound for their confidence interval about the relative taste score that is less than 41.33.

At a 90% confidence level, embodiments of Applicants' invention have a lower bound for their confidence interval about the relative taste score that is greater than 4.15. Other embodiments of Applicants' invention have a lower bound for their confidence interval about the relative taste score that is greater than 18.05. Still other embodiments of Applicants' invention have a lower bound for their confidence interval about the relative taste score that is greater than 26.28. Finally, other embodiments of Applicants' invention have a lower bound for their confidence interval about the relative taste score that is greater than 26.28, and certain embodiments have an upper bound for their confidence interval about the relative taste score that is less than 42.89.

At a 95% confidence level, embodiments of Applicants' invention have a lower bound for their confidence interval about the relative taste score that is greater than 5.14. Other embodiments of Applicants' invention have a lower bound for their confidence interval about the relative taste score that is greater than 19.06. Still other embodiments of Applicants' invention have a lower bound for their confidence interval about the relative taste score that is greater than 27.25. Finally, other embodiments of Applicants' invention have a lower bound for their confidence interval about the relative taste score that is greater than 27.25, and certain embodiments have an upper bound for their confidence interval about the relative taste score that is less than 44.26.

At a 99% confidence level, embodiments of Applicants' invention have a lower bound for their confidence interval about the relative taste score that is greater than 7.09. Other embodiments of Applicants' invention have a lower bound for their confidence interval about the relative taste score that is greater than 21.07. Still other embodiments of Applicants' invention have a lower bound for their confidence interval about the relative taste score that is greater than 29.14. Finally, other embodiments of Applicants' invention have a lower bound for their confidence interval about the relative taste score that is greater than 29.14, and certain embodiments have an upper bound for their confidence interval about the relative taste score that is less than 46.96.

ANALYTICAL PROTOCOLS

Protocols used to determine the levels and types of amino acid source, fat, carbohydrate and fiber components, as well as the number and percent of calories from each component of Applicants' invention, are as follows:

1. Amino acid content: The total amino acid or protein content of a food is calculated after measuring the percent nitrogen content of the food by the Kjeldahl digestion method. The Kjeldahl digestion method used is AOAC Official Method 979.09, "Protein in Grains" (32.2.03; Chp. 32, pg. 23D).

a.) Percent amino acid or protein is calculated by multiplying the % nitrogen by a conversion factor of 6.25:

% amino acid or protein=% N×6.25 b.) The amino acid or protein content per a given mass of food is calculated as follows:

g amino acid or protein=(mass of food)×(% amino acid or protein/100)

c.) Calories from amino acid or protein are calculated by multiplying the grams amino acid or protein by 4:

Energy from amino acid or protein (kcal)=(g amino acid or protein)×4 kcal/g

2. Amino Acid Chemical Score: The profile of essential amino acids in a food is measured after conducting an amino acid analysis on the product; see AOAC Official Method 994.12, "Amino Acids in Feeds" (4.1.11, Chp. 4, pg. 4–12). Amino acid analysis is carried out on a Beckman Model 6300 ion-exchange instrument following a 16 hour hydrolysis at 115° C. in 6 N HCl, 0.2% phenol that also contains 2 nmol norleucine. The latter serves as an internal standard to correct for losses that may occur during sample transfers, drying, etc. After hydrolysis, the HCl is evaporated and the resulting amino acids dissolved in 100 $\mu$l Beckman sample buffer that contains 2 nmol homoserine with the latter acting as a second internal standard to independently monitor transfer of the sample onto the analyzer. The instrument is calibrated with a 2 nmol mixture of amino acids and it is operated via the manufacturer's programs and with the use of their buffers. Data analysis is carried out on an external computer using Perkin Elmer/Nelson data acquisition software.

During acid hydrolysis asparagine will be converted to aspartic acid and glutamine to glutamic acid. During the HPLC analysis that follows, cysteine co-elutes with proline; and methionine sulfoxide, which is a common oxidation product found in peptides/proteins, co-elutes with aspartic acid. Hence, following normal acid hydrolysis, glutamine and asparagine are not individually quantified and it is possible that the methionine value will be low and that the aspartic acid and proline values will be somewhat high. Improved quantification of cysteine and methionine can be obtained by prior oxidation with performic acid, which converts both methionine and methionine sulfoxide to methionine sulfone and cysteine and cystine to cysteic acid. Generally, however, performic acid oxidation destroys tyrosine. Best quantification of tryptophan is obtained by hydrolysis with methanesulfonic acid (MSA) instead of hydrochloric acid. The procedure used in this instance is to carry out the hydrolysis with MSA for 16 hours at 115° C. After hydrolysis, the sample is neutralized with 0.35 M NaOH and 100 $\mu$l (50% of the sample) is then analyzed on the Beckman 6300.

To calculate the amino acid chemical score of a dietary amino acid source, the measured essential amino acid pattern of the food is compared to an ideal reference protein. The reference protein used is the recommended profile of essential amino acids (mg/g reference protein) for preschool children ages 2–5, as specified by the World Health Organization (WHO, 1985, *Energy and Protein Requirements*, WHO Technical Report Series 724, Geneva, 206 pp.). This ideal profile of essential amino acids is as follows:

|  | mg essential amino acid/<br>g reference protein |
|---|---|
| Histidine | 19 |
| Isoleucine | 28 |
| Leucine | 66 |
| Lysine | 58 |
| Methionine + Cystine | 25 |
| Phenylalanine + Tyrosine | 63 |
| Threonine | 34 |
| Tryptophan | 11 |
| Valine | 35 |

The content of essential amino acids in a food (mg amino acid/g protein) is compared to the above ideal amino acid profile to identify the most limiting amino acid in the food; i.e., the amino acid in greatest deficit compared to the reference. The amino acid chemical score is then calculated based on the most limiting amino acid as follows:

Amino Acid Chemical Score=[mg limiting amino acid/g protein in food]/[mg same amino acid/g reference protein]

The amino acid chemical score of the protein or amino acid source in the food may be as high as 1.0, which would indicate that the nutritional quality of the amino acid source is equal to the ideal reference protein.

3. Digestible Fat and Digestible Saturated Fat: The content of total digestible fat and digestible saturated fat in a food is measured according to the published AOAC peer-verified method for quantifying fat in olestra-containing snack foods (JAOAC, 81, 848–868, 1998, "Determination of fat in olestra-containing savory snack products by capillary gas chromatography", PVM 4:1995, AOAC International, Gaithersburg, Md.). The principle of this method involves extraction of the food product with chloroform-methanol solution, yielding a total lipid extract that contains the digestible fat and any non-digestible lipid. The lipid extract is hydrolyzed by lipase, yielding fatty acids from the digestible fat. The fatty acids are precipitated as calcium soaps and the isolated fatty acid soaps are converted back into fatty acids with hydrochloric acid and extracted into hexane. The isolated fatty acids are converted to methyl esters with boron trifluoride-methanol solution and quantified by capillary gas chromatography.

a.) The digestible fat and saturated fat content per a given mass of food is calculated as follows:

g digestible fat=(mass of food)×(% digestible fat/100)

g digestible saturated fat=(mass of food)×(% digestible saturated fat/100)

b.) Calories from digestible fat and saturated fat are calculated by multiplying by 9:

Energy from fat (kcal)=(g digestible fat)×9 kcal/g

Energy form saturated fat (kcal)=(g digestible saturated fat)×9 kcal/g

4. Carbohydrate: The total carbohydrate content of a food product is calculated by difference as follows:

a.) % Carbohydrate=100−(% amino acid source)−(% moisture)−(% total extractable lipid)−(% ash)

b.) The carbohydrate content per a given mass of food is calculated as follows:

g carbohydrate=(mass of food)×(% carbohydrate/100)

c.) Calories from carbohydrate are calculated as follows:

Energy from carbohydrate (kcal)=(g carbohydrate−g dietary fiber)×3.85 kcal/g

5. Moisture: The moisture content of a food is measured by the vacuum oven method known as AOAC Official Method 979.12, "Moisture (Loss on Drying) in Roasted Coffee" (30.1.20, Chp. 30, pg. 5).

6. Ash: The ash content of a food is measured after ignition in a furnace at ~550° C. This method is AOAC Official Method 923.03, "Ash in Flour" (32.1.05, Chp. 32, pg. 2).

7. Dietary Fiber Combination of AOAC Method for Total Dietary Fiber With the Enzymatic-HPLC Determination of Indigestible Maltodextrin in Foods (Combined AOAC Prosky-HPLC method)

I. Principle

This method to determine total dietary content in processed foods is a combination of the AOAC-Prosky method for total dietary fiber (AOAC 985.29) and a high performance liquid chromatography (HPLC) method for determining additional fiber from indigestible maltodextrin.

A sample is first analyzed for its total quantity of insoluble dietary fiber (IDF) and high molecular weight soluble dietary fiber (HMSDF) according to the AOAC method 985.29. A HPLC determination is conducted on the filtrate to obtain the quantity of low molecular weight soluble dietary fiber (LMSDF). The two values are combined to obtain the total dietary fiber value.

II. Scope

The combined AOAC Prosky-HPLC method determines total dietary fiber value of processed foods containing low molecular weight soluble dietary fiber. This method defines dietary fiber (DF) as indigestible saccharides with a degree of polymerization of 3, and higher than 3, after enzymatic hydrolysis.

III. Additional Apparatus Beyond AOAC method 985.29

A). Balance capable of weighing to 0.1 mg.
B). Rotary evaporator.
C). Glass or plastic columns to hold ion exchange resins (75 cm * 15 mm ID).

-continued

D). High-performance liquid chromatograph (HPLC) equipped with oven to maintain column temperature at 80° C. and a 20 uL injection loop.
E). Guard column (or pre-column), TSK guard column $PW_{XL}$ (size: 6.0 mm ID × 4 cm), TOSOH CORPORATION, distributed by TOSOHAAS, Montgomeryville, PA.
F). HPLC column, TSK-GEL $G2500PW_{XL}$ (size: 7.8 mm ID × 30 cm), TOSOH CORPORATION, distributed by TOSOHAAS, Montgomeryville, PA.
G). Refractive Index (RI) detector maintained at 80° C.
H). Integrator or computer for peak area measurement.
I). Water aspirator or vacuum pump. Always use with a trap between vacuum source and sample.
J). Round bottom flasks, 1,000 mL.
   (for volume reduction of initial filtrate volume).
K). Round bottom flask, 250 mL.
   (for volume reduction of ion-exchange column eluent).
L). Filters for disposable syringe, 0.2 micron membrane, 13 mm.
M). Filters for distilled-deionized (D D) water, 0.2 micron, 47 mm.
N). Filter apparatus to hold 47 mm, 0.2 micron filter.
   (to filter larger volumes of D-D water).
O). Filter or vacuum flasks, 500 mL, 1,000 mL.
P). Glass rods with fire-polished ends, approximately 20 cm long.
Q). Ten (10) mL plastic disposable syringes.
R). Pasteur pipettes.
S). Volumetric pipette, 10 mL.
T). Volumetric flasks, 1,000 mL, 250 mL, 50 mL and 10 mL.
U). Graduated cylinders, 50 mL and 25 mL.
V). Polyvinyl chloride (PVC) tubing, 2.79 mm I.D.
   (for ion-exchange columns).
W). Funnel, general purpose.
X). Teflon scraping rod.
   (can use in place of glass stirring rod to scrape precipitate in tall beaker).
Y). Peristaltic pump.

IV. Additional Reagents beyond AOAC method 985.29

A). Distilled-Deionized (D—D) water.
B). Mixed-bed ion exchange resin for each sample. Twenty (20) g of charged Amberlite IRA-67 (Sigma # A9960) and 20 g of charged Amberlite 200 (Sigma # 200) are mixed and used per sample or per column. (Must be charged and adequately rinsed with D—D water.)

It is advantageous to activate large amounts of both Amberlite IRA-67 and Amerlite 200 resins. Use large columns. The resins are mixed in a ratio of 1:1, 20 g each, for each column or sample just before use.

1). Amberlite IRA-67. Fill large column with resin and determine approximate resin volume based on column dimensions. Wash resin with two (2) volumes of D—D at the rate of 3 mL per min. Pass two (2) volumes of 3% sodium hydroxide (NaOH) through the resin at the rate of 3 mL per min. Remove NaOH with three (3) volumes of D—D water passed through the resin at the rate of 3 mL per min. The resin is further washed with D—D water at the rate of six (61) mL per min. Monitor pH of water eluent. The column is adequately washed of NaOH when a 7–8.8 pH value is obtained. (It takes approximately 6–8 hours to charge and rinse this resin)

2). Amberlite 200. Fill large column with resin and determine approximate resin volume based on column dimensions. Wash resin with two (2) volumes of D—D at the rate of 3 mL per min. Pass two (2) volumes of 3% hydrochloric acid (HCl) through the resin at the rate of 3 mL per min. Remove HCl with three (3) volumes of D—D water passed through the resin at the rate of 3 mL per in. The resin is further washed with D—D water at the rate of six (6) mL per min. The column is adequately washed of HCl when a 4–7 pH value is obtained. (It takes 2–3 hrs to charge and rinse this resin.)

C). Sodium hydroxide (0.275 N).

D). Hydrochloric acid (0.325 N).

E). Glycerol (≧99.5% purity). Glycerol stock solution: weigh 10 g glycerol into a small beaker. Quantitatively transfer to 1000 mL volumetric flask with repeated washes with D—D water. Make to volume with D—D water. It is important to measure or record the exact weight of the glycerol and again, taking care to weigh as close to 10 g as possible. Take purity and weight of glycerol into consideration when calculating final glycerol-standard concentration. (A glycerol standard solution having a concentration of 10 mg per mL is preferred.)

F). Dextrose, HPLC grade, high purity ≧99.5%.

V. Procedural Steps in Determining Total Dietary Fiber in Foods

A. Sample enzymatic hydrolysis and filtration: Follow AOAC method 985.29.

Each sample is prepared in duplicate. Two blank digestion determinations are also accomplished. These duplicate samples allow for corrections in subsequent residue weights for ash and protein.

This residue weight, less protein, ash, and blank residue represents the weight of the dietary fiber by AOAC-Prosky method. The blank residue value used in the previous calculation must be corrected for its protein and ash content.

B. Filtrate recovery and high performance liquid chromatograph analysis:

The filtrate from V(A) is quantitatively transferred to a 1,000 mL round bottom flask.

The liquid contents of the round bottomed flask are evaporated with a rotary evaporator to obtain a near dryness residue. Redissolve the residue in the round bottomed flask with a minimum amount of distilled-deionized (D—D) water and transfer to a 50 mL volumetric flask. Add 10 mL of glycerol standard solution, 10 mg per mL, and make to volume with D—D water (see preparation of glycerol stock solution).

The contents of the 50 mL volumetric flask are quantitatively transferred to a column (75 cm×15 mm ID) containing 20 grams each, thoroughly mixed, of the charged ion-exchange resins, Amberlite IRA-67 (Sigma # A9960) and Amberlite 200 (Sigma #200)$^2$. The sample is washed through the column with 250 mL D—D water at the rate of 0.8 mL per min.

The 250 mL eluent collected from the ion-exchange column is quantitatively transferred into a 500 mL round bottom flask. The contents are evaporated to near dryness and quantitatively transferred to a 10 mL volumetric flask. Transfer the sample to a 10 mL disposable syringe and filter through a 0.2 micron filter.

Inject 20 uL of the sample on the high performance liquid chromatograph. Perform the HPLC analysis on the filtrate using the following operating conditions.

Analytical Column: HPLC column, TSK-GEL G2500PW$_{XL}$ (size: 7.8 mm ID×30 cm), TOSOH CORPORATION equipped with guard column (or pre-column), TSK guard column PW$_{XL}$ (size: 6.0 mm ID×4 cm), TOSOH CORPORATION.

Column temperature: 80° C.

Mobile phase: Water (distilled-deionized and degassed)

Flow rate: 0.5 mL/min.

C. Determining the response factor for dextrose; dextrose is equivalent to soluble indigestible saccharides (i.e. Fibersol) in HPLC response.

1). The objective of this portion of the experiment is to obtain the accurate measurement of soluble indigestible saccharides in the digestion filtrate by HPLC. Each chromatograph must be evaluated or standardized for the RI response of soluble indigestible saccharides. This is accomplished using dextrose and glycerol.

2). The peak areas, representing concentration, obtained by HPLC analysis of equal amounts of soluble indigestible saccharides "i.e. Fibersol" and dextrose are equivalent. Glycerol is used as the internal standard but its peak area compared to the peak area of an equal amount of dextrose or Fibersol is not equivalent. A dextrose-glycerol standard curve is prepared to obtain a "response factor" to calculate the accurate amount of Fibersol or soluble indigestible saccharides in a chromatogram or sample.

3). Three solutions (i.e., volumetric flasks) containing the same amount of glycerol and three levels of dextrose are prepared. It is important to know and use the reported content (i.e., ≧99.5% purity) of both glycerol and dextrose standards.

Ten (10) g high purity glycerol is accurately weighed into a small beaker. (We use molecular biology grade glycerol with ≧99.5% purity.) The glycerol is quantitatively transferred to a 100 mL volumetric flask with D—D water and made to volume with D—D water. (Do not confuse this glycerol standard with that prepared and added to the sample before ion-exchange chromatography.) One-half (0.5), one (1) and (2) g of dextrose is accurately weighed into three separate 100 mL volumetric flasks. To each flask is added 10 mL of the glycerol standard solution (100 mg per mL) previously prepared. Each flask is made to volume with D—D water. (These three flasks represent the standard solutions to calculate the "response factor" for dextrose that is used to determine the amount of soluble indigestible saccharides found in the HPLC chromatograms.)

4). Inject twenty (20) uL of each standard glycerol-dextrose solution. Obtain the values for the peak areas of dextrose and glycerol from the three chromatograms. The reciprocal of the slope obtained comparing the ratio of peak area of dextrose/peak area of glycerol (y-axis) to the ratio of the weight of dextrose/weight of glycerol (x-axis) is the "response factor". Among laboratories, this "response factor" has been determined to be 0.83.

$$\text{Response factor} = \frac{1}{PA\text{-}dex/PA\text{-}gly \times Wt\text{-}gly/Wt\text{-}dex}$$

PA-dex=peak area dextrose

PA-gly=peak area glycerol

Wt-dex=weight of dextrose in standard

Wt-gly=weight of glycerol in standard

VI. Calculations

A). All values used in calculations are in mg, except for percent (%) values. Each sample is assayed in duplicate resulting in two sample weights values, sample weight and sample weight' (prime) and two blanks, blank and blank'(prime).

B). Calculate Total Fiber from AOAC (TF-AOAC) as per AOAC method 985.29. This value is the average of the two determinations.

C). Calculate percent (%) LMSDF as follows: Low molecular weight soluble dietary fiber (LMSDF) is soluble indigestible saccharides with a degree of polymerization of ≧3, after enzymatic hydrolysis.

Low molecular weight soluble dietary fiber =

$$\frac{\text{Peak area of } LMSDF}{\text{Peak area of glycerol}} \times \text{mg glycerol standard} \times \text{response factor} =$$

mg low molecular weight soluble dietary fiber ($LMSDF$)

$$\text{Percent}(\%) \ LMSDF = \frac{LMSDF}{\text{Sample Weight}} \times 100$$

Repeat calculations for the duplicate sample (prime), % LMSDF' using LMSDF' and Sample Weight'

D). % Average Low Molecular Weight Soluble Dietary Fiber $$\% \ ALMSDF = \frac{\% \ LMSDF + \% \ LMSDF'}{2}$$

E). Percent (%) total dietary fiber

% TDF=% TF−AOAC+% ALMSDF

8. Soluble Dietary Fiber: The content of soluble dietary fiber in a food is calculated as follows:

(% soluble dietary fiber)=(% Dietary Fiber)−(% insoluble dietary fiber)

Percent Dietary Fiber is measured as described in method #7 above. The % insoluble dietary fiber content of a food is measured by the enzymatic-gravimetric method known as AOAC Official Method 991.42, "Insoluble Dietary Fiber in Food and Food Products" (32.1.16, Chp. 32, pg. 5–6).

The soluble dietary fiber content per a given mass of food is calculated as follows:

(g soluble dietary fiber)=(mass of food)×(% soluble dietary fiber/100)

9. Beta-Glucan Soluble Fiber: The content of beta-glucan soluble fiber in a food is measured by an enzymatic-spectrophotometric method according to AOAC Official Method 992.28, "(1→3) (1→4)-Beta-D-Glucans in Oat and Barley Fractions and Ready-to-Eat Cereals" (32.2.06, Chp. 32, pg. 28–29C).

The beta-glucan soluble fiber content per a given mass of food is calculated as follows:

(g beta-glucan soluble fiber)=(mass of food)×(% beta-glucan soluble fiber/100)

10. Extractable Lipid and Calculation of Non-Digestible Lipid: The total extractable lipid content of a food is measured by an extraction method known as AOAC Official Method 983.23, "Fat in Foods; Chloroform-Methanol Extraction Method" (45.4.02, Chp. 45, pg. 64–65). Percent total non-digestible lipid is calculated as follows:

(% non-digestible lipid)=(% extractable lipid)−(% digestible fat)

The percent digestible fat value in the above equation is derived from method #3 of Applicants' Analytical Protocols.

The non-digestible lipid content per a given mass of food is calculated as follows:

(g non-digestible lipid)=(mass of food)×(% non-digestible lipid/100)

11. Water Activity: The water activity (Aw) of a food is measured using the following protocol and instruments:

Principle: The Rotronic Hygroskop relative humidity meter uses probes, each containing a humidity sensor and a temperature sensor, to measure the equilibrium relative humidity above a sample. A sample is introduced to the probe in an air tight chamber. After equilibrium has been reached, the relative humidity reading obtained from the instrument can be used to determine water activity (Aw).

Apparatus
a.) Rotronic Hygroskop model DT Relative Humidity Meter
b.) Model DMS100H Humidity Cells
c.) Rotronic Sample Dishes Part # PS-14

Reagents and Solutions
a.) 35% RH standard solution (EA-35) supplied by Rotronic Instrument Corp.
b.) 50% RH standard solution (EA-50) supplied by Rotronic Instrument Corp.
c.) 65% RH standard solution (EA-65) supplied by Rotronic Instrument Corp.
d.) 80% RH standard solution (EA-80) supplied by Rotronic Instrument Corp.

Procedure
a.) Instrument Operation and Calibration
  (i) Prepare a standard curve of meter reading vs. %relative humidity (% RH) at 25° C. using the four RH standards listed in this method. The accuracy of the calibration curves should be checked periodically using the relative humidity standard solutions.
  (ii) Carefully open a vial of RH standard solution and pour the contents into a plastic sample dish. Place the sample dish containing the standard solution into cell #1 of the instrument and seal tightly. Allow at least one hour for the meter reading to stabilize. Record the meter and temperature readings.
  (iii) Repeat step 2 for the other humidity standards.
  (iv) Prepare a standard curve by plotting the meter readings against the known RH of the standards.
  (v) Prepare a standard curve for cell #2 in the same fashion.
b.) Sample Analysis
  (i) Select a humidity cell to use for the analysis. Wipe clean the inner surfaces of the cell with a paper towel. This will remove anything left over from a previous sample.
  (ii) Obtain a sample of food product. Samples must be at room temperature before the analysis can be run.
  (iii) Place the sample into a plastic sample dish. The sample may need to be crushed or ground (eg. crackers) to fit into the dish. The dish should be filled as much as possible with the sample.
  (iv) Place the sample dish into a cell and place the cell into the instrument. Keeping the cell level, seal the cell tightly to the instrument.
  (v) Allow at least ½ hour for meter reading to stabilize. Trend lights on both the RH meter and temperature meter should not be lit when recording a reading. If either is lit at the end of ½ hour, wait until they go out before recording the meter readings.
  (vi) Record the RH and temperature meter readings.
  (vii) Convert the RH meter reading to the equilibrium % RH using the previously prepared standard curve for the cell used. Convert the equilibrium relative humidity to Aw.

c.) Water activity (Aw)Calculations: Aw=% RH/100

All AOAC (Association of Official Analytical Chemists) published methods can be found in the following reference which is incorporated by reference in its entirety:

AOAC International, *Official Methods of Analysis*, P. Cunniff (ed.), 16$^{th}$ edition, 5$^{th}$ Revision, 1999, Gaithersburg, Md.

Taste Test Protocol 1.1

During the course of their work, Applicants had a need to rate the taste profile of various products and embodiments of their invention. Since "taste" represents complex perceptions that interpret chemical, physiological and psychological clues into the "likes" and "dislikes" of the foods we eat and since Applicants are unaware of any standard method for rating the overall result of the interaction of said complex perceptions, Applicants have developed a simple and precise method for determining a food products overall taste acceptability. The protocol also seeks to ensure that any group of panelists who are evaluating any product's taste system have basic taste preferences that are reasonably representative of the general population. When this protocol is followed, the result is an overall taste rating which can be used to indicate how acceptable a specific product's taste system is in absolute terms and also relative to other products.

Taste Test Method Description

If a protocol is statistically based, it need not be elaborate or complicated. Accordingly, this Taste Test Protocol is robust, yet uncomplicated, as it requires only the use of basic statistics. Consequently, if this protocol is followed, one or more food products' taste systems can be quickly evaluated with little effort and expense.

The Taste Test Protocol consists of two steps:

1.) Produce the Protocol Reference Product according to the following method and detailed formulation:

| REFERENCE PRODUCT FORMULA | |
|---|---|
| Ingredient | Crumb Formula Weight Percent |
| Salt (Kroger, Cincinnati, OH) | 0.46 |
| Granulated Sugar (Domino Sugar Corp., New York, NY) | 17.16 |
| Arrowroot Flour - McCormick & Co. Inc., Hunt Valley, MD. | 14.12 |
| All Purpose Flour - Gold Medal, General Mills Sales, Minneapolis, MN. | 34.84 |
| Double-acting Baking Powder - Clabber Girl, Hulman & Co., Terre Haute, IN. | 0.32 |
| All-Vegetable Shortening - Crisco ®, Procter & Gamble, Cincinnati, OH. | 6.27 |
| Whole Eggs | 26.83 |

MAKING PROCEDURE

Dough Making a.) Adjust formulation to make about a 500 g batch.

b.) Combine arrowroot, flour, salt, and baking soda in a medium bowl and stir with fork to mix well.

c.) Cream shortening and sugar in small bowl of a stationary Sunbeam Mixmaster electric stationary mixer (Cat. No. 01401) at speed #6 until blended and creamy.

d.) Add eggs one half at a time to #2 and beat at speed #6 until well blended.

e.) Add dry ingredients gradually to creamed mixture at speed #1 until blended.

Baking a.) Drop 2.5 g–3.0 g dough balls onto a 12.5 inch×16.5 inch Wilton Performance Baking Sheet (about 25 dough balls per sheet). Flatten each dough ball into about a 1.25-inch (3.17 cm) diameter circle.

b.) Bake in a pre-heated oven at 350° F. (176.7° C.) for about 7.5 minutes or until brown around edges.

c.) Remove cookies from the baking sheet after about 10 minutes and place on a cooling rack to cool.

2.) For the reference product and each taste system that will be evaluated, follow the steps listed below.

a.) Obtain 256 panelists in a manner such that they, as a group, are representative of the general population of the country of interest with respect to the key demographic variables. Examples of demographic variables may include age, gender and ethnic background. Ways of accomplishing this selection process include but are not limited to: (1) stratifying the subject recruitment process by the key variables, or (2) randomly selecting individuals from a small geographic location (such as a city) that has been validated to be representative of the general population of the country of interest. No matter what process is used, care should be taken to minimize bias in the results due to recruiting a disproportionate number of individual from a particular demographic group. Once a group of 256 panelists has been obtained, one half of the group (128 panelists) should be randomly assigned to taste the reference product and the remainder of the group should be assigned to taste the test product. The randomization should be carried out in such a manner that each product has equal representation within each demographic stratum.

b.) Next, direct the panelists to cleanse their mouth of any pre-existing flavors or residue from previously consumed food or drink; this is accomplished by a technique familiar to those in the food industry in which panelists take a bite, chew and swallow a bland item and then rinse their mouth with water. For purposes of Applicants' test, said bland item is an un-salted soda cracker marketed as Zesta Unsalted Tops™ which can be obtained from the Keebler Company of Elmhurst, Ill. U.S.A.

c.) After the panelists have cleansed their mouths, provide fresh reference product to the panelists assigned to the reference product group and the test product to the panelists assigned to the test product group. Instruct the panelists to taste as much of the product that they are given as necessary to rate the taste system of that product. The panelists may swallow the product they are testing if they desire.

d.) Immediately after tasting the test product, have the panelists complete the questionnaire that is illustrated and described more fully below under the "Questionnaire" section of this test protocol.

e.) Analyze the results as follows:

(i) Calculate the sample mean of the overall taste score for each product's taste system and sample variance of the overall taste score for each product's taste system according to the method described on pages 24 and 35 of Chapter 2 in the *Introduction To Statistics* by Ronald E. Walpole, 3rd Edition (1982) New York, N.Y.

(ii) Next, calculate a confidence interval for the difference between the sample means of the reference product's overall taste score and the test product's overall taste score using the method known as "Small-sample Confidence Interval for $\mu_1-\mu_2; \sigma_1^2 \neq \sigma_2^2$ Unknown" that is contained on page 258 of Chapter 9 in the *Introduction To Statistics* by Ronald E. Walpole, 3rd Edition (1982) New York, New York. The reference, *Introduction To Statistics* by Ronald E. Walpole, 3rd Edition (1982) New York, N.Y., is incorporated by reference in its entirety Questionnaire The taste assessment questionnaire is very simple. The questionnaire was designed to avoid any extraneous issues, as this helps to ensure accurate, reproducible execution by test administrators and the panelists participating in the taste assessment. Accordingly, the questionnaire contains only one question—the panelists are asked to evaluate the taste system of the product that they tasted by giving it a 0 to 100 rating, wherein the scale is comprised of 5 point numerical increments, accompanied by a gradation of descriptors which orient the consumer to the best or maximum taste rating, i.e., 100="excellent" taste, and lowest or minimum taste rating, i.e., 0="poor", with appropriate intermediate descriptors at equal intervals: 75="very good"; 50="good"; and "25="fair", a scale commonly used in market, consumer and product research. Panelists are instructed to indicate a taste rating for a test product by circling the one number on the scale which represents their opinion of the overall taste (e.g., flavor, texture, etc.) of the test product being evaluated. Beyond the singular overall taste question, the questionnaire asks for only general demographic information regarding gender, age, and ethnic group, and how much the panelists generally likes or dislikes the general flavor category which the test product represents. These last questions are asked to ensure that the panel reflects taste preferences of the general population.

In selecting the scale for the questionnaire, an important consideration was the understanding of the normal degree of variation among consumers as to what they as individuals consider good taste. Experts in the food area understand the standard deviation of taste measures with an appropriately chosen 100 point scale will be approximately 25 points. As a result of the forgoing, and other considerations, Applicants selected the scale that is used in the taste test questionnaire depicted below.

```
+--------------------------------+
|  PRODUCT CODE:  |              |
+--------------------------------+

+--------------------------------+
|  Panelist Name: |              |
+--------------------------------+
|  Date:          |              |
+--------------------------------+
```

TASTE TEST QUESTIONNAIRE- Part 1

Before tasting the test sample, please answer each of the following questions, which will be used only to divide our interviews into groups.
1. Are you female or male? (X One Box)
    female [ ] 1
    male [ ] 2
2. Which group below describes your age? (X One Box)
    Age 18–24    [ ] 1
    Age 25–34    [ ] 2
    Age 35–44    [ ] 3
    Age 45–54    [ ] 4
    Age 55–64    [ ] 5
    Age 65 years or older [ ] 6

-continued

3. Which of the following best describes your ethnic group?
(X One Box)
    Asian    [ ] 1
    Black    [ ] 2
    Hispanic    [ ] 3
    Caucasian    [ ] 4
    Other    [ ] 5
4. Which of the following phrases best describes how well you like or dislike (enter test product flavor here) flavor.
(X One Box)
    Like extremely well  [ ] 1
    Like very well  [ ] 2
    Like quite well  [ ] 3
    Like somewhat  [ ] 4
    Like slightly  [ ] 5
    Not like at all  [ ] 6
Please turn the page and continue with the question
TASTETEST
    TASTE TEST QUESTIONNAIRE- Part 2

PLEASE TAKE A BITE OF CRACKER AND A SIP OF WATER BEFORE TASTING THE TEST SAMPLE. READ THE FOLLOWING PANELIST INSTRUCTIONS BEFORE COMPLETING THE SCALE BELOW.

Panelist Instructions:
- Eat as much of the test sample as you wish in order to form a definite opinion of the product.
- On the scale below, please rate your opinion of your OVERALL TASTE (e.g., flavor, texture, etc.) of the test sample.
- You will notice the scale ranges from 0 to 100 with the following scale descriptions: "Excellent" (100), "Very Good" (75), "Good" (50), "Fair" (25) and "Poor" (0).
- There are also five point increments in between each scale description to choose from as well for your answer.
- You may choose any one number on the scale to represent your opinion.

Using the entire scale below, please circle which ONE of the following scale numbers best represents your opinion of the OVERALL TASTE (e.g., flavor, texture, etc.) of the test sample you just tried:

| Taste Rating Scale (circle one) | Scale Description |
|---|---|
| 100 | Excellent |
| 95 | |
| 90 | |
| 85 | |
| 80 | |
| 75 | Very Good |
| 70 | |
| 65 | |
| 60 | |
| 55 | |
| 50 | Good |
| 45 | |
| 40 | |
| 35 | |
| 30 | |
| 25 | Fair |
| 20 | |
| 15 | |
| 10 | |
| 5 | |
| 0 | Poor |

Thank you for your help with this study. Please return the completed questionnaire to the test administrator.

PROCESS OF MAKING NUTRITIOUS COMPOSITIONS

Cracker Making

The following unit operations are unique to the production of crackers of this invention:

1) Docking—holes are traditionally made in a cracker dough form before baking. While not to be bound by theory, it is believed docking bonds the dough layers together at discreet points to prevent excessive inflation (pillowing) of the cracker. Another function of docking it believed to be venting to allow the steam and gasses generated during baking to escape the structure which aids in lowering the post-baked moisture, and reduces excessive inflation. The appearance of these docking holes has been found to distract from the healthful image of the product. This may be because consumers identify the product with traditional crackers, which are not seen as healthy foods. It has been learned that pressing bits, such as nut pieces (8–12 mesh) into the dough form prior to baking accomplishes the same effect on the structure as docking holes. The appearance of the final product is much more healthful to the consumer, possibly because of the nuts on the surface, and possibly because the product no longer looks like a traditional cracker.

2) Water spray—is used on the dough forms immediately before they enter the oven to control color. It has been found that surface water spray of 0.02–0.22 g/sq.in. (0.003–0.034 g/sq.cm) immediately prior to baking (oven entry) can result in a very noticable lightening of the baked cracker color. This is important because the lighter cracker color is consistent with the consumer's view of more healthy products. Surprisingly, this extra water spray was found to have very little impact on the final baked moisture of the cracker. This is important because low moistures (>about 5–6%) are necessary to achieve the desired crispness in eating quality.

3) Water spray—when oven and oven band temperatures cannot be adjusted, water spray is used on the oven band immediately before the dough forms are transferred onto it from the feeder conveyor belt. This creates a damp band surface which facilitates the adherence of the dough form to the oven band. Without this help, rectangular dough forms are susceptible to shape deformation in the form of arching. This arching occurs such that the center of the shape is lifted off of the oven band surface. This deformation from a straight line from end to end can be as much or more than $\frac{1}{8}$" (0.32 cm), which makes sandwiching two crackers very difficult.

4) Oil spray—upon exit from the oven is normally done in a traditional cracker making operation in order to reduce the dryness impression during eating. The crackers of this invention are sprayed with Olean. A forced air spray nozzle, made by Spraying Systems Co. of Palatine, Ill. is found to be useful in ensuring that uniformly controlled quantities of Olean are sprayed onto the cracker surface.

Filling Making

Applicants' filling making processes include hot and cold processes. There are three major differences in Applicants' hot and cold processes:

1.) In the cold process any vitamins are crystallized in about a 1:1 weight ratio with shortening before being added to any other filling ingredients, and said other filling ingredients should be below the crystallization temperature of said vitamin/shortening mix before being combined with said vitamin/shortening mix.

2.) Also, in the cold process, any additional shortening is crystallized before being added to any other filling ingredients, and said other filling ingredients should be below the crystallization temperature of said additional shortening before being combined with said additional shortening.

3.) All mixing is done at the lower of the shortening's crystallization temperature or 90° F. (32.2° C.). In addition to the processing differences list above, when Applicants' cold filling making process is used to make a filling, stabilizers may not be required and it may be possible to use lower levels of flavorings. In addition to the teachings listed above, Applicants' have provided numerous detailed examples teaching methods of making fillings.

Method of Use

Embodiments of Applicants' invention may be used as weight control products, as they are nutritionally balanced and low in fat. In addition, embodiments of Applicants' invention may be consumed as a protein or fiber supplements. Also, since embodiments of Applicants' invention contain heart healthy components that, in addition to other benefits, can impart a hypocholesterolemic capability to foods, said embodiments may be consumed by a subject to lower the subject's serum total and LDL-cholesterol. The following is a specific example of a method of using said embodiments to lower a subject's serum total and LDL-cholesterol. This example is illustrative of the invention and is not to be construed to limit the invention in any way.

Method of Use

The filled cracker of Example 8 is used as a functional food composition to lower serum total and LDL-cholesterol. This product contains about 9.6 g of olestra (Olean brand) and about 6.25 g of soy protein per 40 g serving size. A group of at least 25 hypercholesterolemic subjects consume 3 servings/day of the filled crackers. The servings are spaced throughout the day; e.g., consumed with the breakfast, lunch, and dinner meals. Consumption continues for a period of 28 consecutive days. On day 1, a fasting blood sample is collected from each subject for measurement of the baseline blood lipid profile (total, LDL-, and HDL-cholesterol, and total lipids). On day 28, a second fasting blood sample is drawn from each subject and the blood lipid profile measured. For each subject, the blood lipid profile on day 28 is compared to the baseline profile measured on day 1. Following treatment, the total and/or LDL-cholesterol is reduced from the baseline level by an average of at least 10%.

PRODUCT AND PROCESS EXAMPLES

The following processing teachings apply to the specific embodiments of Applicants' invention that are described later in this application. These processing teachings and examples are illustrative of the invention and are not to be construed to limit the invention in any way.

Making Procedures For Examples
Peanut Butter Filling Making Procedure PNB#1 (For Examples 1, 11 and 3)
Step #1—Preparation of De-fatted Peanut Flour
Peanuts are roasted to a 36–37 L' roast color and then ground in a Bauer conventional grinder to produce a nut paste of pumpable consistency. The method for determining L' roast color values is disclosed in U.S. patent application Ser. No. 09/511,058 and in WO051449A1 both of which are incorporated by reference. The nut paste is defatted by using a mechanical press. The fat content of the defatted solids is 20%. The nut solids are then milled to a mono modal particle size distribution using a Lehmann mill (Model 4039).

Step #2—Pre-blending Ingredients

1. The roll mill solids, peanut oil and 8.2% of the total Olean® are weighed together. Then the vitamins are added.
2. Next, the ingredients from 1 above are blended, using a Hobart mixer (ModelC-100) at speed setting #1 for 5 minutes, until all the ingredients are well blended.

Step#3—Heating and Finishing

1. A jacketed Hobart (Model C-100-T) is preheated, 1 hour prior to using, to a temperature of about 150° F. (65.6° C.).
2. The sucrose, salt, fiber, remaining Olean®, and vitamins are blended for 40 minutes in the heated Hobart at speed setting #1.
3. Then the rolled mill solids/peanut oil/Olean® mixture is added and blended in Hobart for 40 minutes.
4. Next, the mixture is cooled through the temperature range of 130° F.–140° F. (54.4° C.–60.0minutes to ensure the proper crystallizing structure. This can usually be accomplished by ambient cooling for lab batch sizes.
5. The resulting filling is stored at room temperature until used.

Peanut Butter Filling Making Procedure PNB#2 (For Examples 4, 12 and 13)

Step #1—Preparation of De-fatted Peanut Flour

Peanuts are roasted to a 36–37 L' roast color and then ground in a Bauer conventional grinder to produce a nut paste of pumpable consistency. The method for determining L' roast color values is disclosed in U.S. patent application Ser. No. 09/511,058 and in WO051449A1 both of which are incorporated by reference. The nut paste is defatted by using a mechanical press. The fat content of the defatted solids is 20%. The nut solids are then milled to a mono modal particle size distribution using a Lehmann mill (Model 4039).

Step#2—Heating and Finishing

1. A jacketed Hobart (Model C-100-T) is preheated, 1 hour prior to using, to a temperature of about 150° F. (65.6° C.).
2. All the ingredients, wet and dry, including the vitamins are weighed, combined and then mixed in the heated Hobart at speed setting #1 for 1 hour.
3. Next, the mixture is cooled through the temperature range of 130° F.–140° F. (54.4° C.–60.0° C.) in about 10 minutes to ensure the proper crystallizing structure. This can usually be accomplished by ambient cooling for lab batch sizes.
4. The resulting filling is stored at room temperature until used.

Peanut Butter Filling Making Procedure PNB#3 (For Example 10)

Step #1—Preparation of De-fatted Peanut Flour

Peanuts are roasted to a 36–37 L' roast color and then ground in a Bauer conventional grinder to produce a nut paste of pumpable consistency. The method for determining L' roast color values is disclosed in U.S. patent application Ser. No. 09/511,058 and in WO051449A1 both of which are incorporated by reference. The nut paste is defatted by using a mechanical press. The fat content of the defatted solids is 20%. The nut solids are then milled to a mono modal particle size distribution using a Lehmann mill (Model 4039).

Step #2—Pre-blending Ingredients

1. The roll mill solids, peanut oil and 11.5% of the total Olean® are weighed together. Then the vitamins are added.
2. Next, the ingredients from 1 above are blended, using a Hobart mixer (ModelC-100) at speed setting #1 for 5 minutes, until all the ingredients are well blended.

Step#3—Heating and Finishing

1. A jacketed Hobart (Model C-100-T) is preheated, 1 hour prior to using, to a temperature of about 150° F. (65.6° C.).
2. The sucrose, salt, fiber, remaining Olean®, and vitamins are blended for 40 minutes in the heated Hobart at speed setting #1.
3. Next, the constant behenic stabilizer (cbc) is placed in a separate container and then heated via a microwave to a temperature of 150° F. (65.6° C.) at which point the cbc is a clear liquid.
4. Then the rolled mill solids/peanut oil/Olean(® mixture from Step #2 is added to the mixture from Step #3(2) above and then the melted cbc is added. The resulting mixture is blended in the heated Hobart for 1 hour at speed setting #1.
5. Next, the mixture is cooled through the temperature range of 130° F.–140° F. (54.4° C.–60.0° C. ) in about 10 minutes to ensure the proper crystallizing structure. This can usually be accomplished by ambient cooling for lab batch sizes.
6. The resulting filling is stored at room temperature until used.

Peanut Butter Filling Making Procedure PNB #4 (For Example 14)

Step # 1 Preparation of De-fatted Peanut Flour

Peanuts are roasted to a 36–37 L' roast color and then ground in a Bauer conventional grinder to produce a nut paste of pumpable consistency. The method for determining L' roast color values is disclosed in U.S. patent application Ser. No. 09/511,058 now U.S. Pat. No. 6,312,754 and in WO051449A1 both of which are incorporated by reference. The nut paste is defatted by using a mechanical press. The fat content of the defatted solids is 16.5%.

Step #2 Roll milling of peanut solids

The nut solids are then combined with the fiber, soy protein isolate and 7.89% Olean®. The total oil content of the mix is 20%. The mix is passed through a 4 roll refining mill to reduce the particle size and to coat the solids with a film of oil and Olean®. The particle size of the mix has a $D_{50}$ and a $D_{90}$ of 7.6 and 22 microns, respectively.

Step #3 Refatting of peanut mix composition

The vitamin mix is combined with 14.4% of the Olean® and mixed for 3 minutes. The roll mix is then added. The mixing is done in a jacketed double arm mixer manufactured by Werner Lehara. The mixer is preheated to 200° F. (93.3° C.) prior to mixing. The mixing speed is set to medium and the mix temperature is about 150° F. (65.6° C.). The mixture is mixed for 10 minutes to convert the mix to a fluid paste.

Step #4 Sugar slurry mix

A sugar containing oil/Olean® suspension is prepared by mixing 12× sugar, salt, lecithin, and 26.73% Olean® in a jacketed double arm mixer manufactured by Werner Lehara. The mixer is preheated to 200° F. (93.3° C.) prior to mixing. The mixing speed is set to medium and the mix temperature is about 150° F. (65.6° C.). To achieve the desired viscosity, the materials are mixed for about 10 minutes.

Step #5 Blend Composition

Constant behenic stabilizer (cbc) is melted in a microwave able resistant container until its temperature reaches 150° F. (65.6° C.) and it becomes liquid. The peanut and sugar containing oil suspensions are then combined and mixed with the melted cbc in a jacketed double arm mixer manufactured by Werner Lehara.

The mixer is preheated to 200° F. (93.3° C.) prior to mixing. The mixing speed is set to medium and the mix temperature is about 150° F. (65.6° C.). To achieve the desired viscosity, the materials are mixed for about 5 minutes.

Cold Peanut Butter Filling Making Procedure for PNB #4 (for Example 14) That Does Not Require Constant Behenic Stabilizer (cbc)

Step #1 Preparation of De-fatted Peanut Flour

Peanuts are roasted to a 36–37 L' roast color and then ground in a Bauer conventional grinder to produce a nut paste of pumpable consistency. The method for determining L' roast color values is disclosed in U.S. Pat. No. 6,312,754 and in WO051449A1 both of which are incorporated by reference. The nut paste is defatted by using a mechanical press. The fat content of the defatted solids is 16.5%.

Step #2 Roll milling of peanut solids

The nut solids are then combined with the fiber, soy protein isolate and 7.89% Olean®. The total oil content of the mix is 20%. The mix is passed through a 4 roll refining mill to reduce the particle size and to coat the solids with a film of oil and Olean(®). The particle size of the mix has a $D_{50}$ and a $D_{90}$ of 7.6 and 22 microns, respectively.

Step #3 Vitamin Slurry

A vitamin containing oil/Olean® suspension is prepared by mixing the vitamin mix and Olean in a 1:1 ratio in a jacketed Hobart (Model C-100-T). The mixer is preheated to about 150° F. (65.6° C.) and a speed setting 2. To achieve good dispersion of the vitamins, the material are mixed for about 10 minutes. The mix is transferred to a second jacketed Hobart (Model C- 100-T). The mixer is set to about 60° F. (15.5° C.) and a speed setting 2. The materials are mixed until the material temperature is below 80° F. (26.6° C.).

Step #4 Refatting of peanut mix composition

The roll mill mix is combined with the vitamin slurry and 14.4% Olean®. The mixing is done in a jacketed double arm mixer manufactured by Werner Lehara. The mixer is controlled at 70° F. (21.1° C.) prior to mixing. The mixing speed is set to medium and the mix temperature is about 70° F. (21.1° C.). The roll mill mix is slowly added to the Olean (5 minutes). The roll mill/Olean mixture is further mixed for 10 minutes to convert the mix to a fluid paste.

Step #5 Sugar slurry mix

A sugar containing oil/Olean(® suspension is prepared by mixing 12× sugar, salt, lecithin, and 26.73% Olean® in a jacketed double arm mixer manufactured by Werner Lehara. The mixer is controlled at 70° F. (21.1° C.) prior to mixing. The mixing speed is set to medium and the mix temperature is about 70° F. (21.1° C.). To achieve the desired viscosity, the materials are mixed for about 10 minutes.

Step #6 Blend Composition

The peanut and sugar containing oil suspensions are combined and mixed in a jacketed double arm mixer manufactured by Werner Lehara. The mixer is controlled at 70° F. (21.1° C.) prior to mixing. The mixing speed is set to medium and the mix temperature is about 70° F. (21.1° C.). To achieve the desired viscosity, the materials are mixed for about 5 minutes.

Cheese Filling Making Procedure For Examples 2, 5, 6, 7, 8, 9, and 15

1. The fiber is weighed in a separate bowl.
2. Any cheese powder, soy protein, whey protein, corn syrup solids, sucrose, and cheese flavor are weighed together.
3. Next, the Olean® and Kaomel Flakes are weighed and then mixed together in a container.
4. The Olean(® and Kaomel Flake mixture is melted by heating until the temperature reaches 150° F.–160° F. (65.6° C.–71.1° C.). For lab scale, this is best accomplished by heating in a microwave oven at one-minute intervals, with stirring in between intervals, with power setting on high. After the desired temperature is reached, the vitamins are added.
5. The melted fat blend is mixed with the fiber using a Kitchen Aid (Model KSM90 Ultra Power) mixer for 1 minute at speed setting #2. The rest of the dry ingredients are added and blended for 5 minutes at speed setting #5.
6. Then the mixture is cooled through the temperature range of 130° F.–140° F. (54.4° C.–60.0° C. ) in about 10 minutes to ensure the proper crystallizing structure. This can usually be accomplished by ambient cooling for lab batch sizes.
7. The resulting filling is stored until used.

Bar Making Procedure (Examples 12 and 13)

Dough Making and Sheeting

1. The shortening, salt, sugar, powdered milk, and powdered egg yolks are creamed together in a Hobart mixer for 2 minutes on speed #2 (medium).
2. Next, the ammonium bicarbonate in cool water, corn syrup, and invert syrup are added and the resulting mixture is creamed for an additional 3 minutes at speed #2 (medium).
3. Then, the remaining water followed by flour, sodium bicarbonate, and leavening salt(s), are added. The resulting mixture is mixed for 5 minutes in the Hobart mixer on speed #1 (low) to produce a dough.
4. The dough from #3 above is rolled out with a hand rolling pin to approximately a 0.2-inch (0.5 cm) thickness.
5. Next, the dough is run through a two-roll mill that is hand operated and which has 3-inch (7.6 cm) diameter rolls, to a attain final sheet thickness of 0.1 inches (0.25 centimeter).

Bar Filling Procedure

1. A pizza cutter is used to cut out two 3.0×4.5 inch (7.6×11.4 cm) bar impressions from the dough sheet of Step #5 of the above Dough Making and Sheeting Procedure.
2. Next, filling is placed on one side (one-half length wise) of the bar dough prepared in Step #1 above. The filling is spread uniformly with a spatula or syringe, while avoiding the outer edges by ⅛ to ¼ of an inch (0.3 to 0.6 cm). In the case of dual fillings, the desired amount of each filling is placed side by side.
3. Then, the side of the bar that is not covered with filling is folded over the side having the filling, to form an unfinished bar.
4. The edges of the unfinished bar are then sealed, using a 1.5×4.5 inch (3.8×11.4 cm) bar-former die cutter.
5. Next, several docking vents are cut on top of the bar using a small spatula having an approximately ¼ inch (0.64 cm) wide blade.

6. The bar is then transferred to an oven band or baking sheet and baked at 425° F. (218.3° C.) for 6½ minutes.
7. After the baked bars are removed from the oven they are cooled ambiently to room temperature.

Cracker Making Procedure For Example 14

Dough Making

1. Corn syrup, malt syrup, shortening, hot water at 1 60° F. (71.1° C.), and enzyme tablets dissolved in water are weighed into an APV 100# single blade horizontal mixer and then mixed for 30 seconds at 38 rpm.
2. Next, sugar, salt, vitamin blend, and L-cysteine are weighed into the mixer and then mixed for 2 minutes at 38 rpm.
3. Then, the remaining dry ingredients (flour, fibers, proteins, sodium bicarbonate, and non-ammonia leavening salts) are weighed into mixer and mixed for 3 minutes at 45 rpm.
4. Then, ammonium bicarbonate, dissolved in cool water, is added and mixed for one minute at 60 rpm.
5. The resulting dough is emptied into a stainless steel tram, covered with plastic sheet, and allowed to "rest" at room temperature for 30 minutes.

Dough Forming

1. Dough is fed through a three-roll mill having two initial 16.5 inch (41.9 cm) corrugated rolls and one smooth 11.8-inch (30.0 cm) diameter roll and sheeted to 0.25 inches (0.64 cm). The take-off belt speed exiting the three-roll mill is 2.0 fpm (0.6 mpm), and is matched to the speed of the dough sheet as it exits the three-roll mill.
2. The sheet is sent through a calender roll #1 (an 11.8 inch or 30.0 cm diameter two-roll mill), and sheeted to approximately 0.10 inches (0.25 centimeters) in thickness. The take-off belt speed exiting the calender roll #1 is 4.4 fpm (1.34 mpm), and is matched to the speed of the dough sheet as it exits the calender roll #1.
3. As the sheet comes through calender roll #1, it is folded over eight times to a width of approximately 10 inches (25.4 cm) to form a bundle of laminated dough. The bundle is covered with plastic film to prevent dehydration and briefly set aside while additional bundles are collected.
4. The laminated sheet of Step 3 above is sent through the two-roll mill #1 again to form a 0.10-inch (0.25 cm) thick sheet.
5. Before the dough sheet reaches calender roll #2 (an 11.8 inch or 30.0 cm diameter two-roll mill), a 90/10 mixture of almond pieces (Paramount Farms, Lost Hills, Calif.) about 8 to 12 mesh in size, and bran (Red Wheat Bran, Canadian Harvest, St. Thomas, Ontario Canada), are added at a level of about 1.0–1.5% of the total filled cracker weight by uniformly sprinkling the pieces across the dough sheet immediately before calendering roll #2 such that they are pressed into the dough sheet.
6. The sheet continues on calender roll #2 to form a finished dough sheet approximately 0.08 inches (0.20 cm) thick. The take-off belt speed exiting the calender roll #2 is 7.9 fpm (2.41 mpm), and is matched to the speed of the dough sheet as it exits the calender roll #2.
7. The dough sheet is then passed under a cutter die roll to form crackers of desired size/shape. The belt speed is 7.7 fpm (2.35 mpm). The 3.875-inch (9.842 cm) diameter cutter roll (obtained from Weidenmiller Co. Itasca, Ill.) is designed to cut about a 1.1×3.4 inch (2.8×8.6 cm) rectangular bar shape. The cutter roll does not have docking pins inside the shape to be cut. The addition of the bits is thought to serve the function of the docking pins, as the dough layers are joined together and venting is created during baking.
8. After separating the web (the portion of the sheet left over after the shapes are cut out), the crackers are salted using a roller-salter or equivalent. The web may be recycled back to the dough waiting to be introduced into the three-roll mill.
9. The cracker dough forms are then sprayed with a water mist (flow rate=65–212 g/min.) before baking. This helps attain a lighter color after baking.

Cracker Making Procedure for Examples 1, 2, 3, 4, 5, 6, 7, 8, 9, 10 and 11

Dough Making

1. Corn syrup, malt syrup, shortening, hot water at 160° F. (71.1° C.), and enzyme tablets dissolved in water are weighed into an APV 100# single blade horizontal mixer and then mixed for 30 seconds at 38 rpm.
2. Next, sugar, salt, vitamin blend, and L-cysteine are weighed into the mixer and then mixed for 2 minutes at 38 rpm.
3. Then the remaining dry ingredients (flour, fibers, proteins, sodium bicarbonate, and non-ammonia leavening salts) are weighed into mixer and mixed for 3 minutes at 45 rpm.
4. Then ammonium bicarbonate, dissolved in cool water, is added and mixed for one minute at 60 rpm.
5. The resulting dough is emptied into a stainless steel tram, covered with plastic sheet, and allowed to "rest" at room temperature for 30 minutes.

Dough Forming

1. Dough is fed through a three-roll mill having two initial 16.5 inch (41.9 cm) corrugated rolls and one smooth 11.8-inch (30.0 cm) diameter roll and sheeted to 0.25 inches (0.64 cm). The take-off belt speed exiting the three-roll mill is 2.0 fpm (0.6 mpm), and is matched to the speed of the dough sheet as it exits the three-roll mill.
2. The sheet is sent through a calender roll #1 (an 11.8 inch or 30.0 cm diameter two-roll mill), and sheeted to approximately 0.10 inches (0.25 centimeters) in thickness. The take-off belt speed exiting the calender roll #1 is 4.4 fpm (1.34 mpm), and is matched to the speed of the dough sheet as it exits the calender roll #1.
3. As the sheet comes through calender roll #1, it is folded over eight times to a width of approximately 10 inches (25.4 cm) to form a bundle of laminated dough. The bundle is covered with plastic film to prevent dehydration and briefly set aside while additional bundles are collected.
4. The laminated sheet of Step 3 above is sent through the two-roll mill #1 again to form a 0.10-inch (0.25 cm) thick sheet.
5. Before the dough sheet reaches calender roll #2 (an 11.8 inch or 30.0 cm diameter two-roll mill), bits, such as, but not limited to, pieces of nuts, vegetables, grains, meats and candies, may optionally be added. These bits are uniformly sprinkled on the dough sheet immediately before calender roll #2 such that they are pressed into the dough sheet. For example, in Examples 4, 6, 8 and 10 almond pieces (Paramount Farms, Lost Hills, Calif.), about 8 to 12 mesh in size, are added at a level of about 1.0–1.5% the total filled cracker weight by uniformly sprinkling the bits across the dough sheet immediately before calendering roll #2 such that they are pressed into the dough sheet.

6. The sheet continues on calender roll #2 to form a finished dough sheet approximately 0.08 inches (0.20 cm) thick. The take-off belt speed exiting the calender roll #2 is 7.9 fpm (2.41 mpm), and is matched to the speed of the dough sheet as it exits the calender roll #2.

7. The dough sheet is then passed under an embossing roller and under a cutter die roll to form crackers of desired size/shape. The belt speed is 7.7 fpm (2.35 mpm). The embossing roller is a 3.75-inch (9.52 cm) diameter roll with a uniform pattern of 0.061-inch (0.153 cm) diameter pins spaced 5/16 inches (0.794 centimeters) apart in both the axial and radial directions. The 3.875-inch (9.842 cm) diameter cutter roll (obtained from Weidenmiller Co. of Itasca, Ill.) can be designed to cut a variety of shapes. The shape used in these examples is a 1.4 inch (3.6) diameter round shape with docking holes. These docking pins serve the purpose of preventing the dough form from inflating during baking. The function of the docking pins is thought to join the dough layers together and create venting during baking.

8. After separating the web (the portion of the sheet left over after the shapes are cut out), the crackers are salted using a roller-salter or equivalent. The web may be recycled back to the dough waiting to be introduced into the three-roll mill.

9. The cracker dough forms are then sprayed with a water mist (flow rate 65–212 g/min.) before baking. This helps attain a lighter color after baking.

Cracker Baking

1. The cracker dough forms are transferred as a continuous feed from the dough-forming belt onto the oven band such that their relative spacing is undisturbed (a slight speed differential is permissible if it is desired to place the cracker dough forms closer, or further apart on the oven band prior to baking). The oven band is made of metal of the open weave versus solid surface type. Solid surface metal oven bands may also be used for certain applications.

2. The cracker dough forms are baked in an APV 45 foot (13.7 m) long three-zone indirect-fired oven. Each zone has independent top and bottom heat applied. Dampers and temperatures in each zone are set at the following conditions:

| | |
|---|---|
| 1$^{st}$ zone top: 465° F. (240.6° C.), | bottom: 500° F. (260.0° C.), damper closed |
| 2$^{nd}$ zone top: 480° F. (248.9° C.), | bottom: 520° F. (271.1° C.), damper ½ |
| 3$^{rd}$ zone top: 355° F. (179.4° C.), | bottom: 425° F. (218.3° C.), damper open |

Oven Band Speed (fpm)

| Example | 1, 2, 11 & 14 | 3, 5, & 9 | 4, 6, 8 & 10 | 7 |
|---|---|---|---|---|
| Oven Band Speed: fpm (mpm) | 11.8 (3.6) | 11.0 (3.35) | 10.0 (3.05) | 11.5 (3.51) |

Final moisture contents are about 0–4%.

Post Baking

1. As the hot baked crackers exit the oven, they are sprayed with hot oil or Olean® at approximately 160° F. (71.1° C.) to a level of about 10% their post baked weight. The crackers are passed under heat lamps for approximately 15 seconds to aid in absorption of oil.

2. The crackers are then passed through a cooling tunnel at room temperature. Olean® containing products must cool through the temperature range of 130° F.–140° F. (54.4° C.–60.0° C.) in about 10 minutes to ensure the proper crystalline structure.

Sandwiching Procedure For Crackers (Examples 1, 2, 3, 4, 5, 6, 7, 8, 9, 10 and 11)

1. The filling is spread on a cracker.
2. A second cracker is placed on top of the filling that is spread on the first cracker thereby forming a finished sandwich cracker.

Sandwiching Procedure For Cracker (Example 14)

The cracker is in the shape of an approximately 1.2×3.4 inch (3.0×8.6 cm) bar, and weighs about 4.5 g. The filling (about 6.0 g) is placed between two crackers to form a cracker bar. The filling and sandwiching method is as follows:

Filling Sheeting Process

1. Apply approximately 300 grams of filling at ambient temperature to an approximately 15-inch×40-inch (38× 102 cm) sheet of waxed paper.
2. Apply 2$^{nd}$ sheet of wax paper and press firmly to approximately 0.5-inch (1.27 cm) thickness.
3. Use gauge rolls to reduce sheet to approximately 0.20 inches (0.51 centimeters).
4. Adjust gauge rolls to approximately 0.12 inches (0.30 centimeters) and sheet a second time.
5. Adjust gauge rolls to desired thickness of 0.07 to 0.10 inches (0.18 to 0.25 centimeters) to deliver target piece weight of 6.0 g and sheet one at a time.
6. Place finished sheet in freezer at 0° F. to 10° F. (−17.8° C. to −12.2° C.) until firm.
7. Remove sheet to flat surface, remove top sheet, and cut strips 1.01×3.20 inches (2.57×8.13 centimeters) using cutter rolls.
8. Return sheet to freezer.

Sandwiching

1. Place a 16×24 inch (41×61 centimeter) tray on top of another tray of same dimension filled with dry ice pellets.
2. Remove filling from freezer and place on top tray.
3. Remove top sheet of wax paper.
4. Separate filling pieces and place on cracker.
5. Apply top cracker and apply light pressure.
6. Place two sandwiches top to bottom on U-board.
7. Seal in cellophane wrapper.

EXAMPLE 1

Peanut butter filled crackers having a crumb to filling ratio by weight of 1.5:1

| Ingredient | Crumb Formula weight percent | Filling Formula weight percent |
|---|---|---|
| 62DE Corn Syrup (Quality Ingredients Corp., Chester, NJ) | 0.62 | |
| Olean ® (Procter& Gamble Co., Cincinnati, OH) | 9.12 | 15.30 |
| Malt Syrup--(Hawkeye 5900 Quality Ingredients Corp.,Chester NJ) | 1.24 | |
| Peanut Oil (#022000, Ventura Foods, Opelousas, LA) | | 1.80 |
| Sugar 12X (Amalgamated Sugar Co., Ogden, UT) | | 15.80 |
| Granulated Sugar (Holly Sugar Co., Worland, WY) | 5.60 | |
| Iodized Salt (Morton International, Inc., Chicago, IL) | | 1.10 |
| Salt - TFC Purex (Morton International, Inc., Philadelphia, PA) | 0.30 | |
| L-Cysteine HCl Monohydrate (Quality Ingredients Corp., Chester NJ) | 0.04 | |
| Vitamin A, $D_3$, $K_1$ blend (Watson Foods Co., West Haven, CT) | 0.06 | 0.04 |
| Flour - soft wheat (Siemer Milling Co., Teutopolis, IL) | 42.82 | |
| Fiber - insoluble wheat (Vitacel ® WF-600/30, J. Rettenmaier, Ellwangen/J, Germany) | 3.00 | |
| Fiber - soluble (Fibersol-2, Matsutani Chem. Ind., Itami-city Hyogo, Japan) | 3.50 | 12.00 |
| Isolated Soy Protein (Supro ® 661, Protein Technologies Intl.. St. Louis, MO) | 6.00 | |
| Sodium Bicarbonate (Church & Dwight Co., Princeton, NJ) | 0.95 | |
| Calcium Phosphate Monobasic (Regent 12XX, Rhodia, Cranbury, NJ) | 0.76 | |
| Sodium Aluminum Phosphate (Levair, Rhodia, Cranbury, NJ) | 0.76 | |
| Ammonium Bicarbonate (Church & Dwight Co., Princeton, NJ) | 2.40 | |
| Processed De-fatted (20%) Peanut Flour from US#1 Medium Runner Peanuts (Cargill Peanut, Dawson GA) | | 53.96 |
| Water | 22.83 | |

A single reference serving (30 grams) of the resulting product is analyzed according to the protocols disclosed in the "Analytical Protocols" Section of this application and the test results indicate that the product's amino acid sources provide 24.9% of the product's total caloric content; that the product's fat sources provide 14.8% of the product's total caloric content; that the product's digestible saturated fat sources provide 2.9% of the product's total caloric content; and that the single reference serving contains 3.39 grams of dietary fiber.

EXAMPLE 2

Cheddar cheese filled crackers having a crumb to filling ratio by weight of 1.5:1

| Ingredient | Crumb Formula weight percent | Filling Formula weight percent |
|---|---|---|
| Corn Syrup (62DE Corn Syrup (Quality Ingredients Corp., Chester, NJ) | 0.62 | |
| Olean ® (Procter & Gamble Co., Cincinnati, OH) | 9.12 | 31.00 |
| Malt Syrup (Hawkeye 5900, Quality Ingredients Corp., Chester NJ) | 1.24 | |
| Granulated Sugar (Holly Sugar Co., Worland, WY) | 5.60 | |
| Salt - TFC Purex (Morton International, Inc., Philadelphia, PA) | 0.30 | |

-continued

Cheddar cheese filled crackers having a crumb to filling ratio by weight of 1.5:1

| Ingredient | Crumb Formula weight percent | Filling Formula weight percent |
|---|---|---|
| L-Cysteine HCl Monohydrate (Quality Ingredients Corp., Chester NJ) | 0.04 | |
| Vitamin A, $D_3$, $K_1$ blend (Watson Foods Co., West Haven, CT) | 0.06 | 0.07 |
| Flour - soft wheat (Siemer Milling Co., Teutopolis, IL) | 42.78 | |
| Fiber - insoluble wheat (Vitacel ® WF-600/30, J. Rettenmaier, Ellwangen, Germany) | 3.00 | |
| Fiber - soluble (Fibersol-2, Matsutani Chem. Ind., Itami-city Hyogo, Japan) | 3.50 | 17.00 |
| Isolated Soy Protein (Supro ® 661, Protein Technologies Intl., St. Louis, MO) | 6.00 | 3.50 |
| Sodium Bicarbonate (Church & Dwight Co., Princeton, NJ) | 0.95 | |
| Calcium Phosphate Monobasic (Regent 12XX, Rhodia, Cranbury, NJ) | 0.76 | |
| Sodium Aluminum Phosphate (Levair, Rhodia, Cranbury, NJ) | 0.76 | |
| Ammonium Bicarbonate (Church & Dwight Co., Princeton, NJ) | 2.40 | |
| Whey Protein Isolate (BiPRO, Davisco Food International, Inc., Le Sueur, MN) | | 11.00 |
| Water | 22.87 | |
| Corn Syrup Solids (M200, Grain Processing Corp., Muscatine, IA) | | 8.50 |
| Cheese Powder (#2100078346, Kraft Foods Ingredients, Memphis, TN) | | 23.93 |
| Cheese Flavor (#1030WYF, Edlong Corporation, Elk Grove Village, IL) | | 2.00 |
| Kaomel Flakes (Loders Croklaan, Channahon, IL) | | 3.00 |

A single reference serving (30 grams) of the resulting product is analyzed according to the protocols disclosed in the "Analytical Protocols" Section of this application and the test results indicate that the product's amino acid sources provide 24.2% of the product's total caloric content; that the product's fat sources provide 17.7% of the product's total caloric content; that the product's digestible saturated fat sources provide 9.3% of the product's total caloric content; and that the single reference serving contains 3.09 grams of dietary fiber.

EXAMPLE 3

Peanut butter filled crackers having a crumb to filling ratio by weight of 1.5:1

| Ingredient | Crumb Formula weight percent | Filling Formula weight percent |
|---|---|---|
| 62DE Corn Syrup (Quality Ingredients Corp., Chester, NJ) | 0.62 | |
| Olean ® (Procter & Gamble Co., Cincinnati, OH) | 9.13 | 15.30 |
| Malt Syrup (Hawkeye 5900, Quality Ingredients Corp., Chester, NJ) | 1.24 | |
| Peanut Oil (#022000, Ventura Foods, Opelousas, LA.) | | 1.80 |
| Sugar 12X (Amalgamated Sugar Co., Ogden, UT) | | 15.80 |
| Granulated Sugar (Holly Sugar Co., Worland, WY) | 5.00 | |
| Salt - TFC Purex (Morton International, Inc., Philadelphia, PA) | 0.30 | |
| Iodized Salt (Morton International, Inc., Chicago, IL) | | 1.10 |
| L-Cysteine HCl Monohydrate (Quality Ingredients Corp., Chester NJ) | 0.04 | |
| Vitamin A, $D_3$, $K_1$ blend (Watson Foods Co., West Haven, CT) | 0.06 | 0.03 |

-continued

Peanut butter filled crackers having a crumb to filling ratio by weight of 1.5:1

| Ingredient | Crumb Formula weight percent | Filling Formula weight percent |
|---|---|---|
| Flour - soft wheat (Siemer Milling Co., Teutopolis, IL) | 37.88 | |
| Fiber - insoluble wheat (Vitacel ® WF-600/30, J. Rettenmaier, Ellwangen/J, Germany) | 2.75 | |
| Fiber - soluble (Fibersol-2, Matsutani Chem. Ind., Itami-city Hyogo, Japan) | 3.20 | 12.00 |
| Isolated Soy Protein (Supro ® 661, Protein Technologies Intl., St. Louis, MO) | 10.00 | |
| Sodium Bicarbonate (Church & Dwight Co., Princeton, NJ.) | 0.95 | |
| Calcium Phosphate Monobasic (Regent 12XX, Rhodia, Cranbury, NJ) | 0.76 | |
| Sodium Aluminum Phosphate (Levair, Rhodia, Cranbury, NJ) | 0.76 | |
| Ammonium Bicarbonate (Church & Dwight Co., Princeton, NJ.) | 2.40 | |
| Wheat Gluten (Gluvital 21000, Cerestar, Hammond, IN) | 2.00 | |
| Processed De-fatted (20%) Peanut Flour from US#1 Medium Runner Peanuts (Cargill Peanut, Dawson GA) | | 53.97 |
| Water | 22.91 | |

A single reference serving (30 grams) of the resulting product is analyzed according to the protocols disclosed in the "Analytical Protocols" Section of this application and the test results indicate that the product's amino acid sources provide 30.7% of the product's total caloric content; that the product's fat sources provide 14.9% of the product's total caloric content; that the product's digestible saturated fat sources provide 2.9% of the product's total caloric content; and that the single reference serving contains 3.43 grams of dietary fiber.

EXAMPLE 4

Peanut butter filled crackers comprising rennet casein and having a crumb to filling ratio by weight of 1.5:1 and, on a 40-gram basis, containing at least 5 grams of protein having a quality of 1.0

| Ingredient | Crumb Formula weight percent | Filling Formula weight percent |
|---|---|---|
| 62DE Corn Syrup (Quality Ingredients Corp., Chester, NJ) | 0.60 | |
| Olean ® (Procter & Gamble Co., Cincinnati, OH) | 8.81 | 20.00 |
| Malt Syrup- (Hawkeye 5900 Quality Ingredients Corp., Chester NJ) | 1.20 | |
| Peanut Oil (#022000, Ventura Foods, Opelousas, LA.) | | 0.80 |
| Granulated Sugar (Holly Sugar Co., Worland, WY) | 5.40 | |
| Sugar 12X (Amalgamated Sugar Co., Ogden, UT) | | 13.80 |
| Salt - TFC Purex (Morton International, Inc., Philadelphia, PA) | 0.29 | |
| Iodized Salt (Morton International, Inc., Chicago, IL) | | 1.10 |
| L-Cysteine HCl Monohydrate (Quality Ingredients Corp., Chester NJ) | 0.04 | |
| Vitamin A, D$_3$, K$_1$ blend (Watson Foods Co., West Haven, CT) | 0.06 | 0.05 |
| Whole Grain Flavor (Mane, Cincinnati, OH) | 0.10 | |
| Flour - soft wheat (Siemer Milling Co., Teutopolis, IL) | 41.00 | |
| Fiber - insoluble wheat (Vitacel ® WF-600/30, J. Rettenmaier, Ellwangen/J, Germany) | 2.89 | |

-continued

Peanut butter filled crackers comprising rennet casein and having a crumb to filling ratio by weight of 1.5:1 and, on a 40-gram basis, containing at least 5 grams of protein having a quality of 1.0

| Ingredient | Crumb Formula weight percent | Filling Formula weight percent |
|---|---|---|
| Fiber - soluble (Fibersol-2, Matsutani Chem. Ind., Itami-city Hyogo, Japan) | 1.25 | 9.00 |
| Isolated Soy Protein (Supro ® 661, Protein Technologies Intl., St. Louis, MO) | | 3.80 |
| Sodium Bicarbonate (Church & Dwight Co., Princeton, NJ.) | 0.92 | |
| Calcium Phosphate Monobasic (Regent 12XX, Rhodia, Cranbury, NJ) | 0.73 | |
| Sodium Aluminum Phosphate (Levair, Rhodia, Cranbury, NJ) | 0.73 | |
| Ammonium Bicarbonate (Church & Dwight Co., Princeton, NJ.) | 2.32 | |
| Wheat Gluten (Gluvital 21000, Cerestar, Hammond, IN) | 1.93 | |
| Rennet Casein (Main Street Ingredients, LaCrosse, WI) | 9.65 | |
| Processed De-fatted (20%) Peanut Flour from US#1 Medium Runner Peanuts (Cargill Peanut, Dawson GA) | | 51.45 |
| Water | 22.08 | |

A single reference serving (30 grams) of the resulting product is analyzed according to the protocols disclosed in the "Analytical Protocols" Section of this application and the test results indicate that the product's amino acid sources provide 30.9% of the product's total caloric content; that the product's fat sources provide 16.3% of the product's total caloric content; that the product's digestible saturated fat sources provide 2.8% of the product's total caloric content; and that the single reference serving contains 2.78 grams of dietary fiber.

EXAMPLE 5

Cheddar cheese filled crackers having a crumb to filling ratio by weight of 1.5:1

| Ingredient | Crumb Formula weight percent | Filling Formula weight percent |
|---|---|---|
| 62DE Corn Syrup (Quality Ingredients Corp., Chester, NJ) | 0.62 | |
| Corn Syrup Solids (M200, Grain Processing Corp., Muscatine, IA) | | 8.50 |
| Olean ® (Procter & Gamble Co., Cincinnati, OH) | 9.13 | 31.00 |
| Malt Syrup (Hawkeye 5900, Quality Ingredients Corp., Chester NJ) | 1.24 | |
| Kaomel Flakes (Loders Croklaan, Channahon, IL) | | 3.00 |
| Granulated Sugar (Holly Sugar Co., Worland, WY) | 5.00 | |
| Salt - TFC Purex (Morton International, Inc., Philadelphia, PA) | 0.30 | |
| L-Cysteine HCl Monohydrate (Quality Ingredients Corp., Chester NJ) | 0.04 | |
| Vitamin A, D$_3$, K$_1$ blend (Watson Foods Co., West Haven, CT) | 0.06 | 0.07 |
| Flour - soft wheat (Siemer Milling Co., Teutopolis, IL) | 37.88 | |
| Fiber - insoluble wheat (Vitacel ® WF-600/30, J. Rettenmaier, Ellwangen/J, Germany) | 2.75 | |
| Fiber - soluble (Fibersol-2, Matsutani Chem. Ind., Itami-city Hyogo, Japan) | 3.20 | 17.00 |
| Isolated Soy Protein (Supro ® 661, Protein Technologies Intl., St. Louis, MO) | 10.00 | 3.50 |

-continued

Cheddar cheese filled crackers having a crumb to filling ratio by weight of 1.5:1

| Ingredient | Crumb Formula weight percent | Filling Formula weight percent |
|---|---|---|
| Sodium Bicarbonate (Church & Dwight Co., Princeton, NJ.) | 0.95 | |
| Calcium Phosphate Monobasic (Regent 12XX, Rhodia, Cranbury, NJ) | 0.76 | |
| Sodium Aluminum Phosphate (Levair, Rhodia, Cranbury, NJ) | 0.76 | |
| Ammonium Bicarbonate (Church & Dwight Co., Princeton, NJ.) | 2.40 | |
| Wheat Gluten (Gluvital 21000, Cerestar, Hammond, IN) | 2.00 | |
| Whey Protein Isolate (BiPRO, Davisco Food International, Inc., Le Sueur, MN) | | 11.00 |
| Water | 22.91 | |
| Cheese Powder (#2100078346, Kraft Foods Ingredients, Memphis, TN) | | 23.93 |
| Cheese Flavor (#1030WYF, Edlong Corporation, Elk Grove Village, IL) | | 2.00 |

A single reference serving (30 grams) of the resulting product is analyzed according to the protocols disclosed in the "Analytical Protocols" Section of this application and the test results indicate that the product's amino acid sources provide 30.5% of the product's total caloric content; that the product's fat sources provide 14.9% of the product's total caloric content; that the product's digestible saturated fat sources provide 7.8% of the product's total caloric content; and that the single reference serving contains 3.21 grams of dietary fiber.

EXAMPLE 6

Cheddar cheese filled crackers containing rennet casein and having a crumb to filling ratio by weight of 1.5:1 and, on a 30-gram basis, having at least 5 grams of protein having a quality of 1.0

| Ingredient | Crumb Formula weight percent | Filling Formula weight percent |
|---|---|---|
| 62DE Corn Syrup (Quality Ingredients Corp., Chester, NJ) | 0.60 | |
| Olean ® (Procter & Gamble Co., Cincinnati, OH) | 8.81 | 30.00 |
| Malt Syrup (Hawkeye 5900, Quality Ingredients Corp., Chester NJ) | 1.20 | |
| Kaomel Flakes (Loders Croklaan, Channahon, IL) | | 2.20 |
| Granulated Sugar (Holly Sugar Co., Worland, WY) | 5.40 | |
| Salt - TFC Purex (Morton International, Inc., Philadelphia, PA) | 0.29 | |
| L-Cysteine HCl Monohydrate (Quality Ingredients Corp., Chester NJ) | 0.04 | |
| Vitamin A, $D_3$, $K_1$ blend (Watson Foods Co., West Haven, CT) | 0.06 | 0.07 |
| Whole Grain Flavor (Mane, Cincinnati, OH) | 0.01 | |
| Flour - soft wheat (Siemer Milling Co., Teutopolis, IL) | 41.00 | |
| Fiber - insoluble wheat (Vitacel ® WF-600/30, J. Rettenmaier, Ellwangen/J, Germany) | 2.89 | |
| Fiber - soluble (Fibersol-2, Matsutani Chem. Ind., Itami-city Hyogo, Japan) | 1.25 | 16.00 |
| Sodium Bicarbonate (Church & Dwight Co., Princeton, NJ.) | 0.92 | |
| Calcium Phosphate Monobasic (Regent 12XX, Rhodia, Cranbury, NJ) | 0.73 | |
| Sodium Aluminum Phosphate (Levair, Rhodia, Cranbury, NJ) | 0.73 | |

-continued

Cheddar cheese filled crackers containing rennet casein and having a crumb to filling ratio by weight of 1.5:1 and, on a 30-gram basis, having at least 5 grams of protein having a quality of 1.0

| Ingredient | Crumb Formula weight percent | Filling Formula weight percent |
|---|---|---|
| Ammonium Bicarbonate (Church & Dwight Co., Princeton, NJ.) | 2.32 | |
| Wheat Gluten (Gluvital 21000, Cerestar, Hammond, IN) | 1.93 | |
| Whey Protein Isolate (BiPRO, Davisco Food International, Inc., Le Sueur, MN) | | 17.30 |
| Rennet Casein (Main Street Ingredients, LaCrosse, WI) | 9.65 | |
| Water | 22.17 | |
| Corn Syrup Solids (M200, Grain Processing Corp., Muscatine, IA) | | 8.50 |
| Cheese Powder (#2100078346, Kraft Foods Ingredients, Memphis, TN) | | 23.93 |
| Cheese Flavor (#1030WYF, Edlong Corporation, Elk Grove Village, IL) | | 2.00 |

A single reference serving (30 grams) of the resulting product is analyzed according to the protocols disclosed in the "Analytical Protocols" Section of this application and the test results indicate that the product's amino acid sources provide 31.1% of the product's total caloric content; that the product's fat sources provide 17.4% of the product's total caloric content; that the product's digestible saturated fat sources provide 7.7% of the product's total caloric content; and that the single reference serving contains 2.86 grams of dietary fiber.

EXAMPLE 7

Cheddar cheese filled crackers containing Fiberaid ® and having a crumb to filling ratio by weight of 1.5:1

| Ingredient | Crumb Formula weight percent | Filling Formula weight percent |
|---|---|---|
| 62DE Corn Syrup (Quality Ingredients Corp., Chester, NJ) | 0.62 | |
| Olean ® (Procter & Gamble Co., Cincinnati, OH) | 9.13 | 31.00 |
| Malt Syrup (Hawkeye 5900, Quality Ingredients Corp., Chester, NJ | 1.24 | |
| Kaomel Flakes (Loders Croklaan, Channahon, IL) | | 3.00 |
| Granulated Sugar (Holly Sugar Co., Worland, WY) | 5.60 | |
| Salt - TFC Purex (Morton International, Inc., Philadelphia, PA) | 0.30 | |
| L-Cysteine HCl Monohydrate (Quality Ingredients Corp., Chester NJ) | 0.04 | |
| Vitamin A, $D_3$, $K_1$ blend (Watson Foods Co., West Haven, CT) | 0.06 | 0.07 |
| Flour - soft wheat (Siemer Milling Co., Teutopolis, IL) | 42.73 | |
| Fiber - insoluble wheat (Vitacel ® WF-600/30, J. Rettenmaier, Ellwangen/J, Germany) | 3.00 | |
| Isolated Soy Protein (Supro ® 661, Protein Technologies Intl., St. Louis, MO) | 6.00 | 3.50 |
| Sodium Bicarbonate (Church & Dwight Co., Princeton, NJ.) | 0.95 | |
| Calcium Phosphate Monobasic (Regent 12XX, Rhodia, Cranbury, NJ) | 0.76 | |
| Sodium Aluminum Phosphate (Levair, Rhodia, Cranbury, NJ) | 0.76 | |
| Ammonium Bicarbonate (Church & Dwight Co., Princeton, NJ.) | 2.40 | |
| Whey Protein Isolate (BiPRO, Davisco Food International, Inc., Le Sueur, MN) | | 11.00 |
| Fiberaid ® (Larex Corp., White Bear Lake, MN) | 3.50 | 17.00 |
| Water | 22.91 | |

-continued

Cheddar cheese filled crackers containing Fiberaid ® and having a crumb to filling ratio by weight of 1.5:1

| Ingredient | Crumb Formula weight percent | Filling Formula weight percent |
|---|---|---|
| Corn Syrup Solids (M200, Grain Processing Corp., Muscatine, IA) | | 8.50 |
| Cheese Powder (#2100078346, Kraft Foods Ingredients, Memphis, TN) | | 23.93 |
| Cheese Flavor (#1030WYF, Edlong Corporation, Elk Grove Village, IL) | | 2.00 |

A single reference serving (30 grams) of the resulting product is analyzed according to the protocols disclosed in the "Analytical Protocols" Section of this application and the test results indicate that the product's amino acid sources provide 25.7% of the product's total caloric content; that the product's fat sources provide 14.3% of the product's total caloric content; that the product's digestible saturated fat sources provide 7.1% of the product's total caloric content; and that the single reference serving contains 3.51 grams of dietary fiber.

EXAMPLE 8

Cheddar cheese filled crackers containing pea fiber and having a crumb to filling ratio by weight of 1.5:1

| Ingredient | Crumb Formula weight percent | Filling Formula weight percent |
|---|---|---|
| 62DE Corn Syrup (Quality Ingredients Corp., Chester, NJ) | 0.64 | |
| Olean ® (Procter & Gamble Co., Cincinnati, OH) | 9.37 | 31.00 |
| Malt Syrup (Hawkeye 5900, Quality Ingredients Corp., Chester NJ) | 1.27 | |
| Kaomel Flakes (Loders Croklaan, Channahon, IL) | | 3.00 |
| Granulated Sugar (Holly Sugar Co., Worland, WY) | 5.75 | |
| Salt - TFC Purex (Morton International, Inc., Philadelphia, PA) | 0.31 | |
| L-Cysteine HCl Monohydrate (Quality Ingredients Corp., Chester NJ) | 0.04 | |
| Vitamin A, D₃, K₁ blend (Watson Foods Co., West Haven, CT) | 0.07 | 0.07 |
| Flour - soft wheat (Siemer Milling Co., Teutopolis, IL) | 43.80 | |
| Isolated Soy Protein (Supro ® 661, Protein Technologies Intl., St. Louis, MO) | 6.16 | 3.50 |
| Sodium Bicarbonate (Church & Dwight Co., Princeton, NJ.) | 0.97 | |
| Calcium Phosphate Monobasic (Regent 12XX, Rhodia, Cranbury, NJ) | 0.78 | |
| Sodium Aluminum Phosphate (Levair, Rhodia, Cranbury, NJ) | 0.78 | |
| Ammonium Bicarbonate (Church & Dwight Co., Princeton, NJ.) | 2.46 | |
| Wheat Gluten (Gluvital 21000, Cerestar, Hammond, IN) | 2.05 | |
| Whey Protein Isolate (BiPRO, Davisco Food International, Inc., Le Sueur, MN) | | 11.00 |
| Pea Fiber (Centara III, Parrheim Foods, Portage La Prairie, Manitoba, Canada) | 4.10 | 17.00 |
| Water | 21.45 | |
| Corn Syrup Solids (M200, Grain Processing Corp., Muscatine, IA) | | 8.50 |
| Cheese Powder (#2100078346, Kraft Foods Ingredients, Memphis, TN) | | 23.93 |

-continued

Cheddar cheese filled crackers containing pea fiber and having a crumb to filling ratio by weight of 1.5:1

| Ingredient | Crumb Formula weight percent | Filling Formula weight percent |
|---|---|---|
| Cheese Flavor (#1030WYF, Edlong Corporation, Elk Grove Village, IL) | | 2.00 |

A single reference serving (30 grams) of the resulting product is analyzed according to the protocols disclosed in the "Analytical Protocols" Section of this application and the test results indicate that the product's amino acid sources provide 25.5% of the product's total caloric content; that the product's fat sources provide 13.5% of the product's total caloric content; that the product's digestible saturated fat sources provide 6.9% of the product's total caloric content; and that the single reference serving contains 3.30 grams of dietary fiber.

EXAMPLE 9

Cheddar cheese filled crackers containing at least 6.25 grams of soy protein per 40 gram serving and having a crumb to filling ratio by weight of 1.5:1

| Ingredient | Crumb Formula weight percent | Filling Formula weight percent |
|---|---|---|
| 62DE Corn Syrup (Quality Ingredients Corp., Chester, NJ) | 0.58 | |
| Olean ® (Procter & Gamble Co., Cincinnati, OH) | 8.47 | 30.00 |
| Malt Syrup (Hawkeye 5900, Quality Ingredients Corp., Chester, NJ) | 1.15 | |
| Kaomel Flakes (Loders Croklaan, Channahon, IL) | | 2.50 |
| Granulated Sugar (Holly Sugar Co., Worland, WY) | 4.33 | |
| Salt - TFC Purex (Morton International, Inc., Philadelphia, PA) | 0.28 | |
| L-Cysteine HCl Monohydrate (Quality Ingredients Corp., Chester NJ) | 0.04 | |
| Vitamin A, D₃, K₁ blend (Watson Foods Co., West Haven, CT) | 0.08 | 0.07 |
| Flour - soft wheat (Siemer Milling Co., Teutopolis, IL) | 31.65 | |
| Fiber - soluble (Fibersol-2, Matsutani Chem. Ind., Itami-city Hyogo, Japan) | 5.75 | 12.00 |
| Isolated Soy Protein (Supro ® 661, Protein Technologies Intl., St. Louis, MO) | 14.83 | 18.00 |
| Sodium Bicarbonate (Church & Dwight Co., Princeton, NJ.) | 0.88 | |
| Calcium Phosphate Monobasic (Regent 12XX, Rhodia, Cranbury, NJ) | 0.70 | |
| Sodium Aluminum Phosphate (Levair, Rhodia, Cranbury, NJ) | 0.70 | |
| Ammonium Bicarbonate (Church & Dwight Co., Princeton, NJ.) | 2.22 | |
| Wheat Gluten (Gluvital 21000, Cerestar, Hammond, IN) | 1.55 | |
| Water | 26.79 | |
| Corn Syrup Solids (M200, Grain Processing Corp., Muscatine, IA) | | 11.50 |
| Cheese Powder (#2100078346, Kraft Foods Ingredients, Memphis, TN) | | 23.93 |
| Cheese Flavor (#1030WYF, Edlong Corporation, Elk Grove Village, IL) | | 2.00 |

A single reference serving (30 grams) of the resulting product is analyzed according to the protocols disclosed in the "Analytical Protocols" Section of this application and the test results indicate that the product's amino acid sources provide 35.1% of the product's total caloric content; that the product's fat sources provide 13.9% of the product's total caloric content; that the product's digestible saturated fat sources provide 7.3% of the product's total caloric content; and that the single reference serving contains 2.52 grams of dietary fiber.

EXAMPLE 10

Peanut butter filled crackers comprising rennet casein and having a crumb to filling ratio by weight of 1.5:1 and, on a 30-gram basis, containing at least 5 grams of protein having a quality of 1.0

| Ingredient | Crumb Formula weight percent | Filling Formula weight percent |
|---|---|---|
| 62DE Corn Syrup (Quality Ingredients Corp., Chester, NJ) | 0.60 | |
| Olean ® (Procter & Gamble Co., Cincinnati, OH) | 8.82 | 19.84 |
| Malt Syrup (Hawkeye 5900, Quality Ingredients Corp., Chester, NJ) | 1.20 | |
| Peanut Oil (#022000, Ventura Foods, Opelousas, LA.) | | 0.58 |
| Constant Behenic Stabilizer (ADM, Macon, GA) | | 0.40 |
| Sugar 12X (Amalgamated Sugar Co., Ogden, UT) | | 13.80 |
| Granulated Sugar (Holly Sugar Co., Worland, WY) | 5.41 | |
| Salt - TFC Purex (Morton International, Inc., Philadelphia, PA) | 0.29 | |
| Iodized Salt (Morton International, Inc., Chicago, IL) | | 1.10 |
| L-Cysteine HCl Monohydrate (Quality Ingredients Corp., Chester NJ) | 0.04 | |
| Vitamin A, $D_3$, $K_1$ blend (Watson Foods Co., West Haven, CT) | 0.06 | 0.05 |
| Flour - soft wheat (Siemer Milling Co., Teutopolis, IL) | 41.04 | |
| Fiber - insoluble wheat (Vitacel ® WF-600/30, J. Rettenmaier, Ellwangen/J, Germany) | 2.90 | |
| Fiber - soluble (Fibersol-2, Matsutani Chem. Ind., Itami-city Hyogo, Japan) | 1.26 | 8.93 |
| Sodium Bicarbonate (Church & Dwight Co., Princeton, NJ.) | 0.92 | |
| Calcium Phosphate Monobasic (Regent 12XX, Rhodia, Cranbury, NJ) | 0.73 | |
| Sodium Aluminum Phosphate (Levair, Rhodia, Cranbury, NJ) | 0.73 | |
| Ammonium Bicarbonate (Church & Dwight Co., Princeton, NJ.) | 2.32 | |
| Wheat Gluten (Gluvital 21000, Cerestar, Hammond, IN) | 1.93 | |
| Rennet Casein (Main Street Ingredients, LaCrosse, WI) | 9.66 | 3.80 |
| Water | 22.09 | |
| Processed De-fatted (20%) Peanut Flour from US#1 Medium Runner Peanuts (Cargill Peanut, Dawson GA) | | 51.50 |

A single reference serving (30 grams) of the resulting product is analyzed according to the protocols disclosed in the "Analytical Protocols" Section of this application and the test results indicate that the product's amino acid sources provide 30.3% of the product's total caloric content; that the product's fat sources provide 18.0% of the product's total caloric content; that the product's digestible saturated fat sources provide 3.2% of the product's total caloric content; and that the single reference serving contains 3.17 grams of dietary fiber.

EXAMPLE 11

Peanut butter filled crackers having a crumb to filling ratio by weight of 1.9:1

| Ingredient | Crumb Formula weight percent | Filling Formula weight percent |
|---|---|---|
| 62DE Corn Syrup (Quality Ingredients Corp., Chester, NJ) | 0.62 | |
| Olean ® (Procter & Gamble Co., Cincinnati, OH) | 9.12 | 15.30 |
| Malt Syrup (Hawkeye 5900 Quality Ingredients Corp, Chester, NJ) | 1.24 | |
| Peanut Oil (#022000, Ventura Foods, Opelousas, LA.) | | 1.80 |
| Granulated Sugar (Holly Sugar Co., Worland, WY) | 5.60 | |
| Sugar 12X (Amalgamated Sugar Co., Ogden, UT) | | 15.80 |
| Iodized Salt (Morton International, Inc., Chicago, IL) | | 1.10 |
| Salt - TFC Purex (Morton International, Inc., Philadelphia, PA) | 0.30 | |
| L-Cysteine HCl Monohydrate (Quality Ingredients Corp., Chester NJ) | 0.04 | |
| Vitamin A, $D_3$, $K_1$ blend (Watson Foods Co., West Haven, CT) | 0.06 | 0.03 |
| Flour - soft wheat (Siemer Milling Co., Teutopolis, IL) | 42.77 | |
| Fiber - insoluble wheat (Vitacel ® WF-600/30, J. Rettenmaier, Ellwangen/J, Germany) | 3.00 | |
| Fiber - soluble (Fibersol-2, Matsutani Chem. Ind., Itami-city Hyogo, Japan) | 3.50 | 12.00 |
| Isolated Soy Protein (Supro ® 661, Protein Technologies Intl., St. Louis, MO) | 6.00 | |
| Sodium Bicarbonate (Church & Dwight Co., Princeton, NJ.) | 0.95 | |
| Calcium Phosphate Monobasic (Regent 12XX, Rhodia, Cranbury, NJ) | 0.76 | |
| Sodium Aluminum Phosphate (Levair, Rhodia, Cranbury, NJ) | 0.76 | |
| Ammonium Bicarbonate (Church & Dwight Co., Princeton, NJ.) | 2.40 | |
| Water | 22.88 | |
| Processed De-fatted (20%) Peanut Flour from US#1 Medium Runner Peanuts (Cargill Peanut, Dawson GA) | | 53.97 |

A single reference serving (30 grams) of the resulting product is analyzed according to the protocols disclosed in the "Analytical Protocols" Section of this application and the test results indicate that the product's amino acid sources provide 20.0% of the product's total caloric content; that the product's fat sources provide 18.2% of the product's total caloric content; that the product's digestible saturated fat sources provide 0.29% of the product's total caloric content; and that the single reference serving contains 3.20 grams of dietary fiber.

EXAMPLE 12

Peanut butter filled bars having a crumb to filling ratio by weight of 1.5:1

| Ingredient | Crumb Formula weight percent | Filling Formula weight percent |
|---|---|---|
| 62DE Corn Syrup (Good Food Inc., Honey Brook, PA) | 0.62 | |
| Olean ® (Procter & Gamble Co., Cincinnati, OH) | 8.10 | 30.00 |
| Malt Syrup (Hawkeye 5900 Quality Ingredients Corp., Chester NJ) | 1.24 | |
| Peanut Oil (#022000, Ventura Foods, Opelousas, LA.) | | 1.35 |
| Sugar - White Satin (Amalgamated Sugar Co., Ogden, UT) | 6.98 | |
| Salt - Shur-Flo Fine Flake (Cargil Inc., St. Clair, MI) | 0.30 | 0.82 |
| L-Cysteine GLC (Cain Foods Inc., Dallas, TX) | 0.04 | |
| Vitamin A, $D_3$, $K_1$ blend (Watson Foods Co., West Haven, CT) | 0.06 | 0.07 |

-continued

Peanut butter filled bars having a crumb to filling ratio by weight of 1.5:1

| Ingredient | Crumb Formula weight percent | Filling Formula weight percent |
|---|---|---|
| Whole Grain Flavor (#F94270, Mane, Wayne, NJ) | 0.10 | |
| Flour - soft wheat (Siemer Milling Co., Teutopolis, IL) | 47.74 | |
| Fiber - insoluble wheat (Vitacel ® WF-600/30, J. Rettenmaier, Ellwangen/J, Germany) | 2.50 | |
| Fiber - soluble (Fibersol-2, Matsutani Chem. Ind., Itami-city Hyogo, Japan) | 2.50 | 11.83 |
| Isolated Soy Protein (Supro ® 661, Protein Technologies Intl., St. Louis, MO) | 6.00 | |
| Sodium Bicarbonate (Church & Dwight Co., Princeton, NJ) | 0.48 | |
| Calcium Phosphate Monobasic (Regent 12XX, Rhodia, Cranbury, NJ) | 0.38 | |
| Sodium Aluminum Phosphate (Levair, Rhodia, Cranbury, NJ) | 0.38 | |
| Ammonium Bicarbonate (Church & Dwight Co., Princeton, NJ) | 1.20 | |
| Whey Protein Isolate (BiPRO, Davisco Food International, Inc., Le Sueur, MN) | | 6.00 |
| Water | 21.38 | |
| Processed De-fatted (20%) Peanut Flour from US#1 Medium Runner Peanuts (Cargill Peanut, Dawson GA) | | 49.93 |

A single reference serving (40 grams) of the resulting product is analyzed according to the protocols disclosed in the "Analytical Protocols" Section of this application and the test results indicate that the product's amino acid sources provide 27.2% of the product's total caloric content; that the product's fat sources provide 18.2% of the product's total caloric content; that the product's digestible saturated fat sources provide 4.1% of the product's total caloric content; and that the single reference serving contains 3.93 grams of dietary fiber.

EXAMPLE 13

50/50 fruit/peanut butter filled bars having a crumb to filling ratio by weight of 1.5:1

| Ingredient | Crumb Formula weight percent | Filling Formula weight percent |
|---|---|---|
| 62DE Corn Syrup (Quality Ingredients Corp., Chester, NJ) | 0.61 | |
| Olean ® (Procter & Gamble Co., Cincinnati, OH) | 8.03 | 15.00 |
| Malt Syrup (Hawkeye 5900 Quality Ingredients Corp., Chester NJ) | 1.22 | |
| Peanut Oil (#022000, Ventura Foods, Opelousas, LA) | | 0.68 |
| Sugar - White Satin (Amalgamated Sugar Co., Ogden, UT) | 6.91 | |
| Salt - Shur-Flo Fine Flake (Cargil Inc., St. Clair, MI) | 0.30 | 0.41 |
| L-Cysteine HCl Monohydrate (Quality Ingredients Corp., Chester NJ) | 0.04 | |
| Vitamin A, D₃, K₁ blend (Watson Foods Co., West Haven, CT) | 0.06 | 0.03 |
| Whole Grain Flavor (#F94270, Mane, Wayne, NJ) | 0.10 | |
| Flour - soft wheat (Siemer Milling Co., Teutopolis, IL) | 48.20 | |
| Fiber - insoluble wheat (Vitacel ® WF-600/30, J. Rettenmaier, Ellwangen/J, Germany) | 2.48 | |
| Fiber-soluble (Fibersol-2, Matsutani Chem. Ind., Itami-city Hyogo, Japan) | 2.48 | 7.10 |
| Isolated Soy Protein (Supro ® 661, Protein Technologies Intl., St. Louis, MO) | 5.95 | |

-continued

50/50 fruit/peanut butter filled bars having a crumb to filling ratio by weight of 1.5:1

| Ingredient | Crumb Formula weight percent | Filling Formula weight percent |
|---|---|---|
| Sodium Bicarbonate (Church & Dwight Co., Princeton, NJ) | 0.47 | |
| Calcium Phosphate Monobasic (Regent 12XX, Rhodia, Cranbury, NJ) | 0.38 | |
| Sodium Aluminum Phosphate (Levair, Rhodia, Cranbury, NJ) | 0.38 | |
| Ammonium Bicarbonate (Church & Dwight Co., Princeton, NJ) | 1.19 | |
| Whey Protein Isolate (BiPRO, Davisco Food International, Inc., Le Sueur, MN) | | 7.00 |
| Processed De-fatted (20%) Peanut Flour from US#1 Medium Runner Peanuts (Cargill Peanut, Dawson GA) | | 24.78 |
| Water | 21.20 | |
| Glycerine - Superol (Procter & Gamble, New Milford, CT) | | 5.00 |
| Fruit Puree (Low Aw, Fruit Fillings, Inc., Fresno, CA) | | 40.00 |

ADDITIONAL MAKING PROCEDURES

Fruit Filling Making

1. All of the soluble fiber (Fibersol-2), whey protein isolate (BiPRO), glycerin, and fruit puree are weighed and blended, using a Kitchen Aid (Model KSM90 Ultra Power) mixer set on speed setting #2, for 5 minutes.
2. The resulting fruit filling is stored until used.

A single reference serving (40 grams) of the resulting product is analyzed according to the protocols disclosed in the "Analytical Protocols" Section of this application and the test results indicate that the product's amino acid sources provide 20.5% of the product's total caloric content; that the product's fat sources provide 13.0% of the product's total caloric content; that the product's digestible saturated fat sources provide 2.2% of the product's total caloric content; and that the single reference serving contains 2.88 grams of dietary fiber.

EXAMPLE 14

Open filled peanut butter cracker bars containing 3 protein sources and having a crumb to filling ratio by weight of 1.5:1

| Ingredient | Crumb Formula weight percent | Filling Formula weight percent |
|---|---|---|
| 62DE Corn Syrup (Quality Ingredients Corp., Chester, NJ) | 0.61 | |
| Olean ® (Procter & Gamble Co., Cincinnati, OH) | 8.95 | 23.00 |
| Malt Syrup (Hawkeye 5900 Quality Ingredients Corp., Chester NJ) | 1.22 | |
| Natural Butter Flavor (Flavors of North America, Inc., Carol Stream, IL) | 1.47 | |
| Processed De-fatted (20%) Peanut Flour from US#1 Medium Runner Peanuts (Cargill Peanut, Dawson GA) | | 49.00 |
| Sugar 12X (Amalgamated Sugar Co., Ogden, UT) | | 13.80 |

-continued

Open filled peanut butter cracker bars containing 3 protein sources and having a crumb to filling ratio by weight of 1.5:1

| Ingredient | Crumb Formula weight percent | Filling Formula weight percent |
|---|---|---|
| Granulated Sugar (Holly Sugar Co., Worland, WY) | 5.49 | |
| Salt - TFC Purex (Morton International, Inc., Philadelphia, PA) | 0.29 | |
| Iodized Salt (Morton International, Inc., Chicago, IL) | | 1.10 |
| L-Cysteine HCl Monohydrate (Quality Ingredients Corp., Chester NJ) | 0.04 | |
| Lecithin - Centrophase HR (Central Soya Co., Inc., Fort Wayne, IN) | | 0.20 |
| Flour - soft wheat (Siemer Milling Co., Teutopolis, IL) | 40.48 | |
| Fiber - insoluble wheat (Vitacel ® WF-600/30, J. Rettenmaier, Ellwangen/J, Germany) | 2.94 | |
| Fiberaid ® (Larex Corp., White Bear Lake, MN) | 1.47 | 9.00 |
| Isolated Soy Protein (Supro ® 661, Protein Technologies Intl., St. Louis, MO) | 6.27 | 3.50 |
| Sodium Bicarbonate (Church & Dwight Co., Princeton, NJ) | 0.74 | |
| Calcium Phosphate Monobasic (Regent 12XX, Rhodia, Cranbury, NJ) | 0.59 | |
| Sodium Aluminum Phosphate (Levair, Rhodia, Cranbury, NJ) | 0.59 | |
| Ammonium Bicarbonate (Church & Dwight Co., Princeton, NJ) | 1.86 | |
| Whey Protein Isolate (BIPRO, Davisco Food International, Inc., Le Sueur, MN) | 2.69 | |
| Water | 19.40 | |
| Wheat Gluten (Gluvital 21000, Cerestar, Hammond, IN) | 1.96 | |
| Calcium Carbonate (USP AlbaGlos, Specialty Minerals, Inc., Bethlehem, PA) | 1.96 | |
| Egg White Solids (Henningsen Foods, Omaha, NE) | 0.98 | |
| Constant Behenic Stabilizer (ADM, Macon, GA) | | 0.40 |
| Vitamin mix added to 100 grams of filling: (Components & percentage of each component per 100 grams of vitamin mix listed below) | | 0.80 |

| Vitamin A, D$_3$, K$_1$ blend (Watson Foods Co., West Haven, CT) | 39.15 |
| Vit E alpha-tocopherol acetate 50% type CWS/F (Roche Vitamins, Parsippany, NJ) | 19.81 |
| (Vit B$_1$) Thiamine Hydrochloride (Roche Vitamins, Parsippany, NJ) | 0.75 |
| (Vit B$_2$) Riboflavin (Roche Vitamins, Parsippany, NJ) | 0.82 |
| (Vit B$_3$) Niacin USP FCC (Roche Vitamins, Parsippany, NJ) | 7.19 |
| (Vit B$_6$) Pyridoxine Hydrochloride (Roche Vitamins, Parsippany, NJ) | 0.96 |
| (Vit B$_{12}$) 1% Trituration of Vitamin B$_{12}$ (Roche Vitamins, Parsippany, NJ) | 0.25 |
| Vitamin C ultra fine powder (Roche Vitamins, Parsippany, NJ) | 21.55 |
| Zinc Citrate Trihydrate (Tate & Lyle, Decatur, IL) | 6.88 |
| Iron (reduced) (100%) (Roche Vitamins, Parsippany, NJ) | 2.64 |

A single reference serving (40 grams) of the resulting product is analyzed according to the protocols disclosed in the "Analytical Protocols" Section of this application and the test results indicate that the product's amino acid sources provide 26.20% of the product's total caloric content; that the product's fat sources provide 17.00% of the product's total caloric content; that the product's digestible saturated fat sources provide 0.20% of the product's total caloric content; and that the single reference serving contains 3.50 grams of dietary fiber.

EXAMPLE 15

Direct extruded cheese filled snack product having a crumb to filling ratio by weight of 1.5:1

| Ingredient | Crumb Formula weight percent | Filling Formula weight percent |
|---|---|---|
| Olean ® (Procter & Gamble Co., Cincinnati, OH) | | 31.60 |
| Kaomel Flakes, Loders Croklaan, Channahon, IL) | | 1.50 |
| Sugar 12X (Amalgamated Sugar Co., Ogden, UT) | 2.00 | |
| Salt - Flour Salt (Cargil Inc., St. Clair, MI) | 1.40 | |
| Instant Clearjel Starch (National Starch & Chemical, Bridgewater, NJ) | 18.09 | |
| Maltrin M100 (Grain Processing Corp., Muscatine, IA) | 4.05 | |
| Baka Plus (National Starch & Chemical, Bridgewater, NJ) | 4.86 | |
| Onion Powder (Basic Vegetable Products, Inc., Suisun, CA) | 0.74 | |
| Fiber - soluble (Fibersol-2, Matsutani Chem. Ind., Itami-city Hyogo, Japan) | | 23.15 |
| Isolated Soy Protein (Supro ® 661, Protein Technologies Intl., St. Louis, MO) | 15.00 | 3.50 |
| Sodium Bicarbonate (Church & Dwight Co., Princeton, NJ) | 0.55 | |
| Whey Protein Isolate (BiPRO, Davisco Food International, Inc., Le Sueur, MN) | | 14.25 |
| Yellow Masa (Lauhoff Grain Co., Danville, IL) | 53.31 | |
| Vitamin A, D$_3$, K$_1$ blend (Watson Foods Co., West Haven, CT) | | 0.03 |
| Cheese Powder (#2100078346, Kraft Foods Ingredients, Memphis, TN) | | 22.97 |
| Cheese Flavor (#1030WYF, Edlong Corporation, Elk Grove Village, IL) | | 3.00 |

MAKING PROCEDURES

Dough Making
1. Each ingredient is weighed and them combined in a 150 lb (68.2 kg) horizontal ribbon blender.
2. Next, the mixture of ingredients is blended for 15 minutes to form a dry dough mix and then transferred into a food grade container for temporary storage.

Extrusion Process
1. The dry dough mix is added to the feeder bin (hopper) of a K-Tron loss in weight feeder, which is calibrated to 378 g/min (±5 g). The feeder transfers the dry mix to the pre-mixer of a Pavan single screw extruder (Model F70 Extruder Former).
2. In the pre-mixer, water is added at a rate of 0.37 lbs/min. (0.17 kg/min.) while at ambient temperature.
3. The emulsifier, Panodan SD K (Danisco, Copenhagen, Denmark), is then added to the pre-mixer at a rate and temperature of 5 g/min. and 150° F. (65.6° C.).
4. The dough is then mechanically fed by the pre-mixer into the main mixer where it is further mixed, cooled and moved toward the extrusion screw.
5. At this point the single screw extruder pulls the dough into the screw chamber where the dough is forced though a die housing to give it shape. The dough is then cut via rotating blades to produce individually sized pieces.

Frying
1. The extruded product (extrudate) of Step #5 above is placed in a frying basket that is then placed into a 50 lb (22.7 kg) fryer containing 100% Olean® at 350° F. (176.7° C.). The extrudate is free fried for 30 seconds and then submersed and fried for an additional 60 seconds.

2. The extrudate is then transferred from the fryer to a paper towel where it is allowed to cool. The extruded product has approximately a 20.3% Olean® content after frying.

Filling the Snack

1. After frying, random snack pieces are weighed to obtain an average weight, which is about 1.1 g per snack piece.
2. A snack to filling ratio of about 1.5:1 is required to obtain the desired nutritional profile, which requires about 0.73 g filling per snack piece.
3. The filling is added to the snack pieces using a spatula to force the filling into the void spaces in the snack.
4. The filled snack pieces are seasoned with Nacho Seas seasoning (Kerry Ingredients, Beloit, Wis.) by placing about 100 g of snack pieces in a plastic bag containing excess seasoning, and shaking until the snack pieces are fully covered.

A single reference serving (30 grams) of the resulting product is analyzed according to the protocols disclosed in the "Analytical Protocols" Section of this application and the test results indicate that the product's amino acid sources provide 26.30% of the product's total caloric content; that the product's fat sources provide 20.30% of the product's total caloric content; that the product's digestible saturated fat sources provide 0.95% of the product's total caloric content, and that the single reference serving contains 2.80 grams of dietary fiber.

EXAMPLE 16

Potato crisps

| Ingredient | Crumb Formula weight percent |
|---|---|
| *Emulsifier Blend | 0.60 |
| Wheat Starch Atex (ADM Co., Olathe, KS) | 6.30 |
| Fiber - soluble (Fibersol-2, Matsutani Chem. Ind., Itami-city Hyogo, Japan) | 6.30 |
| Isolated Soy Protein (Supro ® 661, Protein Technologies Intl., St. Louis, MO) | 17.90 |
| Potato Flour - (Basic American Foods, Blackfood, ID) | 33.70 |
| Corn Flour - (Lauhoff Grain Co., Danville, IL) | 6.30 |
| Water | 28.90 |

*Emulsifier is a blend of 85% olestra (Olean brand, The Procter & Gamble Co., Cincinnati, OH), 12.75% Dimodan O distilled monoglyceride (Danisco Ingredients, Inc., New Century, KS), and 2.25% DHBM polyglycerol ester (Lonza, Williamsport, PA).

MAKING PROCEDURES

Dough Making

1. The potato flakes, soy protein, Fibersol, wheat starch and corn flour are weighed, combined and put into a food processor (Waring Commercial) and mixed for 1 minute.
2. Water is heated to approximately 180° F. (82.2° C.) and combined with emulsifier, using a high shear mixer for 15 seconds. During this mixing process the temperature of the blend is dropped therefore, the temperature is adjusted to 160° F.±5° F. (71.1° C.±2.9° C.) by heating using a microwave oven.
3. While the food processor is on, the liquid mixture of Step #2 above is combined with the dry ingredients of Step #1 above and the resulting mixture is mixed for 30 seconds.
4. Next the processor is stopped and its sides are scraped with a spatula to loosen any adhered material. The processor is then restarted and the mixture is mixed for another 30 seconds to form a dough.
5. The dough of Step #4 above is then transferred into a sealable plastic bag to minimize moisture loss.
6. Next, the dough is transferred into a 12-inch (30.48 cm) diameter two-roll mill and roll milled to a thickness of 0.023–0.026 inches (5.84–6.60 mm).
7. Then, approximately 2 inch by 2.75 inch (5.08 cm by 6.98 cm) elliptical shapes are manually cut from the dough sheet.

Frying

1. The dough forms from Step #7 above are then fried in a 50 lb (22.7 kg) oil capacity food service fryer (Frymaster) filled with 100% Olean® (The Procter & Gamble Co ) that is maintained at 375° F. (190.6° C.).
2. A stainless steel carrier is used to hold 6 elliptical shaped dough pieces in a saddle form during the frying in the oil for 9 seconds.
3. The resulting fried crisps are removed from the carrier and allowed to cool on a paper towel. The crisps have approximately a 23.5% Olean® content after frying.

Salting

1. The crisps of #3 above are placed on a shallow pan/tray that is then placed in an oven at 200° F. (93.3° C.) for 2 min.
2. The heated crisps are immediately transferred to a tared tray on a two-place balance.
3. After being removed from the oven, salt is uniformly added over the crisp's surface at a level of 0.8% by weight of the crisps. The salt mixture comprises 60% fine flake salt and 40% flour salt (Cargill Inc., St. Clair, Mich.).

Seasoning

The crisps are then seasoned as follows:

1. A forced air oven is preheated to 200° F. (93.3° C.).
2. The crisps are placed on a shallow pan/tray that is placed in the oven for 2 min.
3. After being removed from the oven, the crisps are immediately transferred to a tared tray on a two-place balance and seasoning is uniformly added to the crisps' surface at a level of 5.553% of the weight of the crisps. The seasoning used is 99.037% sour cream & onion seasoning (Baltimore Spice, Baltimore, Md.) and 0.963% vitamin pack containing vitamins A, $D_3$, $K_1$ (Watson Foods Co., West Haven, Conn.).

A single reference serving (30 grams) of the resulting product is analyzed according to the protocols disclosed in the "Analytical Protocols" Section of this application and the test results indicate that the product's amino acid sources provide 34.2% of the product's total caloric content; that the product's fat sources provide 2.6% of the product's total caloric content; that the product's digestible saturated fat sources provide 1.1% of the product's total caloric content; and that the single reference serving contains 2.50 grams of dietary fiber.

EXAMPLE 17

Peanut butter spread

| Ingredient | Filling Formula weight percent |
|---|---|
| Olean ® (Procter & Gamble Co., Cincinnati, OH) | 31.04 |
| Sugar 12X (Amalgamated Sugar Co., Ogden, UT) | 16.00 |
| Salt (Morton International, Inc., Chicago, IL) | 1.10 |
| Fiber - soluble (Fibersol-2, Matsutani Chem. Ind., Itami-city Hyogo, Japan) | 5.36 |
| Processed De-fatted (20%) Peanut Flour from US#1 Medium Runner Peanuts (Cargill Peanut, Dawson GA) | 36.43 |
| Vitamin A, $D_3$, $K_1$ blend (Watson Foods Co., West Haven, CT) | 0.07 |
| Corn Syrup Solids (M200, Grain Processing Corp., Muscatine, IA) | 10.00 |

MAKING PROCEDURE

Preparation of Roll Milled Peanut Solids (De-fatted Peanut Flour)

Peanuts are roasted to a 36–37 L' roast color and then ground in a Bauer conventional grinder to produce a nut paste of pumpable consistency. The method for determining L' roast color values is disclosed in allowed U.S. Patent Application Serial No. 09/511,058 and in WO051449A 1 both of which are incorporated by reference. The nut paste is defatted by using a mechanical press. The fat content of the defatted solids is 20%. The nut solids are then milled to a mono modal particle size distribution using a Lehmann mill (Model 4039).

Heating and Finishing

1. A jacketed Hobart (Model C-100-T) is preheated, 1 hour prior using, to a temperature of about 150° F. (65.6° C.).
2. All the ingredients, wet and dry, including the vitamins are weighed, combined and then mixed in the heated Hobart at speed setting #1 for 1 hour.
3. Next, the mixture is cooled through the temperature range of 130° F.–140° F. (54.4° C.–60.0° C.) in about 10 minutes to ensure the proper crystallizing structure. This can usually be accomplished by ambient cooling for lab batch sizes.

A single reference serving (36 grams) of the resulting product is analyzed according to the protocols disclosed in the "Analytical Protocols" Section of this application and it is determined that the product's amino acid sources provide 26.0% of the product's total caloric content; that the product's fat sources provide 21.3% of the product's total caloric content; that the product's digestible saturated fat sources provide 3.9% of the product's total caloric content; and that the single reference serving contains 3.32 grams of dietary fiber.

EXAMPLE 18

Apple Cinnamon Bar

| Ingredient | Formula g/100 g |
|---|---|
| Salt (Kroger, Cincinnati, OH) | 0.55 |
| Granulated Sugar (Domino Sugar Corp., New York, NY) | 8.22 |
| Molasses - Grandma's (Mott's USA, Div. Of Cadbury Beverages Inc., Stamford CT) | 0.55 |
| Corn Syrup - Isosweet 100 (A. E. Staley Mfg. Co., Decatur, IL) | 10.28 |
| Extruded Apple Pieces (Mariani Packing Co., Inc., San Jose, CA) | 35.60 |
| Glycerine - Superol (Procter & Gamble Co., Cincinnati, OH) | 2.74 |
| Supro Soy Nuggets (Protein Technologies Intl., St. Louis, MO) | 13.71 |
| Isolated Soy Protein (Supro ® 661, Protein Technologies Intl., St. Louis, MO) | 3.19 |
| Sodium Bicarbonate (Church & Dwight Co., Princeton, NJ) | 0.82 |
| Egg White Solids (Henningsen Foods, Inc., Omaha, NE) | 0.55 |
| Xanthan Gum (Kelco Nutrasweet, Div. Of Monsanto, St. Louis, MO) | 0.82 |
| Emulsifier - Panodan SDK (Danisco A/S, Copenhagen, Denmark) | 0.55 |
| Fiberaid ® (Larex Corp., White Bear Lake, MN) | 7.41 |
| Vanilla Flavor E9926756 (Mane Fragrances-Flavors, LeBar Sur Loup, France) | 0.28 |
| Cinnamon (McCormick, Hunt Valley, MD) | 1.02 |
| Water | 13.71 |

MAKING PROCEDURE

Dough Making

1. The water, molasses, glycerine, corn syrup, and Panodan are weighed in a Hobart mixer bowl and mixed, using a KitchenAid mixer (Model K45SS) with paddle, for 1 minute on speed #1.
2. Sucrose, dry flavor, fiber, protein, soda, starch, salt, egg white solids, cinnamon, and xanthan gum are weighed into a tared bowl lined with a plastic bag.
3. Ingredients are shaken in the bag to mix the ingredients.
4. The dry ingredients from # 3 are slowly added to the mix in the bowl from #1 above while the mixer is running on the lowest speed (3–5 minutes depending on amount).
5. The Supro Soy Nuggets and extruded apple pieces are weighed, added to the mixture from #4 above and the resulting mixture is mixed for 30 seconds at speed #2.
6. The resulting dough from #5 above is covered and allowed to rest for 15 minutes.

Baking

1. The dough from Step #6 above is rolled between two pieces of aluminum foil to a 0.5 inch (1.27 cm) thickness.
2. The sheets are then frozen at minus 40° F. (minus 40° C.) for 10 minutes after which the top foil sheet is immediately peeled off.
3. The sheet is then placed on a baking sheet and baked at 300° F. (148.9° C.) for 12 minutes followed by baking at 250° F. (121° C.) for 22 minutes. The foil is removed from the product within 30 seconds of removing the product from the oven and the product is placed in sealed containers when cool.

A single reference serving (40 grams) of the resulting product is analyzed according to the protocols disclosed in the "Analytical Protocols" Section of this application and it is determined that the product's amino acid sources provide 20.00% of the product's total caloric content; that the product's fat sources provide 4.10% of the product's total caloric content; that the product's digestible saturated fat sources provide 0% of the product's total caloric content; and that the single reference serving contains 4.70 grams of dietary fiber.

EXAMPLE 19

Granola raisin bar with chocolate chips

| Ingredient | Formula g/100 g |
|---|---|
| Salt (Kroger, Cincinnati, OH) | 0.44 |
| Granulated Sugar (Domino Sugar Corp., New York, NY) | 6.62 |
| Molasses - Grandma's (Mott's USA, Div. Of Cadbury Beverages Inc., Stamford CT) | 0.44 |
| Corn Syrup - Isosweet 100 (A. E. Staley Mfg. Co., Decatur, IL) | 4.00 |
| Corn Syrup - 42DE (A. E. Staley Mfg. Co., Decatur, IL) | 4.28 |
| Semi-sweet Chocolate Chips (Barry Callebaut, St-Albans, VT) | 15.13 |
| Glycerine - Superol (Procter & Gamble Co., Cincinnati, OH) | 2.21 |
| Supro Soy Nuggets (Protein Technologies Intl., St. Louis, MO) | 11.04 |
| Oats - 1 Minute (Quaker Oats Co., Chicago, IL) | 0.84 |
| Raisins - Airport Select Thompson Seedless (Enoch Packing Co. Inc., Del Rey, CA) | 16.43 |
| Hearty Granola - Fisher (John B. Sanfilippo & Son, Inc., Elk Grove Village, IL) | 12.23 |
| Isolated Soy Protein (Supro ® 661, Protein Technologies Intl., St. Louis, MO) | 5.59 |
| Sodium Bicarbonate (Church & Dwight Co., Princeton, NJ) | 0.66 |
| Egg White Solids (Henningsen Foods, Inc., Omaha, NE) | 0.44 |
| Wheat Starch, Atex (ADM Co., Olathe, KS) | 0.88 |
| Xanthan Gum (Kelco Nutrasweet, Div. Of Monsanto, St. Louis, MO) | 0.66 |
| Emulsifier - Panodan SDK (Danisco A/S, Copenhagen, Denmark) | 0.44 |
| Fiberaid ® (Larex Corp., White Bear Lake, MN) | 5.59 |
| Vanilla Flavor, Nielsen-Massey Vanilla, Inc., Waukegan, IL. | 0.22 |
| Cinnamon (McCormick, Hunt Valley, MD) | 0.82 |
| Water | 11.04 |

MAKING PROCEDURE

The making procedure is the same as that of Example 18, except chocolate chips, granola, and raisins are substituted for apple pieces in Step #5 and oats are applied to surface after baking.

A single reference serving (40 grams) of the resulting product is analyzed according to the protocols disclosed in the "Analytical Protocols" Section of this application and it is determined that the product's amino acid sources provide 20.30% of the product's total caloric content; that the product's fat sources provide 19.10% of the product's total caloric content; that the product's digestible saturated fat sources provide 1.37% of the product's total caloric content; and that the single reference serving contains 3.00 grams of dietary fiber.

EXAMPLE 20

Brownie

| Ingredient | Formula g/100 g |
|---|---|
| Salt (Kroger, Cincinnati, OH) | 0.51 |
| Granulated Sugar (Domino Sugar Corp., New York, NY) | 7.53 |
| Molasses - Grandma's (Mott's USA, Div. Of Cadbury Beverages Inc., Stamford CT) | 0.51 |
| Corn Syrup - Isosweet 100 (A. E. Staley Mfg. Co., Decatur, IL) | 9.5 |
| Semi-sweet Chocolate Chips (Barry Callebaut, St-Albans, VT) | 16.93 |
| Glycerine - Superol (Procter & Gamble Co., Cincinnati, OH) | 2.54 |
| Supro Soy Nuggets (Protein Technologies Intl., St. Louis, MO) | 21.26 |
| Cocoa - Hershey's (Hershey Foods Corp., Hershey, PA) | 8.47 |
| Chocolate Flavor 462977 (Givaudan Flavors Corp., Cincinnati, OH) | 0.64 |
| Isolated Soy Protein (Supro ® 661, Protein Technologies Intl., St. Louis, MO) | 1.88 |
| Sodium Bicarbonate (Church & Dwight Co., Princeton, NJ) | 0.76 |
| Egg White Solids (Henningsen Foods, Inc., Omaha, NE) | 0.75 |
| Xanthan Gum (Kelco Nutrasweet, Div. Of Monsanto, St. Louis, MO) | 0.75 |
| Emulsifier - Panodan SDK (Danisco A/S, Copenhagen, Denmark) | 0.51 |
| Fiberaid ® (Larex Corp., White Bear Lake, MN) | 7.71 |
| Vanilla Flavor, Nielsen-Massey Vanilla, Inc., Waukegan, IL. | 0.45 |
| Vanilla Frosting - Betty Crocker (General Mills Sales, Inc., Minneapolis, MN) | 6.60 |
| Water | 12.7 |

MAKING PROCEDURE

The making procedure is the same as that of Example 18, except chocolate chips are substituted for apple pieces in Step #5, the Supro Soy Nuggets are ground to a powder before addition, and cocoa is added to dry ingredients in Step #2.

A single reference serving (40 grams) of the resulting product is analyzed according to the protocols disclosed in the "Analytical Protocols" Section of this application and it is determined that the product's amino acid sources provide 20.40% of the product's total caloric content; that the product's fat sources provide 19.80% of the product's total caloric content; that the product's digestible saturated fat sources provide 1.38% of the product's total caloric content; and that the single reference serving contains 3.00 grams of dietary fiber.

TASTE SCORES FOR EXAMPLES

A number of the embodiments detailed above are tested according to Applicants' Taste Protocol 1.1 and the following results are obtained:

| LOCATION | 60% Confidence | | 70% Confidence | | 80% Confidence | |
|---|---|---|---|---|---|---|
| | Lower Bound | Upper Bound | Lower Bound | Upper Bound | Lower Bound | Upper Bound |
| Example 1 | 24.7232 | 30.0832 | 24.1015 | 30.7049 | 23.3181 | 31.4883 |
| Example 2 | 24.4220 | 29.7825 | 23.8002 | 30.4044 | 23.0164 | 31.1881 |
| Example 4 | 19.0812 | 24.4435 | 18.4592 | 25.0655 | 17.6756 | 25.8492 |
| Example 5 | 25.1568 | 31.5477 | 24.4141 | 32.2904 | 23.4768 | 33.2277 |
| Example 5 | 26.8705 | 32.0975 | 26.2643 | 32.7038 | 25.5004 | 33.4677 |
| Example 6 | 23.0550 | 28.1808 | 22.4606 | 28.7752 | 21.7117 | 29.5241 |
| Example 7 | 28.4371 | 34.7097 | 27.7083 | 35.4386 | 26.7886 | 36.3582 |
| Example 8 | 26.1648 | 33.6035 | 25.2986 | 34.4697 | 24.2040 | 35.5643 |
| Example 9 | 23.0393 | 28.1706 | 22.4444 | 28.7655 | 21.6948 | 29.5151 |
| Example 10 | 24.8302 | 30.6244 | 24.1571 | 31.2975 | 23.3080 | 32.1466 |
| Example 12 | 13.4930 | 20.8707 | 12.6343 | 21.7293 | 11.5495 | 22.8141 |
| Example 13 | 20.7240 | 26.5615 | 20.0461 | 27.2394 | 19.1912 | 28.0943 |
| Example 15 | 13.0230 | 18.4971 | 12.3882 | 19.1320 | 11.5882 | 19.9319 |
| Example 16 | 22.5890 | 28.8972 | 21.8559 | 29.6303 | 20.9308 | 30.5555 |
| Example 17 | 24.4818 | 29.8704 | 23.8569 | 30.4953 | 23.0696 | 31.2826 |
| Example 18 | 20.8620 | 29.7441 | 19.8226 | 30.7834 | 18.5046 | 32.1014 |
| Example 19 | 20.6979 | 28.2349 | 19.8197 | 29.1131 | 18.7092 | 30.2236 |
| Example 20 | 8.8397 | 17.8269 | 7.7880 | 18.8786 | 6.4542 | 20.2124 |

-continued

TASTE SCORES FOR EXAMPLES

A number of the embodiments detailed above are tested according to Applicants' Taste Protocol 1.1 and the following results are obtained:

| LOCATION | 90% Confidence | | 95% Confidence | | 99% Confidence | |
|---|---|---|---|---|---|---|
| | Lower Bound | Upper Bound | Lower Bound | Upper Bound | Lower Bound | Upper Bound |
| Example 1 | 22.1537 | 32.6527 | 21.1401 | 33.6663 | 19.1462 | 35.6602 |
| Example 2 | 21.8513 | 32.3532 | 20.8367 | 33.3678 | 18.8398 | 35.3648 |
| Example 3 | 16.5110 | 27.0137 | 15.4973 | 28.0275 | 13.5037 | 30.0210 |
| Example 4 | 22.0806 | 34.6240 | 20.8609 | 35.8436 | 18.4480 | 38.2565 |
| Example 5 | 24.3652 | 34.6029 | 23.3771 | 35.5910 | 21.4338 | 37.5342 |
| Example 6 | 20.5991 | 30.6366 | 19.6310 | 31.6048 | 17.7282 | 33.5076 |
| Example 7 | 25.4188 | 37.7281 | 24.2226 | 38.9243 | 21.8571 | 41.2897 |
| Example 8 | 22.5693 | 37.1990 | 21.1367 | 38.6316 | 18.2858 | 41.4824 |
| Example 9 | 20.5814 | 30.6285 | 19.6126 | 31.5973 | 17.7091 | 33.5008 |
| Example 10 | 22.0438 | 33.4108 | 20.9404 | 34.5142 | 18.7604 | 36.6942 |
| Example 12 | 9.9306 | 24.4331 | 8.5129 | 25.8507 | 5.6958 | 28.6678 |
| Example 13 | 17.9188 | 29.3668 | 16.8088 | 30.4767 | 14.6180 | 32.6675 |
| Example 15 | 10.3996 | 2.1205 | 9.3651 | 22.1550 | 7.3310 | 24.1891 |
| Example 16 | 19.5526 | 31.9337 | 18.3488 | 33.1375 | 15.9673 | 35.5190 |
| Example 17 | 21.8998 | 32.4524 | 20.8818 | 33.4704 | 18.8806 | 35.4716 |
| Example 18 | 16.5244 | 34.0816 | 14.7745 | 35.8315 | 11.2419 | 39.3642 |
| Example 19 | 17.0493 | 31.8835 | 15.5927 | 33.3401 | 12.6878 | 36.2450 |
| Example 20 | 4.4500 | 22.2166 | 2.6787 | 23.9880 | -0.8982 | 27.5648 |

What is claimed:

1. A ready-to-eat food having, at a 60% confidence level, a lower taste value greater than −8.00; a water activity of less than 0.90; and comprising, on a single reference serving basis:
   a.) an amino acid source that provides at least 19% of the total caloric value of said food;
   b.) a fat that provides less than 30% of the total caloric value of said food; and
   c.) a carbohydrate that provides the balance of the total caloric value of said food and at least about 2.5 grams of dietary fiber, the fiber having a particle size of less than 150 microns and a water absorption less than 7.0 grams per gram of fiber.

2. The ready-to-eat food of claim 1 wherein said water activity is less than 0.85; said fat provides less than 27% of the total caloric value of said food; and said food comprises an adjunct ingredient.

3. The ready-to-eat food of claim 1 having a lower taste value that is greater than 1.64 and an upper taste value less than 39.45; and wherein said amino acid source provides at least 19% but less than 50% of the total caloric value of said food; and said carbohydrate provides from about 2.5 grams to about 5.0 grams of dietary fiber.

4. The ready-to-eat food of claim 3 wherein said food is a filed cracker, filled extruded snack, enrobed extruded snack, spread, potato crisp, or brownie.

5. The ready-to-eat food of claim 1 wherein said amino acid and fiber sources are at least 75% active; and said fiber is selected from the group consisting of soluble fiber having a viscosity of from 1 to 2 centipoise for a 10% solution at 25° C., insoluble fiber having a particle size of less than 150 microns and a water absorption less than 7.0 grams per gram of fiber, and mixtures thereof.

6. The ready-to-eat food of claim 1 having an amino acid score from 0.60 to 1.00.

7. The ready-to-eat food of claim 1 wherein said fat comprises saturated fat and said saturated fat comprises less than 18% of the total caloric value of said food.

8. The ready-to-eat food of claim 7 wherein said saturated fat comprises less than 10% of the total caloric value of said food.

9. The ready-to-eat food of claim 1 comprising a material selected from the group consisting of nondigestible lipids, partially digestible lipids, and mixtures thereof.

10. The ready-to-eat food of claim 1 comprising a material selected from the group consisting of arabinogalactan fiber, beta-glucan soluble fiber, and mixtures thereof.

11. The ready-to-eat food of claim 1 comprising fluoride; sodium; potassium; and, on a 30 gram basis, from about 10% to about 100% of the U.S. RDI of the vitamins A, D, E, K, C, thiamin, riboflavin, niacin, vitamin $B_6$, folate, vitamin $W_{12}$, biotin, and pantothenic acid, and from about 10% to about 100% of the U.S. RDI of the minerals calcium, phosphorus, magnesium, iron, zinc, iodine, selenium, copper, manganese, chromium, molybdenum, and chloride.

12. The ready-to-eat food of claim 1 wherein said food is a filled cracker, filled extruded snack, enrobed extruded snack, spread, potato crisp, or brownie.

13. The ready-to-eat food of claim 1 having, at an 80% confidence level, a lower taste value that is greater than −400.

14. The ready-to-eat food of claim 13 wherein said water activity is less than 0.85; said fat provides less than 27% of the total caloric value of said food; and said food comprises an adjunct ingredient.

15. The ready-to-eat food of claim 13 having a lower taste value that is greater than 3.09 and an upper taste value less than 41.33; and wherein said amino acid source provides at least 19% but less than 50% of the total calorie value of said food; and said carbohydrate provides from about 2.5 grams to about 5.0 grains of dietary fiber.

16. The ready-to-eat food of claim 15 wherein said food is a filled cracker, filled extruded snack, enrobed extruded snack, spread, potato crisp, or brownie.

17. The ready-to-eat food of claim 13 wherein said amino acid and fiber sources are at least 75% active; and said fiber is selected from the group consisting of soluble fiber having a viscosity of from 1 to 2 centipoise for a 10% solution at 25° C., insoluble fiber having a particle size of less than 150 microns and a water absorption less than 7.0 grams per grain of fiber, and mixtures thereof.

18. The ready-to-eat food of claim 13 having an amino acid score from 0.60 to 1.00.

19. The ready-to-eat food of claim 13 wherein said fat comprises saturated fat and said saturated fat comprises less than 18% of the total caloric value of said food.

20. The ready-to-eat food of claim 19 wherein said saturated fat comprises less than 10% of the total caloric value of said food.

21. The ready-to-eat food of claim 13 comprising a material selected from the group consisting of non-digestible lipids, partially digestible lipids, and mixtures thereof.

22. The ready-to-eat food of claim 13 comprising a material selected from the group consisting of arabinogalactan fiber, beta-glucan soluble fiber, and mixtures thereof.

23. The ready-to-eat food of claim 13 comprising fluoride; sodium; potassium; and, on a 30 gram basis, from about 100% a to about 100% of the U.S RDI of the vitamins A, D, E, K, C, thiamin, riboflavin, niacin, vitamin 86, folate, vitamin $B._2$, biotin, and pantothenic acid, and from about 10% to about 100% of the U.S. RDI of the minerals calcium, phosphorus, magnesium, iron, zinc, iodine, selenium, copper, manganese, chromium, molybdenum, and chloride.

24. The ready-to-eat food of claim 13 wherein said food is a filled cracker, filled extruded snack, enrobed extruded snack, spread, potato crisp, or brownie.

25. The ready-to-eat food of claim 1 having, at a 90% confidence level, a lower taste value that is greater than −2.00.

26. The ready-to-eat food of claim 25 wherein said water activity is less than 0.85; said fat provides less than 27% of the total caloric value of said food; and said food comprises an adjunct ingredient.

27. The ready-to-eat food of claim 25 having a lower taste value that is greater than 4.15 and an upper taste value less than 42.89; and wherein said amino acid source provides at least 19% but less than 50% of the total caloric value of said food; and said carbohydrate provides from about 2.5 grams to about 50 grams of dietary fiber.

28. The ready-to-eat food of claim 27 wherein said food is a filled cracker, filled extruded snack, enrobed extruded snack, spread, potato crisp, or brownie.

29. The ready-to-eat food of claim 25 wherein said amino acid and fiber sources are at least 75% active; and said fiber is selected from the group consisting of soluble fiber having a viscosity of from 1 to 2 centipoise for a 10% solution at 25° C., insoluble fiber having a particle size of less than 150 microns and a water absorption less than 7.0 grams per gram of fiber, and mixtures thereof.

30. The ready-to-eat food of claim 25 having an amino acid score from 0.60 to 1.00.

31. The ready-to-eat food of claim 25 wherein said fat comprises saturated fat and said saturated fat comprises less than 18% of the total caloric value of said food.

32. The ready-to-eat food of claim 31 wherein said saturated fat comprises less than 10% of the total caloric value of said food.

33. The ready-to-eat food of claim 25 comprising a material selected from the group consisting of non-digestible lipids, partially digestible lipids, and mixtures thereof.

34. The ready-to-eat food of claim 25 comprising a material selected from the group consisting of arabinogalactan fiber, beta-glucan soluble fiber, and mixtures thereof.

35. The ready-to-eat food of claim 25 comprising fluoride; sodium; potassium; and, on a 30 gram basis, from about 10% to about 100% of the US RDI of the vitamins A, D, B, K, C, thiamin, riboflavin, niacin, vitamin $B_{.6}$, folate, vitamin $B_{.12}$, biotin, and pantothenic acid, and from about 10% to about 100% of the U.S. RDI of the minerals calcium, phosphorus, magnesium, iron, zinc, iodine, selenium, copper, manganese, chromium, molybdenum, and chloride.

36. The ready-to-eat food of claim 25 wherein said food is a filled cracker, filled extruded snack, enrobed extruded snack, spread, potato crisp, or brownie.

37. The ready-to-eat food of claim 1 having, at a 99% confidence level, a lower taste value that is greater than 1.00.

38. The ready-to-eat food of claim 37 wherein said water activity is less than 0.85; said fat provides less than 27% of the total caloric value of said food; and said food comprises an adjunct ingredient.

39. The ready-to-eat food of claim 37 having a lower taste value that is greater than 7.09 and an upper taste value less than 46.96; and wherein said amino acid source provides at least 19% but less than 50% of the total caloric value of said food; and said carbohydrate provides from about 2.5 grams to about 5.0 grains of dietary fiber.

40. The ready-to-eat food of claim 39 wherein said food is a filled cracker, filled extruded snack, enrobed extruded snack, spread, potato crisp, or brownie.

41. The ready-to-eat food of claim 37 wherein said amino acid and fiber sources are at least 75% active; and said fiber is selected from the group consisting of soluble fiber having a viscosity of from 1 to 2 centipoise for a 10% solution at 25° C., insoluble fiber having a particle size of less than 150 microns and a water absorption less than 7.0 grams per gram of fiber, and mixtures thereof.

42. The ready-to-eat food of claim 37 having an amino acid score from 0.60 to 1.00.

43. The ready-to-eat food of claim 37 wherein said fat comprises saturated fat and said saturated fat comprises less than 18% of the total caloric value of said food.

44. The ready-to-eat food of claim 43 wherein said saturated fat comprises less than 10% of the total caloric value of said food.

45. The ready-to-eat food of claim 37 comprising a material selected from the group consisting of non-digestible lipids, partially digestible lipids, and mixtures thereof.

46. The ready-to-eat food of claim 37 comprising a material selected from the group consisting of arabinogalactan fiber, beta-glucan soluble fiber, and mixtures thereof.

47. The ready-to-eat food of claim 37 comprising fluoride; sodium; potassium; and, on a 30 grain basis, from about 10% to about 100% of the U.S. RDI of the vitamins A, D, E, K, C, thiamin, riboflavin, niacin, vitamin $B_{.6}$, folate, vitamin $B_{.12}$, biotin, and pantothenic acid, and from about 10% to about 100% of the U.S. RDI of the minerals calcium, phosphorus, magnesium, iron, zinc, iodine, selenium, copper, manganese, chromium, molybdenum, and chloride.

48. The ready-to-eat food of claim 37 wherein said food is a filled cracker, filled extruded snack, enrobed extruded snack, spread, potato crisp, or brownie.

49. The ready-to-eat food of claim 1 wherein the dietary fiber comprises at least one of cellulose, microcrystalline cellulose, bran, resistant starch, lignin, wheat fiber, pea fiber and mixtures thereof.

50. The ready-to-eat food of claim 1 wherein the dietary fiber comprises at least one of oat bran, barley bran, psyllium, hemicellulose, carboxymethylcellulose, hydroxypropyl methylcellulose, methylcellulose, pectin, inulin, guar gum, locust bean gum, xanthan gum, gellan gum, gum arabic, gum tragacanth, gum karaya, arabinogalactan, beta glucan and mixtures thereof.

* * * * *

UNITED STATES PATENT AND TRADEMARK OFFICE
CERTIFICATE OF CORRECTION

PATENT NO. : 6,827,954 B2
APPLICATION NO. : 09/828016
DATED : December 7, 2004
INVENTOR(S) : Prosise et al.

It is certified that error appears in the above-identified patent and that said Letters Patent is hereby corrected as shown below:

Column 70, line 19, delete "-400" and insert -- -4.00--

Column 70, line 56, delete first "100%" and insert --10%--

Column 70, line 57, delete "86" and insert --$B_6$--

Signed and Sealed this

Eighth Day of August, 2006

JON W. DUDAS
*Director of the United States Patent and Trademark Office*